US010397796B2

(12) United States Patent
Sun et al.

(10) Patent No.: US 10,397,796 B2
(45) Date of Patent: Aug. 27, 2019

(54) OVER-THE-AIR SIGNALING FOR AN INCREASED REUSE FACTOR IN A SHARED RADIO FREQUENCY SPECTRUM BAND

(71) Applicant: QUALCOMM Incorporated, San Diego, CA (US)

(72) Inventors: Jing Sun, San Diego, CA (US); Tao Luo, San Diego, CA (US); Taesang Yoo, Riverside, CA (US); Xiaoxia Zhang, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 15/177,928

(22) Filed: Jun. 9, 2016

(65) Prior Publication Data

US 2017/0013470 A1 Jan. 12, 2017

Related U.S. Application Data

(60) Provisional application No. 62/190,159, filed on Jul. 8, 2015.

(51) Int. Cl.
*H04W 72/08* (2009.01)
*H04W 16/14* (2009.01)
(Continued)

(52) U.S. Cl.
CPC ....... *H04W 16/14* (2013.01); *H04W 72/1226* (2013.01); *H04W 74/0816* (2013.01); *H04W 72/1278* (2013.01); *H04W 84/12* (2013.01)

(58) Field of Classification Search
CPC ..................................................... H04W 16/14
See application file for complete search history.

(56) References Cited

U.S. PATENT DOCUMENTS

2011/0286403 A1* 11/2011 Jain .................. H04W 74/0816
370/329
2012/0099450 A1 4/2012 Madan et al.
(Continued)

OTHER PUBLICATIONS

Huawei et al., "Further Analysis on the Required Functionalities for LAA," 3GPP TSG RAN WG1 Meeting #79, R1-144590, San Francisco, USA, Nov. 17-21, 2014, 4 pgs., XP_50875680A, 3rd Generation Partnership Project.
(Continued)

*Primary Examiner* — Brandon M Renner
(74) *Attorney, Agent, or Firm* — Holland & Hart LLP

(57) ABSTRACT

Techniques are described for wireless communication. One method of wireless communication includes receiving, at a first user equipment (UE), a first communication over a shared radio frequency spectrum band from a first base station. The first communication includes a pre-grant communication associated with a downlink transmission or a grant of uplink resources associated with an uplink transmission. The method further includes determining, based at least in part on receiving the first communication, whether a channel reservation signal is detected over the shared radio frequency spectrum band; and transmitting a second communication over the shared radio frequency spectrum band, to the first base station, based at least in part on the determining. The second communication includes an approval of the downlink transmission or the uplink transmission.

28 Claims, 24 Drawing Sheets

(51) Int. Cl.
*H04W 74/08* (2009.01)
*H04W 72/12* (2009.01)
*H04W 84/12* (2009.01)

(56) References Cited

U.S. PATENT DOCUMENTS

| | | | | |
|---|---|---|---|---|
| 2012/0182963 | A1* | 7/2012 | Kneckt | H04W 72/0453 |
| | | | | 370/330 |
| 2014/0079015 | A1* | 3/2014 | Kim | H04W 28/26 |
| | | | | 370/329 |
| 2015/0250002 | A1* | 9/2015 | Sun | H04W 74/0808 |
| | | | | 370/329 |
| 2015/0282186 | A1* | 10/2015 | Trainin | H04W 74/0816 |
| | | | | 370/336 |
| 2015/0334685 | A1* | 11/2015 | Ji | H04W 72/0453 |
| | | | | 370/330 |
| 2017/0111889 | A1* | 4/2017 | Li | H04W 72/042 |
| 2017/0215081 | A1* | 7/2017 | Yi | H04W 16/14 |

OTHER PUBLICATIONS

ISA/EP, International Search Report and Written Opinion of the International Searching Authority, Int'l. App. No. PCT/US2016/036860, Aug. 23, 2016, European Patent Office, Rijswijk, NL, 12 pgs.

\* cited by examiner

OVER-THE-AIR SIGNALING FOR AN INCREASED REUSE FACTOR IN A SHARED RADIO FREQUENCY SPECTRUM BAND

CROSS REFERENCES

The present Application for Patent claims priority to U.S. Provisional Patent Application No. 62/190,159 by Sun, et al., entitled "OVER-THE-AIR SIGNALING FOR AN INCREASED REUSE FACTOR IN A SHARED RADIO FREQUENCY SPECTRUM BAND," filed Jul. 8, 2015, assigned to the assignee hereof.

BACKGROUND

Field of the Disclosure

The present disclosure, for example, relates to wireless communication systems, and more particularly to techniques for using over-the-air signaling to provide an increased reuse factor in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In some wireless communication systems, base stations and UEs may communicate on enhanced component carriers (eCCs) in a shared radio frequency spectrum band. Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure or extended CCA (eCCA) procedure to determine whether a channel of the shared radio frequency spectrum band is available. When it is determined that the channel of the shared radio frequency spectrum band is available, a channel reservation signal (e.g., a channel usage beacon signal (CUBS)) may be transmitted to reserve the channel. A device that receives the channel reservation signal may defer accessing the channel. However, under some scenarios, a channel reservation signal transmitted by a first device may prevent a second device from transmitting over a channel, in parallel with the first device, even though the transmissions of the first device and the second device would not interfere (or even though interference that results from the parallel transmissions may be canceled).

SUMMARY

The present disclosure, for example, relates to techniques for using over-the-air signaling to provide an increased reuse factor in a shared radio frequency spectrum band. In accordance with the techniques, a first device that intends to communicate with a second device may transmit a first channel reservation signal. Upon receiving the first channel reservation signal, the second device may transmit a second channel reservation signal. The second channel reservation signal may indicate, among other things, an approval of the communication with the first device. When the first device is a first base station that intends to communicate with a first UE (i.e., the second device) in a downlink (DL) transmission, the first channel reservation signal may include a "channel reservation for transmission signal" (e.g., a channel reservation signal transmitted by a transmitter, such as a Clear-to-Send (CTS)-to-self and/or a physical frame format indicator channel (PFFICH)) and the second channel reservation signal may include a "channel reservation for reception signal" (e.g., a channel reservation signal transmitted by a receiver, such as a CTS). When the first device is a first base station that intends to communicate with a first UE (i.e., the second device) in an uplink (UL) transmission, the first channel reservation signal may include a channel reservation for reception signal (e.g., a CTS-to-self and/or a PFFICH), and the second channel reservation signal may include a channel reservation for transmission signal (e.g., a Wi-Fi preamble). The PFFICH may have different values in the DL transmission and UL transmission, to distinguish a DL transmission from a UL transmission.

Given the channel reservation signals transmitted by the first device and the second device, a second base station and a second UE may detect the channel reservation signals and make decisions to initiate/approve communication between the second base station and second UE. For example, when the second base station detects a "channel reservation for transmission" over a shared radio frequency spectrum band (e.g., a channel reservation detected by detecting one or more channel reservation for transmission signals), the second base station may determine, based at least in part on the channel reservation for transmission, whether a channel reservation for reception signal is detected over the shared radio frequency spectrum band. When the channel reservation for reception signal is not detected, the base station may transmit a first communication to the second UE. The first communication may include a pre-grant communication associated with a DL transmission or a grant of uplink resources associated with a UL transmission. Upon receiving the first communication, the second UE may determine whether a channel reservation signal (e.g., a channel reservation for transmission signal when the first communication includes the pre-grant communication, or a channel reservation for reception signal when the first communication includes the grant of uplink resources) is detected over the shared radio frequency spectrum band. Based at least in part on whether the channel reservation signal is detected by the second UE, the second UE may transmit a second communication over the shared radio frequency spectrum band. The second communication may include an approval of the downlink transmission or, alternatively, the uplink transmission.

A method of wireless communication is described. The method may include: receiving, at a first UE, a first communication over a shared radio frequency spectrum band from a first base station, the first communication comprising a pre-grant communication associated with a downlink transmission or a grant of uplink resources associated with an uplink transmission; determining, based at least in part on receiving the first communication, whether a channel reservation signal is detected over the shared radio frequency spectrum band; and transmitting a second communication over the shared radio frequency spectrum band, to the first base station, based at least in part on the determining, the second communication comprising an approval of the downlink transmission or the uplink transmission.

An apparatus for wireless communication is described. The apparatus may include a processor, memory in electronic communication with the processor, and instructions stored in the memory. The instructions may be executable by the processor to: receive, at a first UE, a first communication over a shared radio frequency spectrum band from a first base station, the first communication comprising a pre-grant communication associated with a downlink transmission or a grant of uplink resources associated with an uplink transmission; determine, based at least in part on receiving the first communication, whether a channel reservation signal is detected over the shared radio frequency spectrum band; and transmit a second communication over the shared radio frequency spectrum band, to the first base station, based at least in part on the determining, the second communication comprising an approval of the downlink transmission or the uplink transmission.

Another apparatus for wireless communication is described. The apparatus may include: means for receiving, at a first UE, a first communication over a shared radio frequency spectrum band from a first base station, the first communication including a pre-grant communication associated with a downlink transmission or a grant of uplink resources associated with an uplink transmission; means for determining, based at least in part on receiving the first communication, whether a channel reservation signal is detected over the shared radio frequency spectrum band; and means for transmitting a second communication over the shared radio frequency spectrum band, to the first base station, based at least in part on the determining, the second communication comprising an approval of the downlink transmission or the uplink transmission.

A non-transitory computer-readable medium storing code for wireless communication is described. The code may include instructions executable to: receive, at a first UE, a first communication over a shared radio frequency spectrum band from a first base station, the first communication comprising a pre-grant communication associated with a downlink transmission or a grant of uplink resources associated with an uplink transmission; determine, based at least in part on receiving the first communication, whether a channel reservation signal is detected over the shared radio frequency spectrum band; and transmit a second communication over the shared radio frequency spectrum band, to the first base station, based at least in part on the determining, the second communication comprising an approval of the downlink transmission or the uplink transmission.

In some examples of the method, apparatuses, or non-transitory computer-readable medium, the first communication may include the pre-grant communication, the channel reservation signal may include a channel reservation for transmission signal transmitted by a second base station, and the second communication may include a channel reservation for reception signal and the approval of the downlink transmission.

In some examples of the method, apparatuses, or non-transitory computer-readable medium, the channel reservation for transmission signal may include a Clear-to-Send (CTS)-to-self signal, the channel reservation for reception signal may include a CTS signal, and the approval of the downlink transmission may include a pre-grant acknowledgement (ACK) signal.

Some examples of the method, apparatuses, or non-transitory computer-readable medium may include steps, features, means, or instructions for: determining that the channel reservation for transmission signal is not detected; and transmitting the second communication based at least in part on not detecting the channel reservation for transmission signal.

Some examples of the method, apparatuses, or non-transitory computer-readable medium may include steps, features, means, or instructions for: determining that the channel reservation for transmission signal is detected; determining a reservation time associated with the channel reservation for transmission signal has expired; and transmitting the second communication based at least in part on the reservation time being expired.

Some examples of the method, apparatuses, or non-transitory computer-readable medium may include steps, features, means, or instructions for: determining that the channel reservation for transmission signal is detected; determining that an interference level associated with the channel reservation for transmission signal is below a threshold interference level; compiling channel quality indicator (CQI) feedback, based at least in part on the interference level, to adjust a modulation and coding scheme (MCS) of the downlink transmission; and transmitting the second communication based at least in part on the interference level being below the threshold interference level, the second communication further including the CQI feedback.

Some examples of the method, apparatuses, or non-transitory computer-readable medium may include steps, features, means, or instructions for: receiving from the first base station, subsequent to transmitting the second communication, the downlink transmission over the shared radio frequency spectrum band.

In some examples of the method, apparatuses, or non-transitory computer-readable medium, the first communication may include the grant of uplink resources, the channel reservation signal may include a channel reservation for reception signal transmitted by a second UE, and the second communication may include a channel reservation for transmission signal and the uplink transmission.

In some examples of the method, apparatuses, or non-transitory computer-readable medium, the channel reservation for reception signal may include a CTS signal, and the channel reservation for transmission signal may include a Wi-Fi preamble having a length field indicating a duration of the uplink transmission.

Some examples of the method, apparatuses, or non-transitory computer-readable medium may include steps, features, means, or instructions for: determining that the channel reservation for reception signal is not detected; and transmitting the second communication based at least in part on not detecting the channel reservation for reception signal.

Some examples of the method, apparatuses, or non-transitory computer-readable medium may include steps, features, means, or instructions for: determining that the channel reservation for reception signal is detected; determining that a reservation time associated with the channel reservation for reception signal has expired; and transmitting the second communication based at least in part on the reservation time being expired.

In some examples of the method, apparatuses, or non-transitory computer-readable medium, the first communication may include the pre-grant communication, the channel reservation signal may include a channel reservation for transmission signal transmitted by a second UE or a Wi-Fi transmitter, and the second communication may include a channel reservation for reception signal and the approval of the downlink transmission.

In some examples of the method, apparatuses, or non-transitory computer-readable medium, the channel reservation for transmission signal may include at least one of a Wi-Fi preamble or a Request-to-Send (RTS) signal, the channel reservation for reception signal may include a Clear-to-Send (CTS) signal, and the approval of the downlink transmission may include a pre-grant acknowledgement (ACK) signal.

Some examples of the method, apparatuses, or non-transitory computer-readable medium may include steps, features, means, or instructions for: determining that the channel reservation for transmission signal is not detected; and transmitting the second communication based at least in part on not detecting the channel reservation for transmission signal.

Some examples of the method, apparatuses, or non-transitory computer-readable medium may include steps, features, means, or instructions for: determining that the channel reservation for transmission signal is detected; determining that a reservation time associated with the channel reservation for transmission signal has expired; and transmitting the second communication based at least in part on the reservation time being expired.

Some examples of the method, apparatuses, or non-transitory computer-readable medium may include steps, features, means, or instructions for: determining that the channel reservation for transmission signal is detected; determining that an interference level associated with the channel reservation for transmission signal is below a threshold interference level; compiling CQI feedback, based at least in part on the interference level, to adjust a modulation and coding scheme (MCS) of the downlink transmission; and transmitting the second communication based at least in part on the interference level being below the threshold interference level, the second communication further including the CQI feedback.

Some examples of the method, apparatuses, or non-transitory computer-readable medium may include steps, features, means, or instructions for: receiving from the first base station, subsequent to transmitting the second communication, the downlink transmission over the shared radio frequency spectrum band.

In some examples of the method, apparatuses, or non-transitory computer-readable medium, the first communication may include the grant of uplink resources, the channel reservation signal may include a channel reservation for reception signal transmitted by a second base station or a Wi-Fi receiver, and the second communication may include a channel reservation for transmission signal and the uplink transmission.

In some examples of the method, apparatuses, or non-transitory computer-readable medium, the channel reservation for reception signal may include a CTS-to-self signal or a CTS signal, and the channel reservation for transmission signal may include a Wi-Fi preamble having a length field indicating a duration of the uplink transmission.

Some examples of the method, apparatuses, or non-transitory computer-readable medium may include steps, features, means, or instructions for: determining that the channel reservation for reception signal is not detected; and transmitting the second communication based at least in part on not detecting the channel reservation for reception signal.

Some examples of the method, apparatuses, or non-transitory computer-readable medium may include steps, features, means, or instructions for: determining that the channel reservation for reception signal is detected; determining that a reservation time associated with the channel reservation for reception signal has expired; and transmitting the second communication based at least in part on the reservation time being expired.

A method of wireless communication is described. The method may include: detecting, at a first base station, a channel reservation for transmission over a shared radio frequency spectrum band; determining, based at least in part on the channel reservation for transmission, whether a channel reservation for reception signal is detected over the shared radio frequency spectrum band; and transmitting a communication over the shared radio frequency spectrum band, to a first UE, based at least in part on the determining, the communication comprising a pre-grant communication associated with a downlink transmission or a grant of uplink resources associated with an uplink transmission.

An apparatus for wireless communication is described. The apparatus may include a processor, memory in electronic communication with the processor, and instructions stored in the memory. The instructions may be executable by the processor to: detect, at a first base station, a channel reservation for transmission over a shared radio frequency spectrum band; determine, based at least in part on the channel reservation for transmission, whether a channel reservation for reception signal is detected over the shared radio frequency spectrum band; and transmit a communication over the shared radio frequency spectrum band, to a first UE, based at least in part on the determining, the communication comprising a pre-grant communication associated with a downlink transmission or a grant of uplink resources associated with an uplink transmission.

Another apparatus for wireless communication is described. The apparatus may include: means for detecting, at a first base station, a channel reservation for transmission over a shared radio frequency spectrum band; means for determining, based at least in part on the channel reservation for transmission, whether a channel reservation for reception signal is detected over the shared radio frequency spectrum band; and means for transmitting a communication over the shared radio frequency spectrum band, to a first UE, based at least in part on the determining, the communication comprising a pre-grant communication associated with a downlink transmission or a grant of uplink resources associated with an uplink transmission.

A non-transitory computer-readable medium storing code for wireless communication is described. The code may include instructions executable to: detect, at a first base station, a channel reservation for transmission over a shared radio frequency spectrum band; determine, based at least in part on the channel reservation for transmission, whether a channel reservation for reception signal is detected over the shared radio frequency spectrum band; and transmit a communication over the shared radio frequency spectrum band, to a first UE, based at least in part on the determining, the communication comprising a pre-grant communication associated with a downlink transmission or a grant of uplink resources associated with an uplink transmission.

Some examples of the method, apparatuses, or non-transitory computer-readable medium may include steps, features, means, or instructions for: determining that the channel reservation for reception signal is not detected; and transmitting the communication based at least in part on not detecting the channel reservation for reception signal. In some examples the communication may include a CTS-to-self signal.

In some examples of the method, apparatuses, or non-transitory computer-readable medium, the channel reservation for transmission may be made by a second base station and the channel reservation for reception signal may be transmitted by a second UE.

In some examples of the method, apparatuses, or non-transitory computer-readable medium, the channel reservation for reception signal may include a CTS signal, and detecting the channel reservation for transmission may include steps, features, means, or instructions for: detecting at least one of: a Clear-to-Send (CTS)-to-self signal transmitted by the second base station, a physical frame format indicator channel (PFFICH) transmitted by the second base station, or a combination thereof.

In some examples of the method, apparatuses, or non-transitory computer-readable medium detecting the channel reservation for transmission may include steps, features, means, or instructions for: determining that a reservation time associated with the channel reservation for transmission is not expired.

In some examples of the method, apparatuses, or non-transitory computer-readable medium, the channel reservation for transmission may be made by a second UE and the channel reservation for reception signal may be transmitted by a second base station.

In some examples of the method, apparatuses, or non-transitory computer-readable medium, the channel reservation for reception signal may include a CTS-to-self signal, and detecting the channel reservation for transmission may include steps, features, means, or instructions for: detecting a Wi-Fi preamble transmitted by the second UE.

In some examples of the method, apparatuses, or non-transitory computer-readable medium, detecting the channel reservation for transmission may include steps, features, means, or instructions for: determining that a reservation time associated with the channel reservation for transmission has not expired.

In some examples of the method, apparatuses, or non-transitory computer-readable medium, the channel reservation for transmission may be made by a Wi-Fi transmitter and the channel reservation for reception signal may be transmitted by a Wi-Fi receiver.

In some examples of the method, apparatuses, or non-transitory computer-readable medium, the channel reservation for reception signal may include a CTS signal, and detecting the channel reservation for transmission may include steps, features, means, or instructions for: detecting a RTS signal transmitted by the Wi-Fi transmitter.

In some examples of the method, apparatuses, or non-transitory computer-readable medium, detecting the channel reservation for transmission may include steps, features, means, or instructions for: determining that a reservation time associated with the channel reservation for transmission has not expired.

In some examples of the method, apparatuses, or non-transitory computer-readable medium, the communication may include the grant of uplink resources, and the method, apparatuses, or non-transitory computer-readable medium may include steps, features, means, or instructions for: determining an interference level associated with the channel reservation for transmission; identifying, based at least in part on the interference level, a modulation and coding scheme (MCS) to be used by the first UE during the uplink transmission; and transmitting an indicator of the MCS with the communication.

In some examples of the method, apparatuses, or non-transitory computer-readable medium, the communication may include the grant of uplink resources, and the method, apparatuses, or non-transitory computer-readable medium may include steps, features, means, or instructions for: determining a duration of the channel reservation for transmission; and indicating, in the grant of uplink resources, an uplink transmission duration shorter than the duration of the channel reservation for transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for using over-the-air signaling to provide an increased reuse factor in a shared radio frequency spectrum band. In some examples, the shared radio frequency spectrum band may be used for Long Term Evolution (LTE) or LTE-Advanced (LTE-A) communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to particular users (e.g., a licensed radio frequency spectrum band usable for LTE/LTE-A communications). The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
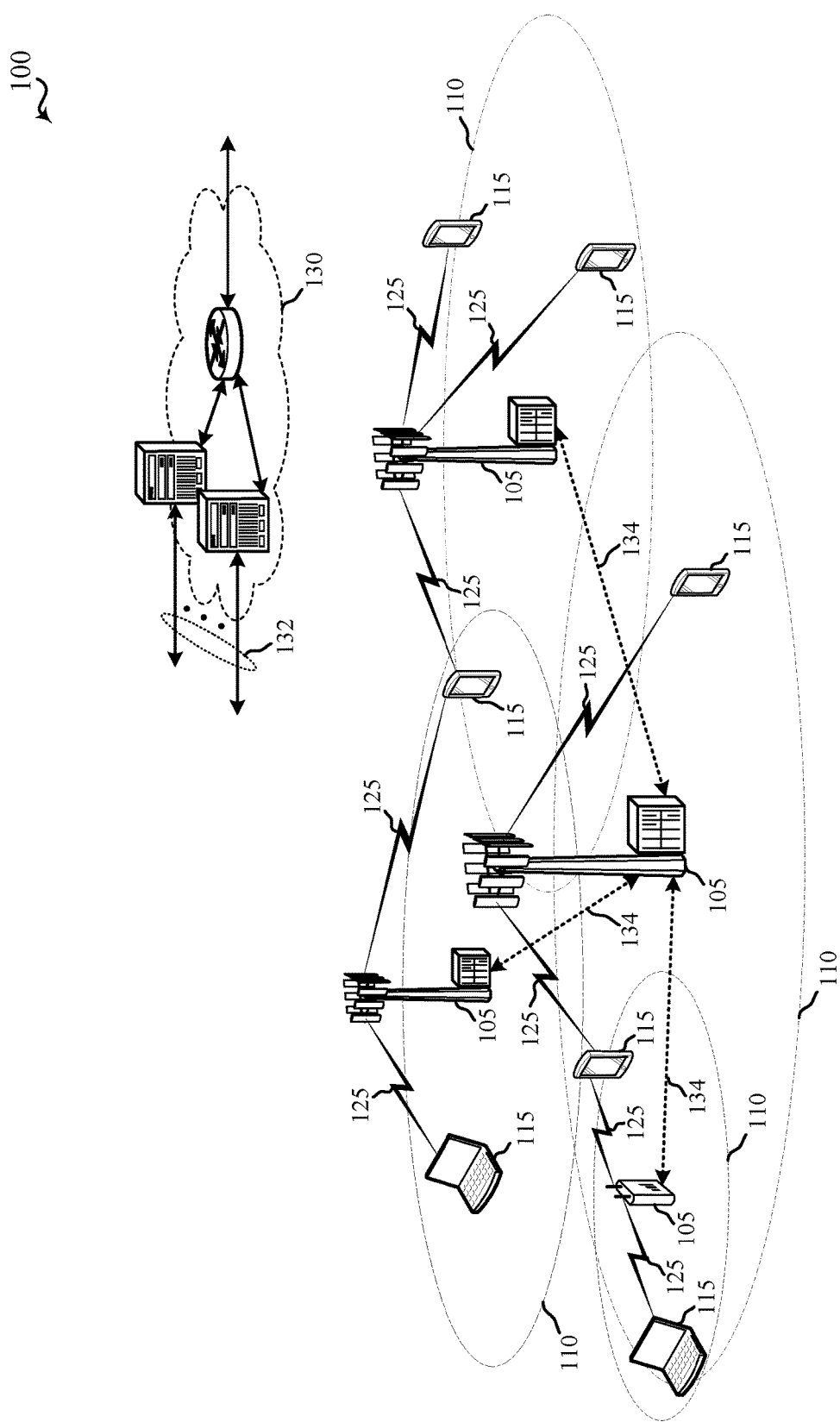
FIG. 1 illustrates an example of a wireless communication system that supports using over-the-air signaling to provide an increased reuse factor in a shared radio frequency spectrum band, in accordance with various aspects of the present disclosure.

FIG. 1 illustrates an example of a wireless communication system 100 that supports using over-the-air signaling to provide an increased reuse factor in a shared radio frequency spectrum band, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via at least one base station antenna. Each of the base station 105 sites may provide communication coverage for a respective geographic coverage area 110. In some examples, a base station 105 may be referred to as a base transceiver station, a radio base station, an access point, a radio transceiver, a NodeB, an eNB, a Home NodeB, a Home eNodeB, or some other suitable terminology. The geographic coverage area 110 for a base station 105 may be divided into sectors making up a portion of the coverage area (not shown). The wireless communication system 100 may include base stations 105 that cover different coverage areas (e.g., macro or small cell base stations). There may be overlapping geographic coverage areas 110 for different technologies.

In some examples, the wireless communication system 100 may include an LTE/LTE-A network. In LTE/LTE-A networks, the term eNB may be used to describe the base stations 105 (or entities including one or more base stations 105). The wireless communication system 100 may be a Heterogeneous LTE/LTE-A network in which different eNBs provide coverage for various geographical regions. For example, each eNB or base station 105 may provide communication coverage for a macro cell, a small cell, or others of cell. The term "cell" can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Physical Data Convergence Protocol (PDCP) layer may be Internet Protocol (IP)-based. A Medium Access Control (MAC) layer may perform packet segmentation and reassembly to communicate over logical channels, and may also perform priority handling and multiplexing of logical channels into transport channels. The MAC layer may also use Hybrid Automatic Repeat reQuest (HARD) to provide retransmission at the MAC layer to improve link efficiency. In the control plane, a Radio Resource Control (RRC) protocol layer may provide establishment, configuration, and maintenance of an RRC connection between a UE 115 and the base stations 105 or core network 130 supporting radio bearers for the user plane data. At the physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. A UE may be able to communicate with various base stations and network equipment, including macro eNBs, small cell eNBs, relay base stations, and the like. A UE may also be able to communicate using different radio access technologies (RATs), such as a cellular radio access technology (RAT) (e.g., an LTE/LTE-A RAT), a Wi-Fi RAT, or other RATs.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

Base stations 105 and UEs 115 may communicate over the communication links 125 using carriers, which may also be referred to as component carriers (CCs), layers, channels, etc. The term "component carrier" or CC may refer to each of the multiple carriers utilized by a UE operating in a carrier aggregation (CA) mode, and may be distinct from other portions of system bandwidth. For instance, a CC may be a relatively narrow-bandwidth carrier susceptible of being utilized independently or in combination with other component carriers. Each CC may provide the same capabilities as an isolated carrier based on release 8 or release 9 of the LTE standard. Multiple CCs may be aggregated or utilized concurrently to provide some UEs 115 with greater bandwidth and, e.g., higher data rates. Thus, individual CCs may be backwards compatible with legacy UEs 115 (e.g., UEs 115 implementing LTE release 8 or release 9); while other UEs 115 (e.g., UEs 115 implementing post-release 8/9 LTE versions), may be configured with multiple CCs in a multi-carrier mode. A carrier used for downlink (DL) transmissions may be referred to as a DL CC, and a carrier used for uplink (UL) transmissions may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, and may also communicate with multiple base stations simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., RRC, etc.) on a per-UE basis. Certain uplink control information (UCI), e.g., acknowledgement (ACK)/negative acknowledgment (NAK), CQI, and scheduling information transmitted on a physical uplink control channel (PUCCH), are carried by the PCell. Additional carriers may be designated as secondary carriers, or secondary component carriers (SCC), which may be served by secondary cells (SCells). Secondary cells may likewise be semi-statically configured on a per-UE basis. In some cases, SCells may not include or be configured to transmit the same control information as the PCell.

In some cases, wireless communication system 100 may utilize enhanced CCs (eCC). An eCC may be characterized by one or more features including: wider bandwidth, shorter symbol duration, shorter transmission time interval (TTI), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that do are not capable of monitoring the whole bandwidth or prefer to use a limited bandwidth (e.g., to conserve power).

In some cases, an eCC may utilize a different symbol duration than other component carriers (CCs), which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 μs). A TTI in eCC may consist of one or multiple symbols. In some cases, the TTI duration (that is, the number of symbols in a TTI) may be variable.

Wider bandwidth and shorter TTIs may be associated with a modified control channel configuration (e.g., an eCC may utilize an enhanced physical downlink control channel (eP-DCCH) for DL control information). For example, one or more control channels of an eCC may utilize frequency division multiplexing (FDM) scheduling to accommodate flexible bandwidth use. Other control channel modifications may include the use of additional control channels (e.g., for evolved multimedia broadcast multicast service (eMBMS) scheduling, or to indicate the duration of variable duration UL and DL bursts), or control channels transmitted at different intervals.

Figure 2:
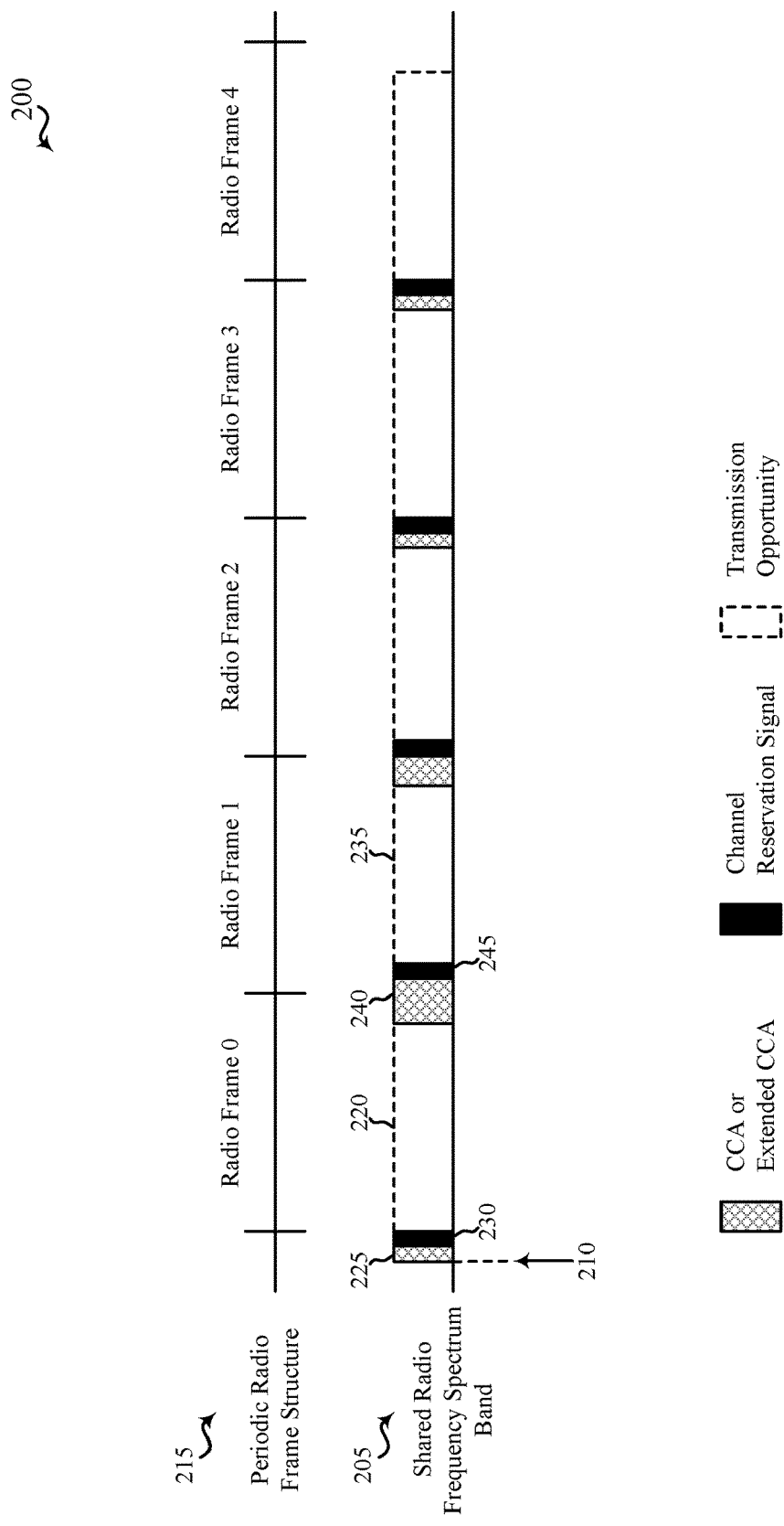
FIG. 2 shows a timing diagram for a device contending for access to a shared radio frequency spectrum band, in accordance with various aspects of the present disclosure.

FIG. 2 shows a timing diagram 200 for a device contending for access to a shared radio frequency spectrum band 205, in accordance with various aspects of the present disclosure. The shared radio frequency spectrum band 205 may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). In some examples, the operations illustrated in the timing diagram 200 may be performed by a device such as one of the base stations 105 or UEs 115 described with reference to FIG. 1.

At a time 210, a device may determine to contend for access to the shared radio frequency spectrum band 205. In some examples, the device may contend for access to the shared radio frequency spectrum band 205 for a fixed transmission opportunity (e.g., one of a number of transmission opportunities that has a fixed and periodic timing with respect to a periodic radio frame structure 215 (e.g., an LTE/LTE-A radio frame structure in a dedicated radio frequency spectrum band). In other examples, the device may contend for access to the shared radio frequency spectrum band 205 for a floating transmission opportunity (e.g., one of a number of transmission opportunities that has an asynchronous timing with respect to the periodic radio frame structure 215).

The device may contend for access to the shared radio frequency spectrum band 205 for a first transmission opportunity 220 by performing, for example, a single CCA 225. Upon winning contention for access to the shared radio frequency spectrum band, the device may transmit a first channel reservation signal 230 (e.g., a CUBS including a Clear-to-Send (CTS) or CTS-to-Self). Other devices that receive the first channel reservation signal 230 may refrain from contending for access to the shared radio frequency spectrum band 205 for a duration (e.g., a reservation time) specified in the first channel reservation signal 230 (e.g., in a network allocation vector (NAV) of the first channel reservation signal 230).

The device may contend for access to the shared radio frequency spectrum band 205 again for a second transmission opportunity 235 by performing, for example, an eCCA 240. Upon winning contention for access to the shared radio frequency spectrum band, the device may transmit a second channel reservation signal 245 (e.g., a CUBS including a CTS or CTS-to-Self). Other devices that receive the second channel reservation signal 245 may refrain from contending for access to the shared radio frequency spectrum band 205 for a duration (e.g., a reservation time) specified in the second channel reservation signal 245 (e.g., in a network allocation vector (NAV) of the second channel reservation signal 245).

Under some scenarios, the first channel reservation signal 230 or the second channel reservation signal 245 may prevent another device from transmitting over the shared radio frequency spectrum band, in parallel with the device performing the operations shown in FIG. 2, even though the transmissions of the two devices would not interfere (or even though interference as a result of the parallel transmissions may be canceled). Techniques described herein therefore use over-the-air signaling to provide an increased reuse factor in a shared radio frequency spectrum band.

Figure 3:
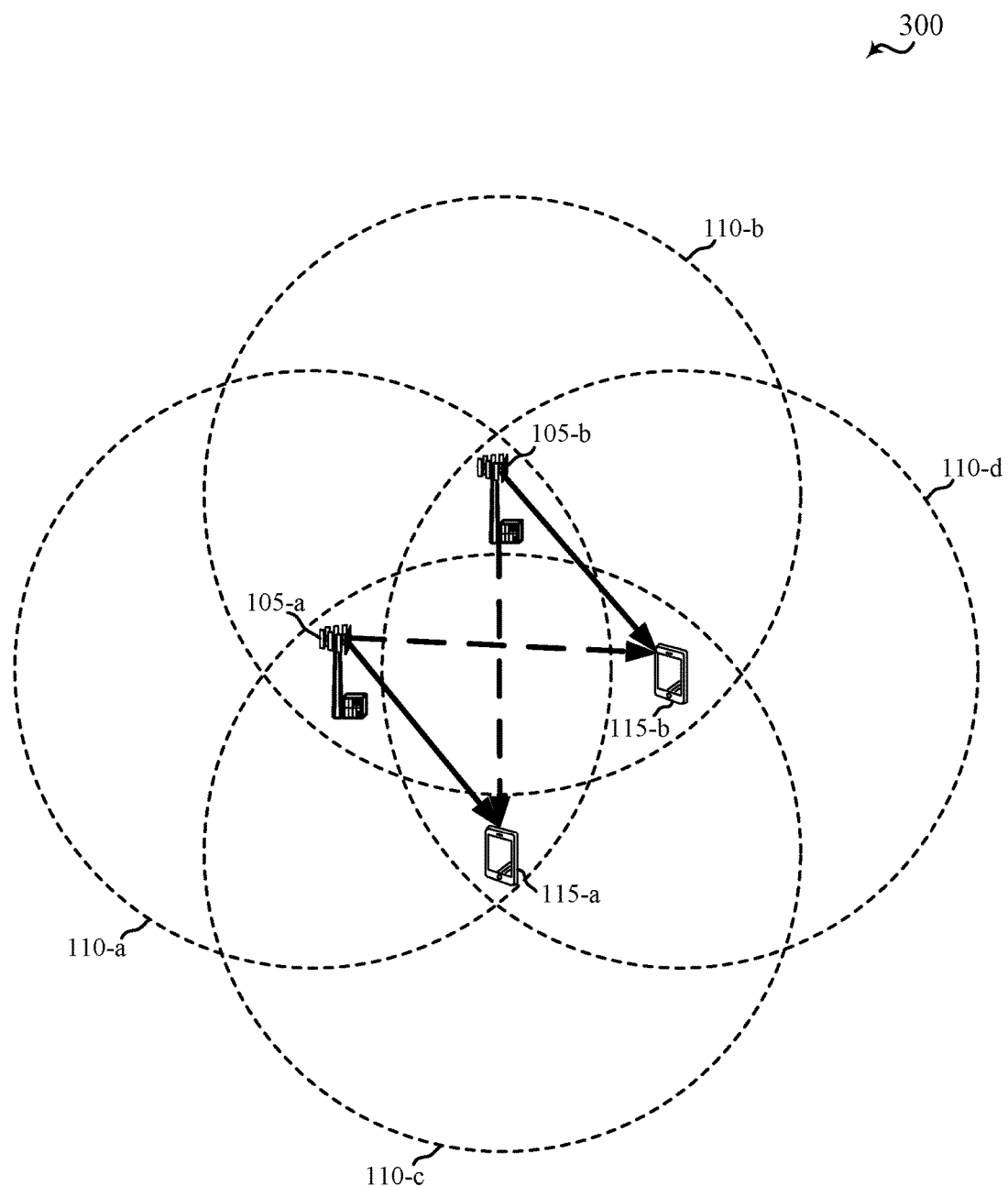
FIG. 3 shows a wireless communication system that supports using over-the-air signaling to provide an increased reuse factor in a shared radio frequency spectrum band, in which devices have overlapping preamble detection ranges, in accordance with various aspects of the present disclosure.

FIG. 3 shows a wireless communication system 300 that supports using over-the-air signaling to provide an increased reuse factor in a shared radio frequency spectrum band, in which devices have overlapping preamble detection ranges, in accordance with various aspects of the present disclosure. By way of example, the devices include a first base station 105-a, a second base station 105-b, a first UE 115-a, and a second UE 115-b. The first UE 115-a may be associated with the first base station 105-a (e.g., the first base station 105-a may be a serving cell for the first UE 115-a), and the second UE 115-b may be associated with the second base station 105-b. The base stations 105-a, 105-b and UEs 115-a, 115-b may be examples of aspects of the base stations 105 and UEs 115 described with reference to FIG. 1. In some examples, the base stations 105-a, 105-b and UEs 115-a, 115-b may communicate over a shared radio frequency spectrum band, and one or more of the base stations 105-a, 105-b or UEs 115-a, 115-b may contend for access to the shared radio frequency spectrum band as described with reference to FIG. 2. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner).

As shown in FIG. 3, the first base station 105-a may be associated with a first geographic coverage area that includes a first preamble detection range 110-a, the second base station 105-b may be associated with a second geographic coverage area that includes a second preamble detection range 110-b, the first UE 115-a may also be associated with a third geographic coverage area that includes a third preamble detection range 110-c, and the second UE 115-b may also be associated with a fourth geographic coverage area that includes a fourth preamble detection range 110-d. When the first base station 105-a wins contention for access to the shared radio frequency spectrum band by determining that the shared radio frequency spectrum band is clear within the first preamble detection range 110-a, the first base station 105-a may initiate a communication with the first UE 115-a. When initiating a frame of communications including a DL portion and an UL portion, the first base station 105-a may transmit a CTS-to-self to clear the shared radio frequency spectrum band and protect the UL portion of the frame of communications.

The CTS-to-self may include a NAV, which may indicate a duration of a channel reservation (e.g., a reservation time) for the communication with the first UE 115-a. The CTS-to-self may be received by other nodes, and the nodes that receive the CTS-to-self may refrain from accessing the shared radio frequency spectrum band for the duration indicated by the NAV. For example, the second base station 105-b may receive the CTS-to-self because the first base station 105-a is within the second preamble detection range 110-b of the second base station 105-b. Upon receiving the CTS-to-self at the second base station 105-b, the second base station 105-b may refrain from accessing the shared radio frequency spectrum band for the duration indicated by the NAV; and thus, no communication occurs between the second base station 105-b and the second UE 115-b for the duration indicated by the NAV. However, transmission of the CTS-to-self by the first base station 105-a may be conservative, in that the first base station 105-a may not need to be protected from transmissions by other nodes during the DL portion of the frame of communications. Thus, the reuse factor of the shared radio frequency spectrum band can be increased, under certain conditions (e.g., when the first UE 115-*a* is outside the second preamble detection range 110-*b*, etc.), if the second base station 105-*b* ignores the CTS-to-self transmitted by the first base station 105-*a* and initiates a communication, between the second base station 105-*b* and the second UE 115-*b*, during the DL portion of the frame of communications between the first base station 105-*a* and the first UE 115-*a*.

For example, before initiating communication between the second base station 105-*b* and the second UE 115-*b* during the DL portion of the frame of communications between the first base station 105-*and* the first UE 115-*a*, the second base station 105-*b* may determine whether communication between the second base station 105-*b* and the second UE 115-*b* may interfere with the DL portion of the frame of communications between the first base station 105-*a* and first UE 115-*a*. The second base station 105-*b* may also determine whether communication between the second base station 105-*b* and the second UE 115-*b* may be interfered with by the DL portion of the frame of communications between the first base station 105-*a* and first UE 115-*a*. When the second base station 105-*b* determines to initiate an uplink transmission from the second UE 115-*b*, the second base station 105-*b* may determine whether the DL portion of the frame of communications between the first base station 105-*a* and the first UE 115-*a* may interfere with the second base station's reception of the UL transmission. When the second base station 105-*b* determines to initiate a downlink transmission to the second UE 115-*b*, the second UE 115-*b* may determine whether the DL portion of the frame of communications between the first base station 105-*a* and the first UE 115-*a* may interfere with the second UE's reception of the DL burst. The second UE 115-*b* may then transmit an indication of its determination to the second base station 105-*b*.

As described in greater detail with reference to FIGS. 4 and 5, the second base station 105-*b* or second UE 115-*b* may determine whether the frame of communications between the first base station 105-*a* and the first UE 115-*a* interferes with its reception of a transmission based on a receipt of signals such as the CTS-to-self transmitted by the first base station 105-*a*, a PFFICH transmitted by the first base station 105-*a*, or a CTS transmitted by the first UE 115-*a*. In various examples, a CTS-to-self transmitted by the first base station 105-*a* and a CTS transmitted by the first UE 115-*a* may each include a NAV, and the PFFICH may include information on the duration of the DL portion of the frame of communications between the first base station 105-*a* and first UE 115-*a*.

Figure 4:
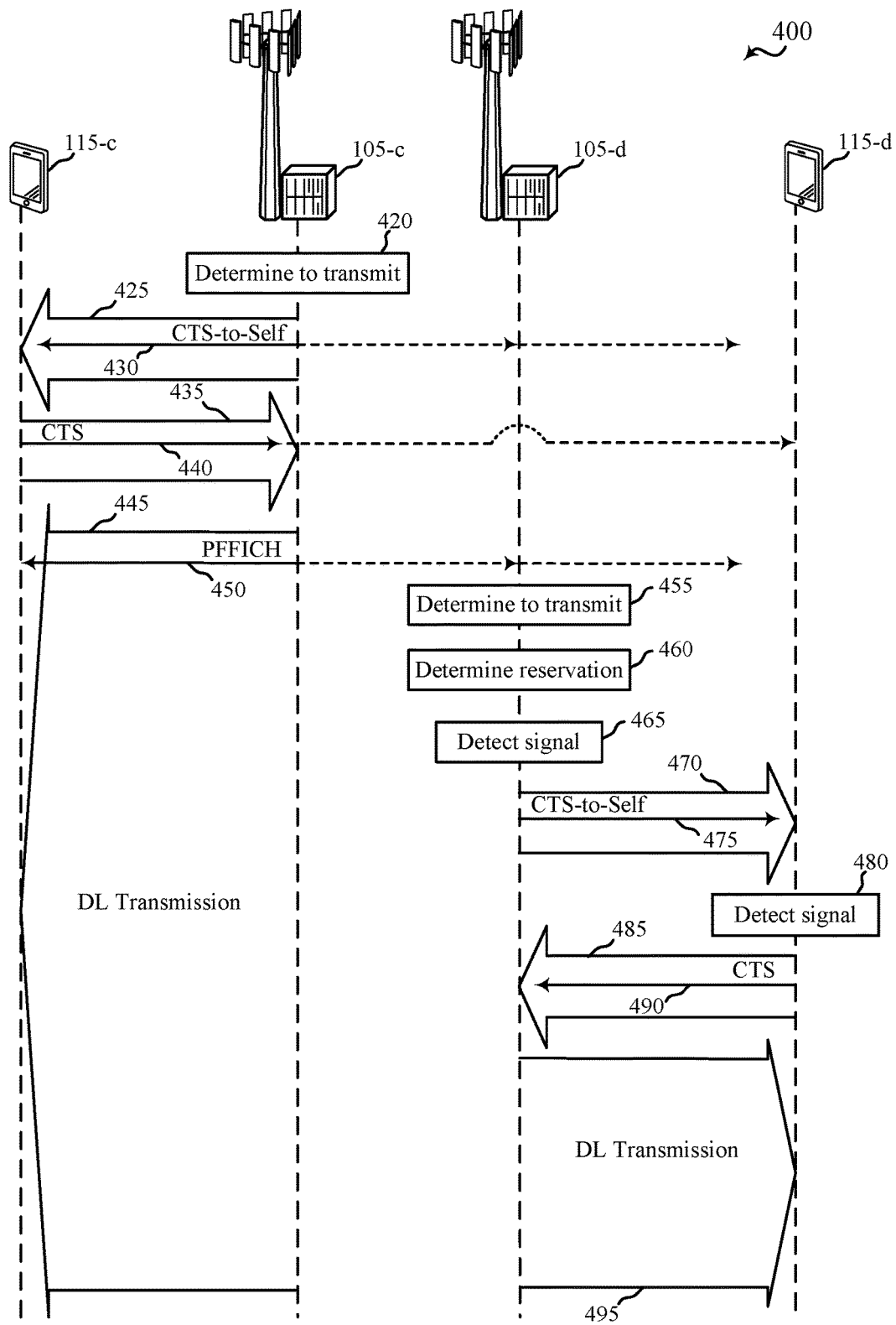
FIGS. 4 and 5 show message flows between devices of wireless communication systems that support using over-the-air signaling to provide an increased reuse factor in a shared radio frequency spectrum band, in accordance with various aspects of the present disclosure.

FIG. 4 shows a message flow between devices of a wireless communication system 400 that supports using over-the-air signaling to provide an increased reuse factor in a shared radio frequency spectrum band, in accordance with various aspects of the present disclosure. By way of example, the wireless communication system 400 includes a first base station 105-*c*, a second base station 105-*d*, a first UE 115-*c*, and a second UE 115-*d*. The first UE 115-*c* may be associated with the first base station 105-*c* (e.g., the first base station 105-*c* may be a serving cell for the first UE 115-*c*), and the second UE 115-*d* may be associated with the second base station 105-*d*. The base stations 105-*c*, 105-*d* and UEs 115-*c*, 115-*d* may be examples of aspects of the base stations 105 and UEs 115 described with reference to FIGS. 1 and 3. In some examples, the base stations 105-*c*, 105-*d* and UEs 115-*c*, 115-*d* may communicate over a shared radio frequency spectrum band, and one or more of the base stations 105-*c*, 105-*d* or UEs 115-*c*, 115-*d* may contend for access to the shared radio frequency spectrum band as described with reference to FIG. 2. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner).

At 420, the first base station 105-*c* may determine to transmit a DL transmission 445 over the shared radio frequency spectrum band for the first UE 115-*c*. Prior to transmitting the DL transmission 445, the first base station 105-*c* may transmit a pre-grant communication 425 associated with the DL transmission 445. The pre-grant communication 425 may include a CTS-to-self 430. The CTS-to-self 430 may include a NAV, which may indicate a duration of a channel reservation (e.g., a reservation time) for completing a DL pre-grant procedure (including transmission of the pre-grant communication 425) and transmitting the DL transmission 445. The CTS-to-self 430 may in some cases be received by the first UE 115-*c*, the second base station 105-*d*, and/or the second UE 115-*d*. By way of example, FIG. 4 presumes the CTS-to-self 430 is received by the first UE 115-*c* and the second base station 105-*d*, but not received, or received below a threshold interference level, at the second UE 115-*d* (e.g., because the second base station 105-*d*, second UE 115-*d*, first base station 105-*c*, and first UE 115-*c* may be positioned with respect to each other's preamble detection ranges similarly to positions of corresponding devices shown in FIG. 3).

When the pre-grant communication 425 is received by the first UE 115-*c*, the first UE 115-*c* may respond to the pre-grant communication 425 by transmitting a pre-grant acknowledgement (ACK) signal 435 over the shared radio frequency spectrum band, which may include a CTS 440. The CTS 440 may include a NAV, which may indicate a remaining duration of the channel reservation (e.g., a remaining reservation time) for completing the DL pre-grant procedure and receiving the DL transmission 445.

Upon receiving the pre-grant ACK signal 435, the first base station 105-*c* may begin transmission of the DL transmission 445 over the shared radio frequency spectrum band. The first base station 105-*c* may transmit a DL transmission 445, which may include a PFFICH 450 at the beginning of the DL transmission 445. PFFICH 450 may indicate a duration of a channel reservation (e.g., a reservation time) for the DL transmission 445. Transmission of the PFFICH 450 may conclude the DL pre-grant procedure initiated by the first base station 105-*c*.

At 455, the second base station 105-*d* may determine to transmit a DL transmission 495 to the second UE 115-*d*. Before transmitting the DL transmission 495, and at 460, the second base station 105-*d* may determine whether the shared radio frequency spectrum band is already reserved by another device. As part of the process performed at 460, the second base station 105-*d* may detect the channel reservation made by the first base station 105-*c* (e.g., by detecting the CTS-to-self 430 or PFFICH 450 and determining that the reservation time indicated therein has not expired). In some examples, the channel reservation may be detected presently, based on current transmissions over the shared radio frequency spectrum band; in other examples, the channel reservation may be detected by accessing a database of previously detected channel reservations.

Conventionally, the second base station 105-*d* would delay transmission of the DL transmission 495 upon determining that the shared radio frequency spectrum band is already reserved by another device. However, in FIG. 4, at 465, the second base station 105-*d* may determine, based at least in part on the channel reservation by the first base station 105-*c*, whether a channel reservation signal (e.g., the CTS 440) corresponding to the channel reservation is detected over the shared radio frequency spectrum band. Similarly to how the channel reservation is detected at 460, the channel reservation signal may be detected presently, based on current transmissions over the shared radio frequency spectrum band, or by accessing a database of previously detected channel reservation signals. Upon determining that the channel reservation signal is not detected, the second base station 105-*d* may initiate a DL pre-grant procedure; otherwise, the second base station 105-*d* may defer transmission of the DL transmission 495 until after the reservation time associated with the channel reservation identified at 460 is expired. When the second base station 105-*d* does not identify a channel reservation by another device at 460, or when the second base station 105-*d* identifies a channel reservation at 460 but the channel reservation is expired, the second base station 105-*d* may skip the operation(s) at 465.

The DL pre-grant procedure initiated by the second base station 105-*d* may begin with the second base station 105-*d* transmitting a pre-grant communication 470 associated with the DL transmission 495. The pre-grant communication 470 may be transmitted over the shared radio frequency spectrum band and include a CTS-to-self 475. The CTS-to-self 475 may include a NAV, which NAV may indicate a duration of a channel reservation (e.g., a reservation time) for completing the DL pre-grant procedure and transmitting the DL transmission 495.

Upon receiving the pre-grant communication 470, the second UE 115-*d* may determine, at block 480, whether a channel reservation signal (e.g., the CTS-to-self 430, the PFFICH 450, etc.) is detected over the shared radio frequency spectrum band. Upon determining that the channel reservation signal is detected, the second UE 115-*d* may determine whether the reservation time indicated by the NAV included in the CTS-to-self 430 or PFFICH 450 is expired. In some cases, the second UE 115-*d* may also determine an interference level (e.g., signal strength) associated with the CTS-to-self 430 or PFFICH 450. Upon determining that the CTS-to-self 430 or PFFICH 450 is not detected, or that the CTS-to-self 430 or PFFICH 450 is detected and the reservation time associated with the CTS-to-self 430 or PFFICH 450 is expired, or that the CTS-to-self 430 or PFFICH 450 is detected and the interference level associated with the CTS-to-self 430 or PFFICH 450 is below a threshold interference level, the second UE 115-*d* may continue the DL pre-grant procedure by transmitting a pre-grant ACK signal 485 over the shared radio frequency spectrum band, which may include a CTS 490. The CTS 490 may include a NAV, which NAV may indicate a remaining duration of the channel reservation (e.g., a remaining reservation time) for completing the DL pre-grant procedure and receiving the DL transmission 495.

When the second UE 115-*d* determines that the CTS-to-self 430 or PFFICH 450 is received and the interference level associated with the CTS-to-self 430 or PFFICH 450 is above a second threshold interference level, the second UE 115-*d* may compile CQI feedback, based at least in part on the interference level associated with the CTS-to-self 430 or PFFICH 450, to adjust a modulation and coding scheme (MCS) of the DL transmission 495. The CQI feedback may transmitted along with the pre-grant ACK signal 485.

Upon receiving the pre-grant ACK signal 485, the second base station 105-*d* may begin transmission of the DL transmission 495. The second base station 105-*d* may transmit a PFFICH at the beginning of the DL transmission 495, which PFFICH may indicate a duration of a channel reservation (e.g., a channel reservation time) for the DL transmission 495. Transmission of the PFFICH may conclude the DL pre-grant procedure initiated by the second base station 105-*d*.

The described operations performed by the second base station 105-*d* and second UE 115-*d*, in FIG. 4, help to ensure that transmission of the DL transmission 495 concurrently with transmission of the DL transmission 445, will not interfere with reception of the DL transmission 445 at the first UE 115-*c* or reception of the DL transmission 495 at the second UE 115-*d*.

Figure 5:
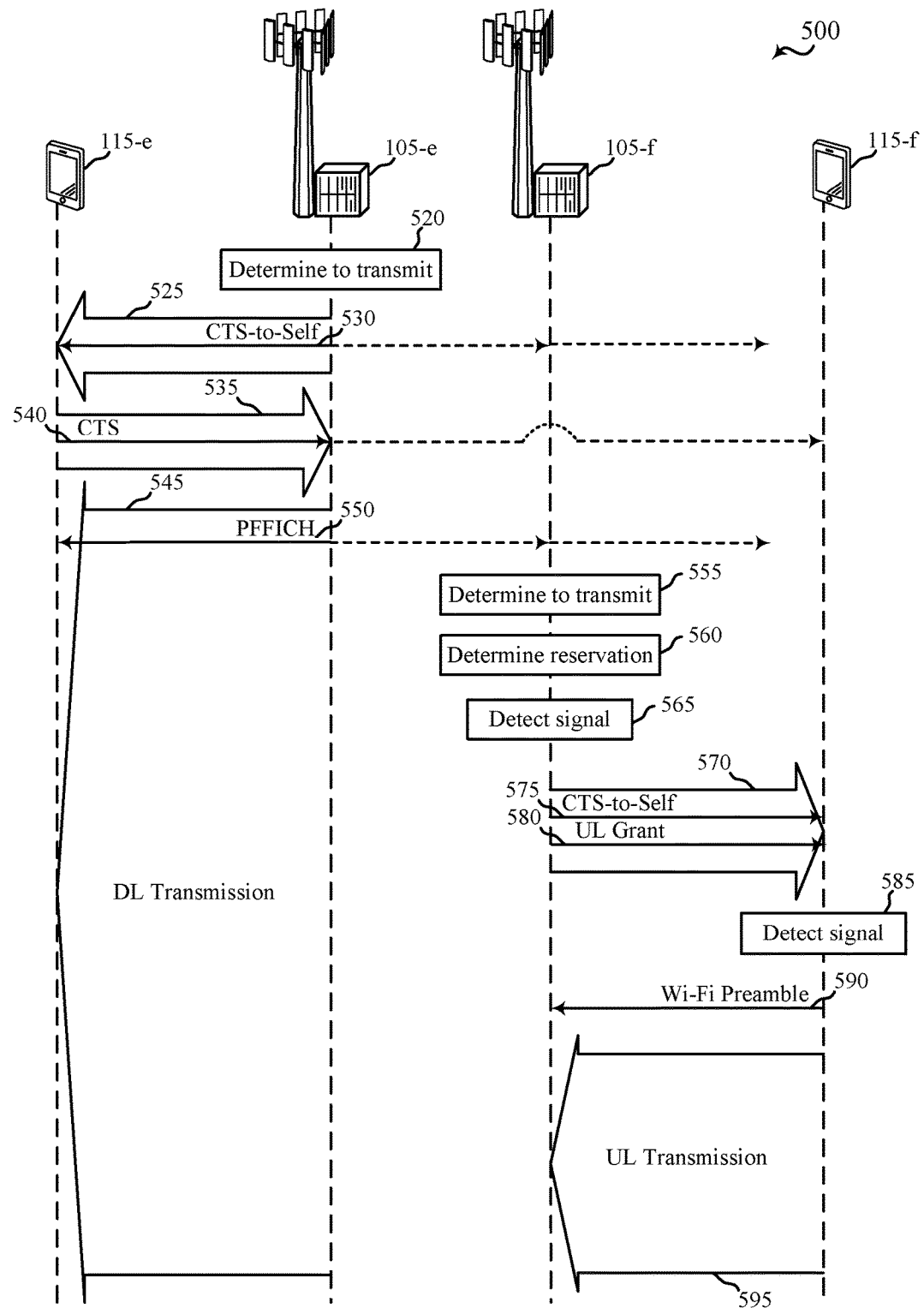

FIG. 5 shows a message flow between devices of a wireless communication system 500 that supports using over-the-air signaling to provide an increased reuse factor in a shared radio frequency spectrum band, in accordance with various aspects of the present disclosure. By way of example, the wireless communication system 500 includes a first base station 105-*e*, a second base station 105-*f*, a first UE 115-*e*, and a second UE 115-*f*. The first UE 115-*e* may be associated with the first base station 105-*e* (e.g., the first base station 105-*e* may be a serving cell for the first UE 115-*e*), and the second UE 115-*f* may be associated with the second base station 105-*f*. The base stations 105-*e*, 105-*f* and UEs 115-*e*, 115-*f* may be examples of aspects of the base stations 105 and UEs 115 described with reference to FIGS. 1, 3, and 4. In some examples, the base stations 105-*e*, 105-*f* and UEs 115-*e*, 115-*f* may communicate over a shared radio frequency spectrum band, and one or more of the base stations 105-*e*, 105-*f* or UEs 115-*e*, 115-*f* may contend for access to the shared radio frequency spectrum band as described with reference to FIG. 2. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner).

At 520, the first base station 105-*e* may determine to transmit a DL transmission 545 over the shared radio frequency spectrum band for the first UE 115-*e*. Prior to transmitting the DL transmission 545, the first base station 105-*e* may transmit a pre-grant communication 525 associated with the DL transmission 545. The pre-grant communication 525 may include a CTS-to-self 530. The CTS-to-self 530 may include a NAV, which NAV may indicate a duration of a channel reservation (e.g., a reservation time) for completing a DL pre-grant procedure (including transmission of the pre-grant communication 525) and transmitting the DL transmission 545. The CTS-to-self 530 may in some cases be received by the first UE 115-*e*, the second base station 105-*f*, and/or the second UE 115-*f*. By way of example, FIG. 5 presumes the CTS-to-self 530 is received by the first UE 115-*e* and the second base station 105-*r*, but not received, or received below a threshold interference level, at the second UE 115-*r* (e.g., because the second base station 105-*f*, second UE 115-*f*, first base station 105-*e*, and first UE 115-*e* may be positioned with respect to each other's preamble detection ranges similarly positions of corresponding devices shown in FIG. 3).

When the pre-grant communication 525 is received by the first UE 115-*e*, the first UE 115-*e* may respond to the pre-grant communication 525 by transmitting a pre-grant ACK signal 535 over the shared radio frequency spectrum band, which may include a CTS 440. The CTS 540 may include a NAV, which NAV may indicate a remaining duration of the channel reservation (e.g., a remaining reservation time) for completing the DL pre-grant procedure and receiving the DL transmission 545.

Upon receiving the pre-grant ACK signal 535, the first base station 105-*e* may begin transmission of the DL transmission 545 over the shared radio frequency spectrum band. The first base station 105-*e* may transmit a DL transmission 545, which may include a PFFICH 450 at the beginning of the DL transmission. PFFICH 550 may indicate a duration of a channel reservation (e.g., a reservation time) for the DL transmission 545. Transmission of the PFFICH 550 may conclude the DL pre-grant procedure initiated by the first base station 105-*e*.

At 555, the second base station 105-*f* may determine to schedule a UL transmission 595 from the second UE 115-*f*. Before scheduling the UL transmission 595, and at 560, the second base station 105-*f* may determine whether the shared radio frequency spectrum band is already reserved by another device. As part of the process performed at 560, the second base station 105-*f* may detect the channel reservation made by the first base station 105-*e* (e.g., by detecting the CTS-to-self 530 or PFFICH 550 and determining that the reservation time indicated therein has not expired). In some examples, the channel reservation may be detected presently, based on current transmissions over the shared radio frequency spectrum band; in other examples, the channel reservation may be detected by accessing a database of previously detected channel reservations. In some examples, the second base station 105-*f* may determine an interference level associated with the CTS-to-self 530, and identify a MCS for the UL transmission 595 based at least in part on the interference level.

Conventionally, the second base station 105-*f* would delay scheduling of the UL transmission 595 upon determining that the shared radio frequency spectrum band is already reserved by another device. However, in FIG. 5, at 565, the second base station 105-*f* may determine, based at least in part on the channel reservation, whether a channel reservation signal (e.g., the CTS 540) corresponding to the channel reservation by the first base station 105-*e* is detected over the shared radio frequency spectrum band. Similarly to how the channel reservation is detected at 560, the channel reservation signal may be detected presently, based on current transmissions over the shared radio frequency spectrum band, or by accessing a database of previously detected channel reservation signals. Upon determining that the channel reservation signal is not detected, the second base station 105-*f* may schedule the UL transmission 595 and transmit a grant of resources (e.g., a UL grant 580) to the second UE 115-*f*; otherwise, the second base station 105-*f* may defer scheduling the UL transmission 595 until after the reservation time associated with the channel reservation identified at 560 is expired. When the second base station 105-*f* does not identify a channel reservation by another device at 560, or when the second base station 105-*f* identifies a channel reservation at 560 but the channel reservation is expired, the second base station 105-*f* may skip the operation(s) at 565, schedule the UL transmission 595, and transmit the UL grant 580 to the second UE 115-*f*.

Upon determining that the channel reservation signal (e.g., the CTS 540) is not detected, the second base station 105-*f* may transmit a communication 570 over the shared radio frequency spectrum band. The second base station 105-*f* may also transmit the communication 570 upon determining that the channel reservation signal (e.g., the CTS 540) is detected, if short burst interference is allowed for the first UE 115-*e* (e.g., when relying on code block (CB) ACK/NAK of the first UE 115-*e*). The communication 570 may include a CTS-to-self 575 and the UL grant 580. The communication 570 may also include a MCS identified for the UL transmission 595. The CTS-to-self 575 may include a NAV, which NAV may indicate a duration of a channel reservation (e.g., a reservation time) for transmitting/processing the UL grant 580 and transmitting the UL transmission 595.

Upon receiving the communication 570, the second UE 115-*f* may determine, at block 585, whether a channel reservation signal (e.g., the CTS 540) is detected over the shared radio frequency spectrum band. Upon determining that the channel reservation signal (e.g., the CTS 540, the PFFICH 550, etc.) is detected, the second UE 115-*f* may determine whether the reservation time indicated by the NAV included in the CTS 540 or PFFICH 550 is expired. Upon determining that the CTS 540 or PFFICH 550 is not detected, or that the CTS 540 or PFFICH 550 is detected and the reservation time indicated by the NAV included in the CTS 540 or PFFICH 550 is expired, the second UE 115-*f* may transmit a Wi-Fi preamble 590. The Wi-Fi preamble 590 may include a length field indicating a duration of a channel reservation (e.g., a reservation time) for transmitting the UL transmission 595. The second UE 115-*f* may also transmit the UL transmission 595, as scheduled.

In some cases, the duration of the UL transmission 595 may be indicated in the UL grant 580 or elsewhere, or chosen by the second UE 115-*f*, to be shorter than the channel reservation by the first base station 105-*e*, because channel conditions may improve after the DL transmission 545 concludes, and the second base station 105-*f* may be able to schedule a next UL transmission at a higher MCS, for example.

The described operations performed by the second base station 105-*f* and second UE 115-*f*, in FIG. 5, help to ensure that transmission of the UL transmission 595 concurrently with the DL transmission 545, will not interfere with reception of the DL transmission 545 at the first UE 115-*e* or reception of the UL transmission 595 at the second base station 105-*f*.

Figure 6:
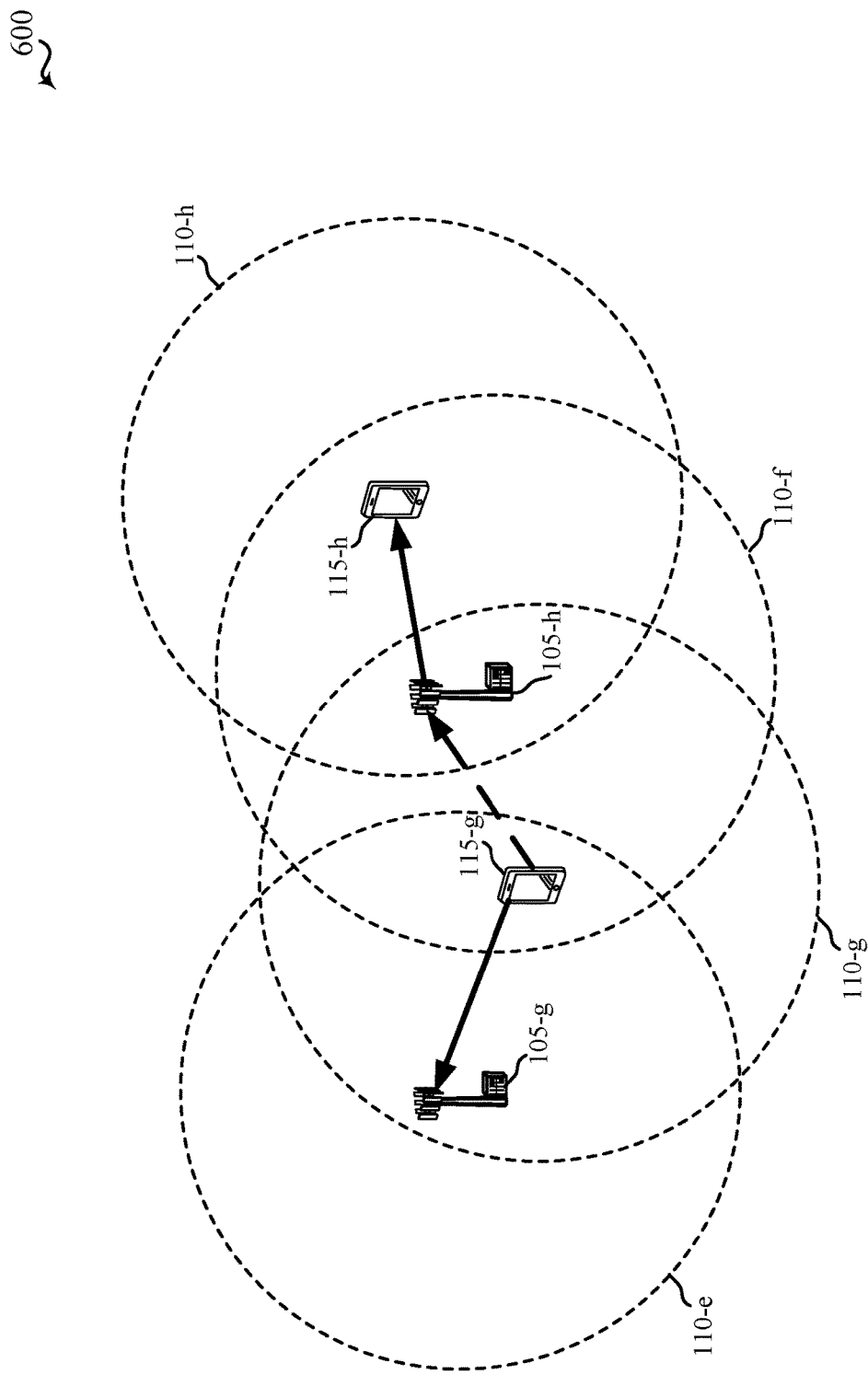
FIG. 6 shows a wireless communication system that supports using over-the-air signaling to provide an increased reuse factor in a shared radio frequency spectrum band, in which devices have overlapping preamble detection ranges, in accordance with various aspects of the present disclosure.

FIG. 6 shows a wireless communication system 600 that supports using over-the-air signaling to provide an increased reuse factor in a shared radio frequency spectrum band, in which devices have overlapping preamble detection ranges, in accordance with various aspects of the present disclosure. By way of example, the devices include a first base station 105-*g*, a second base station 105-*h*, a first UE 115-*g*, and a second UE 115-*h*. The first UE 115-*g* may be associated with the first base station 105-*g* (e.g., the first base station 105-*g* may be a serving cell for the first UE 115-*g*), and the second UE 115-*h* may be associated with the second base station 105-*h*. The base stations 105-*g*, 105-*h* and UEs 115-*g*, 115-*h* may be examples of aspects of the base stations 105 and UEs 115 described with reference to FIGS. 1 and 3-5. In some examples, the base stations 105-*g*, 105-*h* and UEs 115-*g*, 115-*h* may communicate over a shared radio frequency spectrum band, and one or more of the base stations 105-*g*, 105-*h* or UEs 115-*g*, 115-*h* may contend for access to the shared radio frequency spectrum band as described with reference to FIG. 2. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner).

As shown in FIG. 6, the first base station 105-g may be associated with a first preamble detection range 110-e, the second base station 105-h may be associated with a second preamble detection range 110-f, the first UE 115-g may be associated with a third preamble detection range 110-g, and the second UE 115-h may be associated with a fourth preamble detection range 110-h. Before the first UE 115-g transmits a UL transmission over the shared radio frequency spectrum band to the first base station 105-g, the first UE 115-g may transmit a CTS-to-self to clear the shared radio frequency spectrum band. The CTS-to-self may include a NAV, which NAV may indicate a duration of a channel reservation (e.g., a reservation time) for the UL transmission to the first base station 105-g. The CTS-to-self may not be transmitted to protect the UL transmission, but to reduce the chance that the UL transmission will interfere with receptions at other devices (e.g., a transmitter receiving the CTS-to-self will not start a transmission to a nearby receiver that will experience interference from the UL transmission). However, transmitters that are far away from the first UE 115-g may not receive the CTS-to-self, and may transmit to nearby receivers that will experience from the UL transmission. Thus, transmission of the CTS-to-self does not eliminate potential interference scenarios related to transmission of the UL transmission.

Techniques described in the present disclosure provide for an increase in the reuse factor of the shared radio frequency spectrum band by enabling transmissions between the second base station 105-h and the second UE 115-h during the UL transmission from the first UE 115-g to the first base station 105-g. The transmissions between the second base station 105-h and the second UE 115-h may be enabled, even though the first UE 115-g is within the second preamble detection range 110-f of the second base station 105-h. For example, because the first base station 105-g and second UE 115-h are distant from one another, and the first base station 105-g and second base station 105-h are distant from one another, the UL transmission from the first UE 115-g to the first base station 105-g will not interfere with reception at the second UE 115-h, and transmissions between the second base station 105-h and the second UE 115-h will not interfere with reception at the first base station 105-g.

The transmissions between the second base station 105-h and the second UE 115-h, during the UL transmission from the first UE 115-g to the first base station 105-g, are enabled by having the first UE 115-g transmit a Wi-Fi preamble instead of a CTS-to-self when making a UL transmission to the first base station 105-g. The Wi-Fi preamble may include a length field indicating a duration of the uplink transmission.

As described in greater detail with reference to FIGS. 7 and 8, the second base station 105-h or second UE 115-h may determine whether a UL transmission from the first UE 115-g (or from a Wi-Fi transmitter transmitting a Request-to-Send (RTS) signal) to the first base station 105-g (or to a Wi-Fi receiver transmitting a CTS signal) interferes with its reception of a transmission based on a receipt of signals such as the Wi-Fi preamble transmitted by the first UE 115-g or a CTS-to-self transmitted by the first base station 105-g. The CTS-to-self transmitted by the first base station 105-g may include a NAV.

Figure 7:
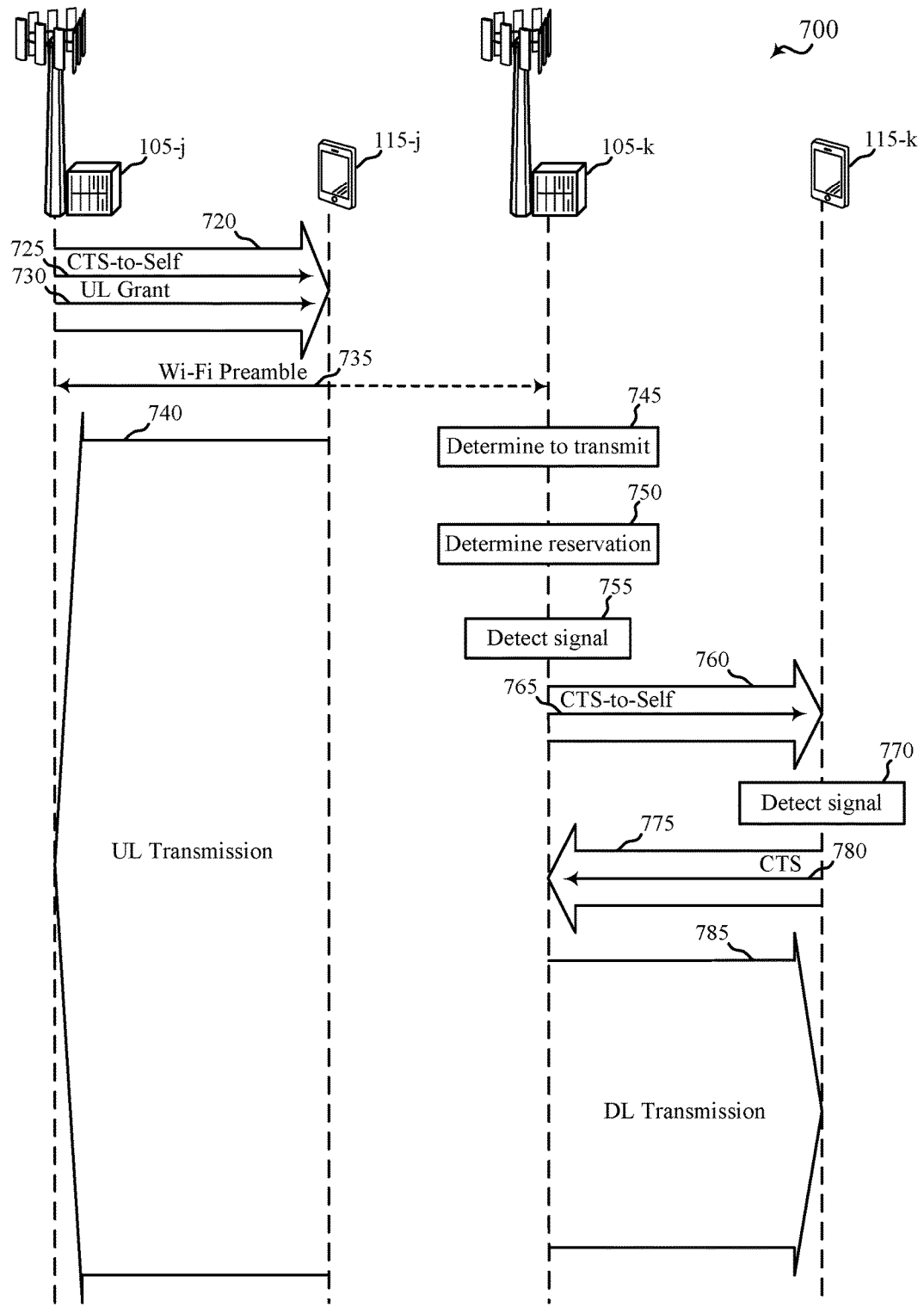
FIGS. 7 and 8 show a message flows between devices of wireless communication systems that support using over-the-air signaling to provide an increased reuse factor in a shared radio frequency spectrum band, in accordance with various aspects of the present disclosure.

FIG. 7 shows a message flow between devices of a wireless communication system 700 that supports using over-the-air signaling to provide an increased reuse factor in a shared radio frequency spectrum band, in accordance with various aspects of the present disclosure. By way of example, the wireless communication system 700 includes a first base station 105-j, a second base station 105-k, a first UE 115-j, and a second UE 115-k. The first UE 115-j may be associated with the first base station 105-j (e.g., the first base station 105-j may be a serving cell for the first UE 115-j), and the second UE 115-k may be associated with the second base station 105-k. The base stations 105-j, 105-k and UEs 115-j, 115-k may be examples of aspects of the base stations 105 and UEs 115 described with reference to FIGS. 1 and 3-6. In some examples, the base stations 105-j, 105-k and UEs 115-j, 115-k may communicate over a shared radio frequency spectrum band, and one or more of the base stations 105-j, 105-k or UEs 115-j, 115-k may contend for access to the shared radio frequency spectrum band as described with reference to FIG. 2. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner).

The first base station 105-j may determine to schedule a UL transmission 740 from the first UE 115-j and transmit a communication 720 over the shared radio frequency spectrum band. The communication 720 may include a CTS-to-self 725 and a UL grant 730. The communication 720 may also include a MCS identified for the UL transmission 740. The CTS-to-self 725 may include a NAV, which NAV may indicate a duration of a channel reservation (e.g., a reservation time) for transmitting/processing the UL grant 730 and transmitting the UL transmission 740.

Upon receiving the communication 720, the first UE 115-j may transmit a Wi-Fi preamble 735. The Wi-Fi preamble 735 may include a length field indicating a duration of a channel reservation (e.g., a reservation time) for transmitting the UL transmission 740. The first UE 115-j may also transmit the UL transmission 740, as scheduled.

At 745, the second base station 105-k may determine to transmit a DL transmission 785 for the second UE 115-k. Before transmitting the DL transmission 785, and at 750, the second base station 105-k may determine whether the shared radio frequency spectrum band is already reserved by another device. As part of the process performed at 750, the second base station 105-k may detect the channel reservation made by the first UE 115-j (e.g., by detecting the Wi-Fi preamble 735 and determining that the reservation time indicated therein has not expired). In some examples, the channel reservation may be detected presently, based on current transmissions over the shared radio frequency spectrum band; in other examples, the channel reservation may be detected by accessing a database of previously detected channel reservations.

Conventionally, the second base station 105-k would delay transmission of the DL transmission 785 upon determining that the shared radio frequency spectrum band is already reserved by another device. However, in FIG. 7, the second base station 105-k may determine, at 755, based at least in part on the channel reservation by the first UE 115-j, whether a channel reservation signal (e.g., the CTS-to-Self 725) corresponding to the channel reservation is detected over the shared radio frequency spectrum band. Similarly to how the channel reservation is detected at 750, the channel reservation signal may be detected presently, based on current transmissions over the shared radio frequency spectrum band, or by accessing a database of previously detected channel reservation signals. Upon determining that the channel reservation signal is not detected, the second base station 105-*k* may initiate a DL pre-grant procedure; otherwise, the second base station 105-*k* may defer transmission of the DL transmission 785 until after the reservation time associated with the channel reservation identified at 750 is expired. When the second base station 105-*k* does not identify a channel reservation by another device at 750, or when the second base station 105-*k* identifies a channel reservation at 750 but the channel reservation is expired, the second base station 105-*k* may skip the operation(s) at 755.

The DL pre-grant procedure initiated by the second base station 105-*k* may begin with the second base station 105-*k* transmitting a pre-grant communication 760 associated with the DL transmission 785. The pre-grant communication 760 may be transmitted over the shared radio frequency spectrum band and may include a CTS-to-self 765. The CTS-to-self 765 may include a NAV, which NAV may indicate a duration of a channel reservation (e.g., a reservation time) for completing the DL pre-grant procedure and transmitting the DL transmission 785.

Upon receiving the pre-grant communication 760, the second UE 115-*k* may determine, at block 770, whether a channel reservation signal (e.g., the Wi-Fi preamble 735) is detected over the shared radio frequency spectrum band. Upon determining that the channel reservation signal is detected, the second UE 115-*k* may determine whether the reservation time indicated by the length field included in the Wi-Fi preamble 735 has expired. In some cases, the second UE 115-*k* may also determine an interference level (e.g., signal strength) associated with the Wi-Fi preamble 735. Upon determining that the Wi-Fi preamble 735 is not detected, or that the Wi-Fi preamble 735 is detected and the reservation time associated with the Wi-Fi preamble 735 has expired, or that the Wi-Fi preamble 735 is detected and the interference level associated with the Wi-Fi preamble 735 is below a threshold interference level, the second UE 115-*k* may continue the DL pre-grant procedure by transmitting a pre-grant ACK signal 775 over the shared radio frequency spectrum band, which may include a CTS 780. The CTS 780 may include a NAV, which NAV may indicate a remaining duration of the channel reservation (e.g., a remaining reservation time) for completing the DL pre-grant procedure and receiving the DL transmission 785.

When the second UE 115-*k* determines that the Wi-Fi preamble 735 is received and the interference level associated with the Wi-Fi preamble 735 is above a second threshold interference level, the second UE 115-*k* may compile CQI feedback, based at least in part on the interference level associated with the Wi-Fi preamble 735, to adjust a MCS of the DL transmission 785. The CQI feedback may transmitted along with the pre-grant ACK signal 775.

Upon receiving the pre-grant ACK signal 775, the second base station 105-*k* may begin transmission of the DL transmission 785. In some cases, the duration of the DL transmission 785 may be chosen to be shorter than the channel reservation by the first UE 115-*j*, because channel conditions may improve after the UL transmission 740 concludes, and the second base station 105-*n* may be able to transmit a next DL transmission at a higher MCS, for example. The second base station 105-*k* may transmit a PFFICH at the beginning of the DL transmission 785, and the PFFICH may indicate a duration of a channel reservation (e.g., a channel reservation time) for the DL transmission 785. Transmission of the PFFICH may conclude the DL pre-grant procedure initiated by the second base station 105-*k*.

The operations performed by the second base station 105-*k* and second UE 115-*k*, in FIG. 7, help to ensure that transmission of the DL transmission 785 concurrently with transmission of the UL transmission 740, will not interfere with reception of the UL transmission 740 at the first base station 105-*j* or reception of the DL transmission 785 at the second UE 115-*k*.

Figure 8:
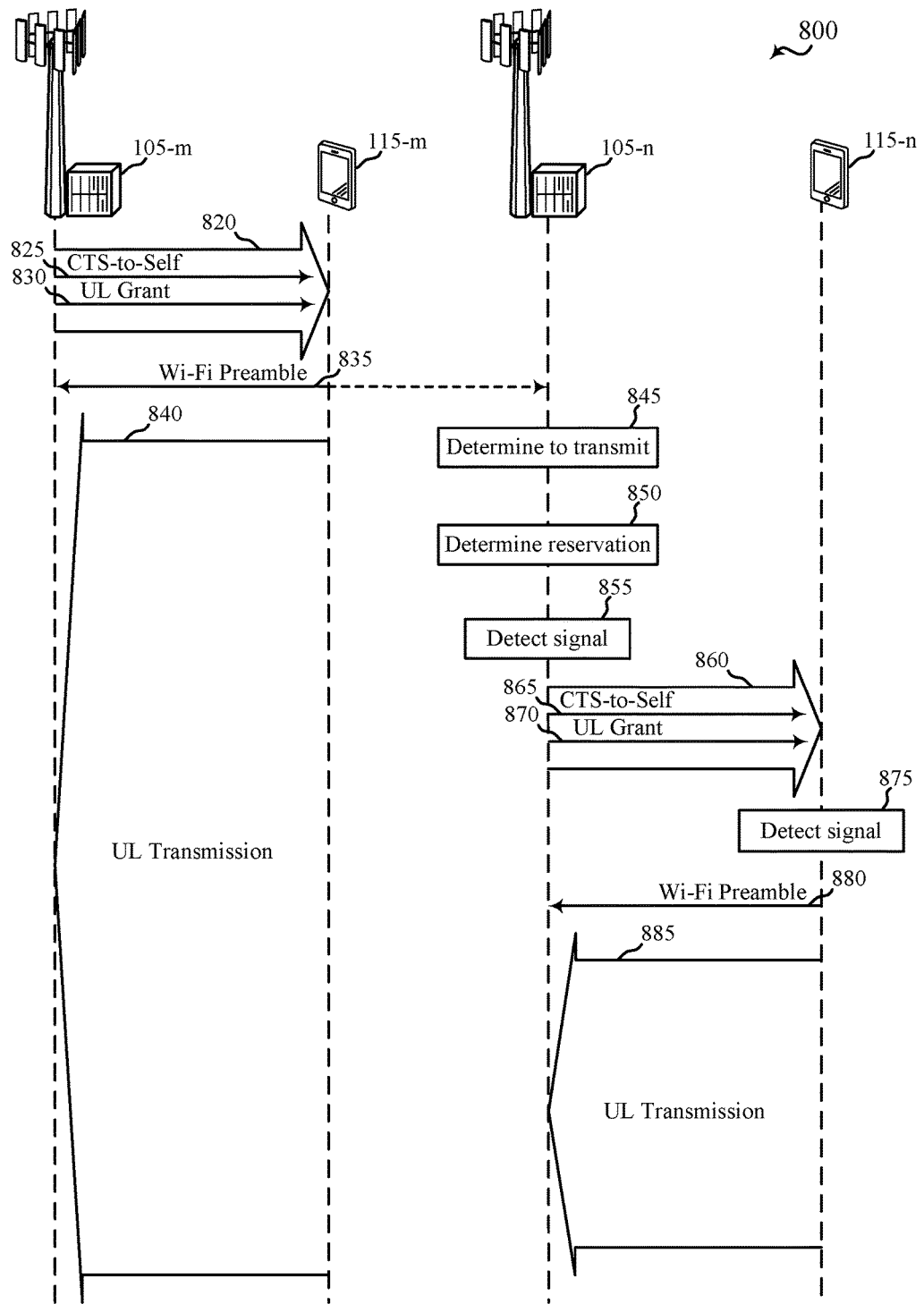

FIG. 8 shows a message flow between devices of a wireless communication system 800 that supports using over-the-air signaling to provide an increased reuse factor in a shared radio frequency spectrum band, in accordance with various aspects of the present disclosure. By way of example, the wireless communication system 800 includes a first base station 105-*m*, a second base station 105-*n*, a first UE 115-*m*, and a second UE 115-*n*. The first UE 115-*m* may be associated with the first base station 105-*m* (e.g., the first base station 105-*m* may be a serving cell for the first UE 115-*m*), and the second UE 115-*n* may be associated with the second base station 105-*n*. The base stations 105-*m*, 105-*n* and UEs 115-*m*, 115-*n* may be examples of aspects of the base stations 105 and UEs 115 described with reference to FIG. 1 or 2-7. In some examples, the base stations 105-*m*, 105-*n* and UEs 115-*m*, 115-*n* may communicate over a shared radio frequency spectrum band, and one or more of the base stations 105-*m*, 105-*n* or UEs 115-*m*, 115-*n* may contend for access to the shared radio frequency spectrum band as described with reference to FIG. 2. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner).

The first base station 105-*m* may determine to schedule a UL transmission 840 from the first UE 115-*m* and transmit a communication 820 over the shared radio frequency spectrum band. The communication 820 may include a CTS-to-self 825 and a UL grant 830. The communication 820 may also include a MCS identified for the UL transmission 840. The CTS-to-self 825 may include a NAV, which NAV may indicate a duration of a channel reservation (e.g., a reservation time) for transmitting/processing the UL grant 830 and transmitting the UL transmission 840.

Upon receiving the communication 820, the first UE 115-*m* may transmit a Wi-Fi preamble 835. The Wi-Fi preamble 835 may include a length field indicating a duration of a channel reservation (e.g., a reservation time) for transmitting the UL transmission 840. The first UE 115-*m* may also transmit the UL transmission 840, as scheduled.

At 845, the second base station 105-*n* may determine to schedule a UL transmission 885 from the second UE 115-*n*. Before scheduling the UL transmission 885, and at 850, the second base station 105-*n* may determine whether the shared radio frequency spectrum band is already reserved by another device. As part of the process performed at 850, the second base station 105-*n* may detect the channel reservation made by the first UE 115-*m* (e.g., by detecting the Wi-Fi preamble 835 and determining that the reservation time indicated therein has not expired). In some examples, the channel reservation may be detected presently, based on current transmissions over the shared radio frequency spectrum band; in other examples, the channel reservation may be detected by accessing a database of previously detected channel reservations. In some examples, the second base station 105-n may determine an interference level associated with the Wi-Fi preamble 835, and identify a MCS for the UL transmission 885 based at least in part on the interference level.

Conventionally, the second base station 105-n would delay scheduling of the UL transmission 885 upon determining that the shared radio frequency spectrum band is already reserved by another device. However, in FIG. 8, at 855, the second base station 105-n may determine, based at least in part on the channel reservation, whether a channel reservation signal (e.g., the CTS-to-self 825) corresponding to the channel reservation is detected over the shared radio frequency spectrum band. Similarly to how the channel reservation is detected at 850, the channel reservation signal may be detected presently, based on current transmissions over the shared radio frequency spectrum band, or by accessing a database of previously detected channel reservation signals. In some examples, the channel reservation may be detected presently, based on current transmissions over the shared radio frequency spectrum band; in other examples, the channel reservation may be detected by accessing a database of previously detected channel reservations. Upon determining that the channel reservation signal is not detected, the second base station 105-n may schedule the UL transmission 885 and transmit a grant of resources (e.g., a UL grant 870) to the second UE 115-n. Otherwise, the second base station 105-n may defer scheduling the UL transmission 885 until after the reservation time associated with the channel reservation identified at 850 is expired. When the second base station 105-n does not identify a channel reservation by another device at 850, or when the second base station 105-n identifies a channel reservation at 850 but the channel reservation is expired, the second base station 105-n may skip the operation(s) at 855, schedule the UL transmission 885, and transmit the UL grant 870 to the second UE 115-n.

Upon determining that the channel reservation signal (e.g., the CTS-to-self 825) is not detected, the second base station 105-n may transmit a communication 860 over the shared radio frequency spectrum band. The second base station 105-n may also transmit the communication 860 upon determining that the channel reservation signal (e.g., the CTS-to-self 825) is detected, if short burst interference is allowed for the first UE 115-m (e.g., when relying on code block (CB) ACK/NAK of the first UE 115-m). The communication 860 may include a CTS-to-self 865 and the UL grant 870. The communication 860 may also include a MCS identified for the UL transmission 885. The CTS-to-self 865 may include a NAV, which NAV may indicate a duration of a channel reservation (e.g., a reservation time) for transmitting/processing the UL grant 870 and transmitting the UL transmission 885.

Upon receiving the communication 860, the second UE 115-n may determine, at block 875, whether a channel reservation signal (e.g., the CTS-to-self 825) is detected over the shared radio frequency spectrum band. Upon determining that the channel reservation signal (e.g., the CTS-to-self 825) is detected, the second UE 115-n may determine whether the reservation time indicated by the NAV included in the CTS-to-self 825 has expired. Upon determining that the CTS-to-self 825 is not detected, or that the CTS-to-self 825 is detected and the reservation time indicated by the NAV included in the CTS-to-self 825 has expired, the second UE 115-n may transmit a Wi-Fi preamble 880. The Wi-Fi preamble 880 may include a length field indicating a duration of a channel reservation (e.g., a reservation time) for transmitting the UL transmission 595. The second UE 115-n may also transmit the UL transmission 885, as scheduled.

In some cases, the duration of the UL transmission 885 may be indicated in the UL grant 580 or elsewhere, or chosen by the second UE 115-n, to be shorter than the channel reservation by the first UE 115-m, because channel conditions may improve after the UL transmission 840 concludes, and the second base station 105-n may be able to schedule a next UL transmission at a higher MCS, for example. In an alternative embodiment of the message flow shown in FIG. 8, the first UE 115-m may be replaced with a Wi-Fi transmitter transmitting a RTS signal instead of a Wi-Fi preamble, and the first base station 105-m may be replaced with a Wi-Fi receiver transmitting a CTS signal instead of a CTS-to-self signal.

The described operations performed by the second base station 105-n and second UE 115-n, in FIG. 8, help to ensure that transmission of the UL transmission 885, in parallel with the UL transmission 840, will not interfere with reception of the UL transmission 840 at the first base station 105-me or reception of the UL transmission 885 at the second base station 105-n.

Figure 9:
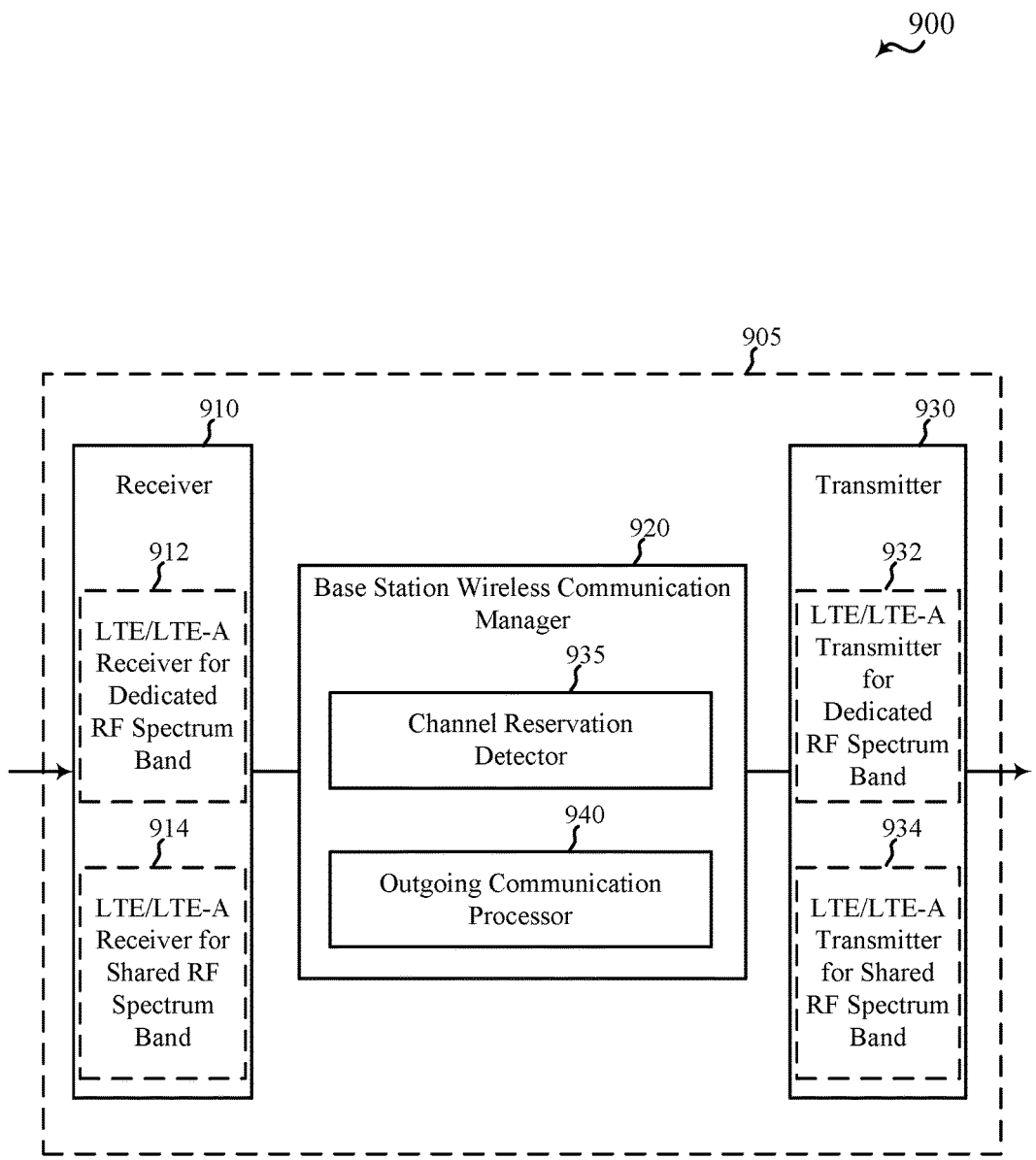
FIGS. 9 and 10 show block diagrams of devices that support using over-the-air signaling at a base station to provide an increased reuse factor in a shared radio frequency spectrum band, in accordance with various aspects of the present disclosure.

FIG. 9 shows a block diagram 900 of a device 905 that supports using over-the-air signaling at a base station to provide an increased reuse factor in a shared radio frequency spectrum band, in accordance with various aspects of the present disclosure. The device 905 may be an example of aspects of one or more of the base stations 105 described with reference to FIGS. 1 and 3-8. The device 905 may also be or include a processor. The device 905 may include a receiver 910, a base station wireless communication manager 920, and a transmitter 930. Each of these modules may be in communication with each other.

The modules of the device 905 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, Field Programmable Gate Arrays (FPGAs), a System on Chip (SoC), and/or others of Semi-Custom ICs), which may be programmed in any manner known in the art. The functions of each module may also be implemented, in whole or in part, with instructions embodied in a memory, formatted to be executed by one or more general or application-specific processors.

In some examples, the receiver 910 may include at least one radio frequency (RF) receiver, such as at least one RF receiver operable to receive transmissions over a dedicated radio frequency spectrum band (e.g., a radio frequency spectrum band for which transmitting devices may not contend for access because the radio frequency spectrum band is licensed to some users (e.g., a licensed radio frequency spectrum band usable for LTE/LTE-A communications)) or a shared radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1 through 8. The receiver 910 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 912), and an LTE/LTE-A receiver for communicating over the shared radio frequency spectrum band (e.g., LTE/LTE-A receiver for shared RF spectrum band 914). The receiver 910, including the LTE/LTE-A receiver for dedicated RF spectrum band 912 or the LTE/LTE-A receiver for shared RF spectrum band 914, may be used to receive various data or control signals (e.g., transmissions) over one or more communication links of a wireless communication system, such as one or more communication links of the wireless communication system 100, 300, 400, 500, 600, 700, or 800 described with reference to FIGS. 1 and 3-8. The communication links may be established over the dedicated radio frequency spectrum band or the shared radio frequency spectrum band.

In some examples, the transmitter 930 may include at least one RF transmitter, such as at least one RF transmitter operable to transmit over the dedicated radio frequency spectrum band or the shared radio frequency spectrum band. The transmitter 930 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 932), and an LTE/LTE-A transmitter for communicating over the shared radio frequency spectrum band (e.g., LTE/LTE-A transmitter for shared RF spectrum band 934). The transmitter 930, including the LTE/LTE-A transmitter for dedicated RF spectrum band 932 or the LTE/LTE-A transmitter for shared RF spectrum band 934, may be used to transmit various data or control signals (e.g., transmissions) over one or more communication links of a wireless communication system, such as one or more communication links of the wireless communication system 100, 300, 400, 500, 600, 700, or 800 described with reference to FIGS. 1 and 3-8. The communication links may be established over the dedicated radio frequency spectrum band or the shared radio frequency spectrum band.

In some examples, the base station wireless communication manager 920 may be used to manage one or more aspects of wireless communication for the device 905. In some examples, the base station wireless communication manager 920 may include a channel reservation detector 935 or an outgoing communication processor 940.

The channel reservation detector 935 may be used to detect a channel reservation for transmission over the shared radio frequency spectrum band, as described with reference to FIGS. 3-8. The channel reservation detector 935 may also be used to determine, based at least in part on the channel reservation for transmission, whether a channel reservation for reception signal is detected over the shared radio frequency spectrum band, as also described with reference to FIGS. 3-8.

The outgoing communication processor 940 may be used to transmit (e.g., in cooperation with transmitter 930) a communication over the shared radio frequency spectrum band, to a UE, based at least in part on the determining, as described with reference to FIGS. 3-8. The communication may include a pre-grant communication associated with a downlink transmission or a grant of uplink resources associated with an uplink transmission.

Figure 10:
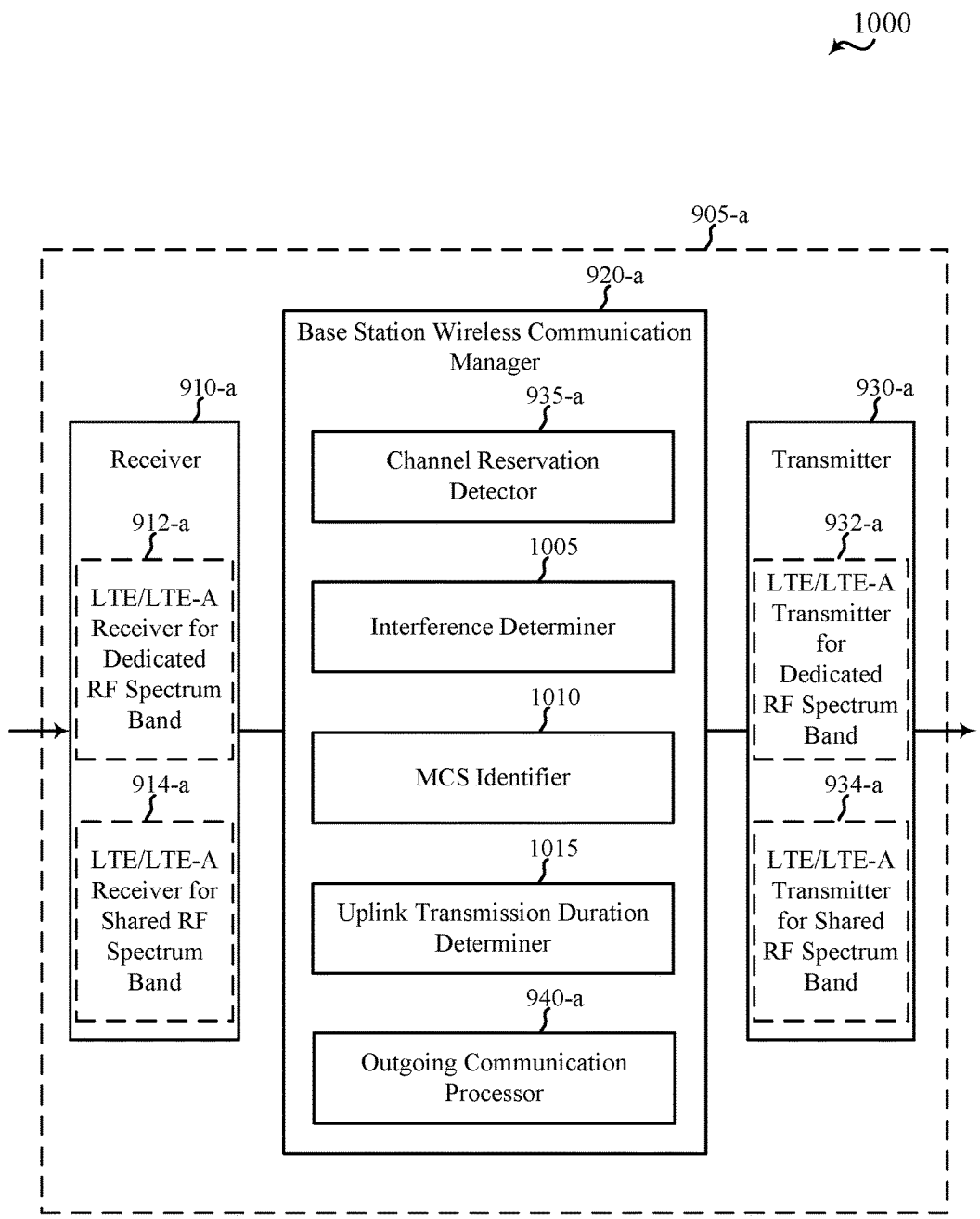

FIG. 10 shows a block diagram 1000 of a device 905-a that supports using over-the-air signaling at a base station to provide an increased reuse factor in a shared radio frequency spectrum band, in accordance with various aspects of the present disclosure. The device 905-a may be an example of aspects of one or more of the base stations 105 described with reference to FIG. 1 or 3-8, or aspects of the device 905 described with reference to FIG. 9. The device 905-a may also be or include a processor. The device 905-a may include a receiver 910-a, a base station wireless communication manager 920-a, and a transmitter 930-a. Each of these modules may be in communication with each other. The receiver 910-a may include a LTE/LTE-A receiver for dedicated RF spectrum band 912-a or a LTE/LTE-A receiver for shared RF spectrum band 914-a. The transmitter 930-a may include a LTE/LTE-A transmitter for dedicated RF spectrum band 932-a or a LTE/LTE-A transmitter for shared RF spectrum band 934-a. In some cases, the receiver 910-a, base station wireless communication manager 920-a, transmitter 930-a, LTE/LTE-A receiver for dedicated RF spectrum band 912-a, LTE/LTE-A receiver for shared RF spectrum band 914-a, LTE/LTE-A transmitter for dedicated RF spectrum band 932-a, or LTE/LTE-A transmitter for shared RF spectrum band 934-a may be a respective example of the receiver 910, base station wireless communication manager 920, transmitter 930, LTE/LTE-A receiver for dedicated RF spectrum band 912, LTE/LTE-A receiver for shared RF spectrum band 914, LTE/LTE-A transmitter for dedicated RF spectrum band 932, or LTE/LTE-A transmitter for shared RF spectrum band 934 described with reference to FIG. 9.

The components of the device 905-a may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each module may also be implemented, in whole or in part, with instructions embodied in a memory, formatted to be executed by one or more general or application-specific processors.

The base station wireless communication manager 920-a may be used to manage one or more aspects of wireless communication for the device 905-a. In some examples, the base station wireless communication manager 920-a may include a channel reservation detector 935-a, an interference determiner 1005, a MCS identifier 1010, a uplink transmission duration determiner 1015, or an outgoing communication processor 940-a.

The channel reservation detector 935-a may be used to detect a channel reservation for transmission over the shared radio frequency spectrum band, as described with reference to FIGS. 3-8. The channel reservation detector 935-a may also be used to determine a duration of the channel reservation for transmission.

The channel reservation detector 935-a may also be used to determine, based at least in part on the channel reservation for transmission, whether a channel reservation for reception signal is detected over the shared radio frequency spectrum band, as also described with reference to FIGS. 3-8. Still further, the channel reservation detector 935-a may be used to determine whether a reservation time associated with the channel reservation for transmission has expired.

The outgoing communication processor 940-*a* may be used to transmit (e.g., in cooperation with transmitter 930-*a*) a communication over the shared radio frequency spectrum band, to a first UE, based at least in part on determining whether a channel reservation for reception signal is detected, as described with reference to FIGS. 3-8. In some examples, the outgoing communication processor 940-*a* may transmit the communication when a channel reservation for reception signal is not detected. The communication may include a pre-grant communication associated with a downlink transmission or a grant of uplink resources associated with an uplink transmission. The communication may also include a CTS-to-self signal. In some examples, the CTS-to-self signal may be transmitted before, or at the beginning of, a pre-grant communication or grant of uplink resources. When the communication includes a grant of uplink resources, the communication may also include an indicator of an MCS for an associated uplink transmission and/or an indication of an uplink transmission duration.

In some examples, the channel reservation for transmission may be transmitted by a second base station, and the channel reservation for reception signal (e.g., a CTS) may be transmitted by a second UE. In these examples, the channel reservation detector 935-*a* may detect at least one of a CTS-to-self signal transmitted by the second base station or a PFFICH transmitted by the second base station.

In some examples, the channel reservation for transmission may be transmitted by a second UE, and the channel reservation for reception signal (e.g., a CTS-to-self signal) may be transmitted by a second base station. In these examples, the channel reservation detector 935-*a* may detect a Wi-Fi preamble transmitted by the second UE. The Wi-Fi preamble may have a length field indicating a duration of an uplink transmission from the second UE to the second base station.

In some examples, the channel reservation for transmission may be transmitted by a Wi-Fi transmitter, and the channel reservation for reception signal (e.g., a CTS signal) may be transmitted by a Wi-Fi receiver. In these examples, the channel reservation detector 935-*a* may detect a RTS signal transmitted by the Wi-Fi transmitter.

The interference determiner 1005 may be used, when the communication processed and/or transmitted by the outgoing communication processor 940-*a* comprises a grant of uplink resources, to determine an interference level associated with the channel reservation for transmission. The MCS identifier 1010 may be used to identify, based at least in part on the interference level, a MCS to be used by the first UE during an uplink transmission associated with the grant of uplink resources.

The uplink transmission duration determiner 1015 may be used to determine an uplink transmission duration for an uplink transmission from the first UE. The uplink transmission duration may be determined such that the uplink transmission duration is shorter than the duration of the channel reservation for transmission.

Figure 11:
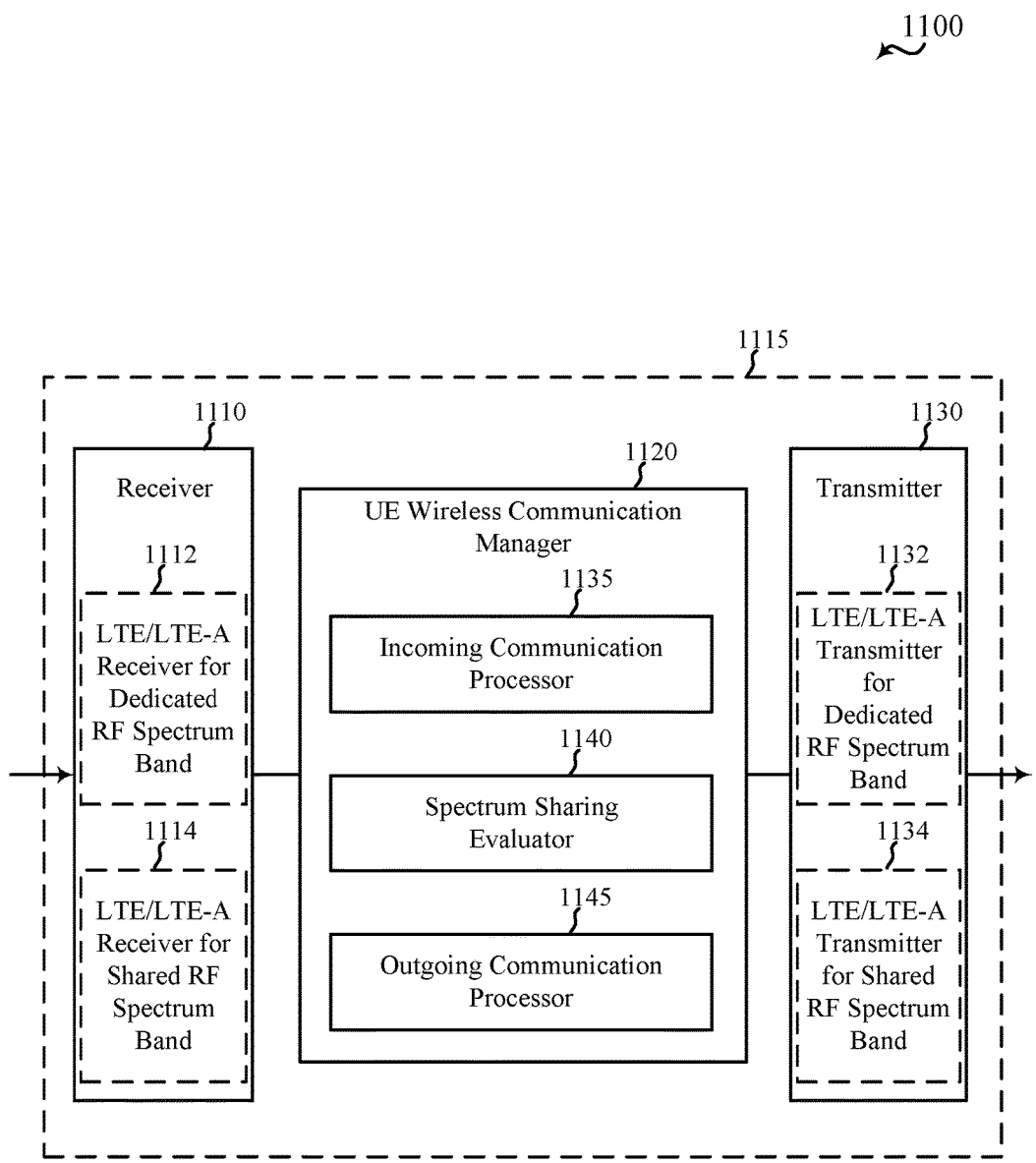
FIGS. 11 and 12 show block diagrams of devices that support using over-the-air signaling at a UE to provide an increased reuse factor in a shared radio frequency spectrum band, in accordance with various aspects of the present disclosure.

FIG. 11 shows a block diagram 1100 of a device 1115 that supports using over-the-air signaling at a UE to provide an increased reuse factor in a shared radio frequency spectrum band, in accordance with various aspects of the present disclosure. The device 1115 may be an example of aspects of one or more of the UEs 115 described with reference to FIGS. 1 and 3-8. The device 1115 may also be or include a processor. The device 1115 may include a receiver 1110, a UE wireless communication manager 1120, and a transmitter 1130. Each of these modules may be in communication with each other.

The modules of the device 1115 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each module may also be implemented, in whole or in part, with instructions embodied in a memory, formatted to be executed by one or more general or application-specific processors.

In some examples, the receiver 1110 may include at least one RF receiver, such as at least one RF receiver operable to receive transmissions over a dedicated radio frequency spectrum band (e.g., a radio frequency spectrum band for which transmitting devices may not contend for access because the radio frequency spectrum band is licensed to some users (e.g., a licensed radio frequency spectrum band usable for LTE/LTE-A communications)) or a shared radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1 or 2. The receiver 1110 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1112), and an LTE/LTE-A receiver for communicating over the shared radio frequency spectrum band (e.g., LTE/LTE-A receiver for shared RF spectrum band 1114). The receiver 1110, including the LTE/LTE-A receiver for dedicated RF spectrum band 1112 or the LTE/LTE-A receiver for shared RF spectrum band 1114, may be used to receive various data or control signals (e.g., transmissions) over one or more communication links of a wireless communication system, such as one or more communication links of the wireless communication system 100, 300, 400, 500, 600, 700, or 800 described with reference to FIGS. 1 and 3-8. The communication links may be established over the dedicated radio frequency spectrum band or the shared radio frequency spectrum band.

In some examples, the transmitter 1130 may include at least one RF transmitter, such as at least one RF transmitter operable to transmit over the dedicated radio frequency spectrum band or the shared radio frequency spectrum band. The transmitter 1130 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1132), and an LTE/LTE-A transmitter for communicating over the shared radio frequency spectrum band (e.g., LTE/LTE-A transmitter for shared RF spectrum band 1134). The transmitter 1130, including the LTE/LTE-A transmitter for dedicated RF spectrum band 1132 or the LTE/LTE-A transmitter for shared RF spectrum band 1134, may be used to transmit various data or control signals (e.g., transmissions) over one or more communication links of a wireless communication system, such as one or more communication links of the wireless communication system 100, 300, 400, 500, 600, 700, or 800 described with reference to FIGS. 1 and 3-8. The communication links may be established over the dedicated radio frequency spectrum band or the shared radio frequency spectrum band.

In some examples, the UE wireless communication manager 1120 may be used to manage one or more aspects of wireless communication for the device 1115. In some examples, the UE wireless communication manager 1120 may include an incoming communication processor 1135, a spectrum sharing evaluator 1140, or an outgoing communication processor 1145.

The incoming communication processor 1135 may be used to receive (e.g., in cooperation with the receiver 1110) a first communication over the shared radio frequency spectrum band from a base station, as described with reference to FIGS. 3-8. The first communication may include a pre-grant communication associated with a downlink transmission or a grant of uplink resources associated with an uplink transmission.

The spectrum sharing evaluator 1140 may be used to determine, based at least in part on receiving the first communication, whether a channel reservation signal is detected over the shared radio frequency spectrum band, as described with reference to FIGS. 3-8.

The outgoing communication processor 1145 may be used to transmit (e.g., in cooperation with the transmitter 1130) a second communication over the shared radio frequency spectrum band, to the base station, based at least in part on the determination made by the spectrum sharing evaluator 1140, as described with reference to FIGS. 3-8. The second communication may include an approval of the downlink transmission or the uplink transmission.

Figure 12:
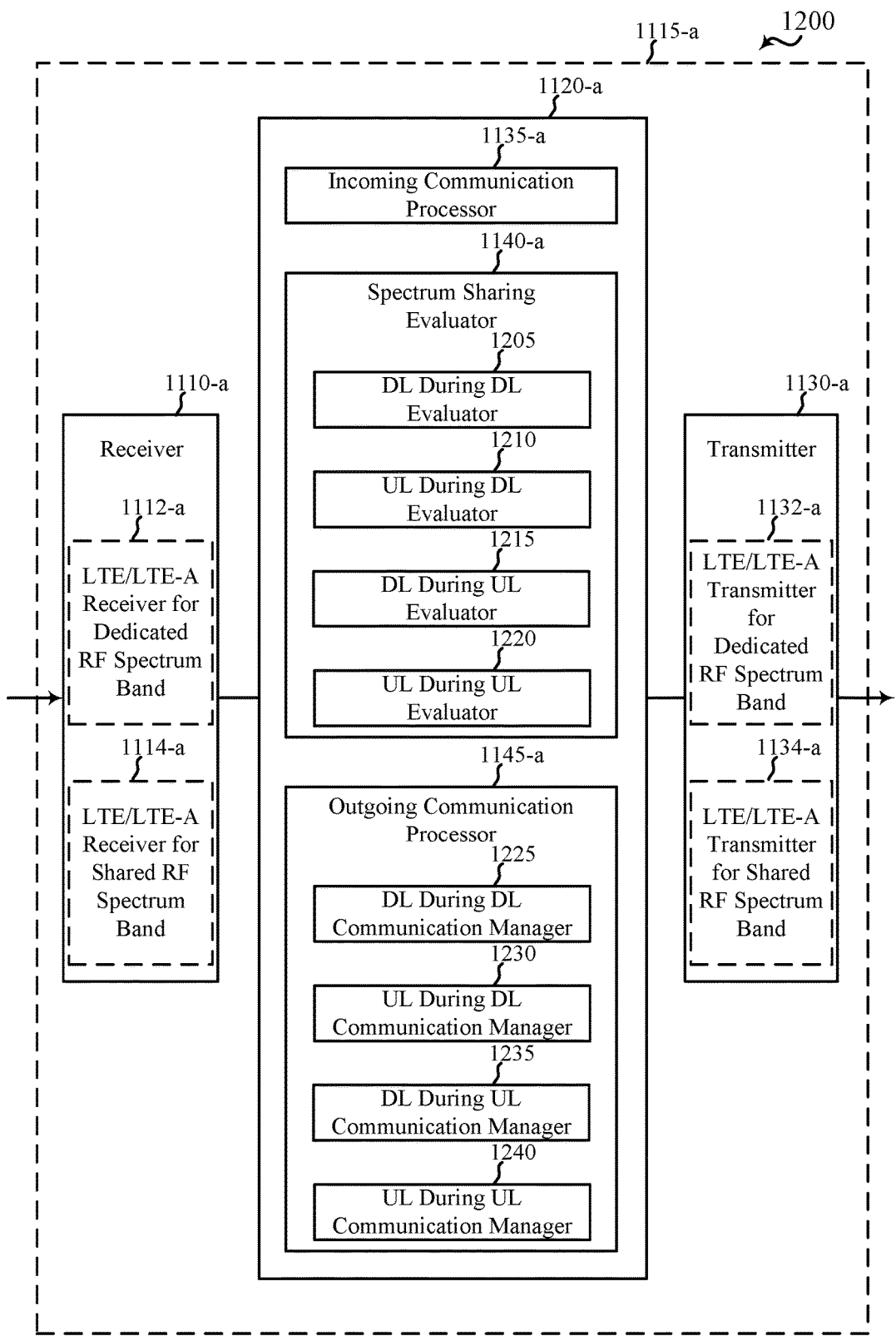

FIG. 12 shows a block diagram 1200 of a device 1115-*a* that supports using over-the-air signaling at a UE to provide an increased reuse factor in a shared radio frequency spectrum band, in accordance with various aspects of the present disclosure. The device 1115-*a* may be an example of aspects of one or more of the UEs 115 described with reference to FIG. 1 or 3-8, or aspects of the device 1115 described with reference to FIG. 11. The device 1115-*a* may also be or include a processor. The device 1115-*a* may include a receiver 1110-*a*, a UE wireless communication manager 1120-*a*, and a transmitter 1130-*a*. Each of these modules may be in communication with each other. The receiver 1110-*a* may include a LTE/LTE-A receiver for dedicated RF spectrum band 1112-*a* or a LTE/LTE-A receiver for shared RF spectrum band 1114-*a*. The transmitter 1130-*a* may include a LTE/LTE-A transmitter for dedicated RF spectrum band 1132-*a* or a LTE/LTE-A transmitter for shared RF spectrum band 1134-*a*. In some cases, the receiver 1110-*a*, UE wireless communication manager 1120-*a*, transmitter 1130-*a*, LTE/LTE-A receiver for dedicated RF spectrum band 1112-*a*, LTE/LTE-A receiver for shared RF spectrum band 1114-*a*, LTE/LTE-A transmitter for dedicated RF spectrum band 1132-*a*, or LTE/LTE-A transmitter for shared RF spectrum band 1134-*a* may be a respective example of the receiver 1110, UE wireless communication manager 1120, transmitter 1130, LTE/LTE-A receiver for dedicated RF spectrum band 1112, LTE/LTE-A receiver for shared RF spectrum band 1114, LTE/LTE-A transmitter for dedicated RF spectrum band 1132, or LTE/LTE-A transmitter for shared RF spectrum band 1134 described with reference to FIG. 11.

The components of the device 1115-*a* may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each module may also be implemented, in whole or in part, with instructions embodied in a memory, formatted to be executed by one or more general or application-specific processors.

The UE wireless communication manager 1120-*a* may be used to manage one or more aspects of wireless communication for the device 1115-*a*. In some examples, the UE wireless communication manager 1120-*a* may include an incoming communication processor 1135-*a*, a spectrum sharing evaluator 1140-*a*, or an outgoing communication processor 1145-*a*.

The incoming communication processor 1135-*a* may be used to receive (e.g., in cooperation with the receiver 1110-*a*) a first communication over the shared radio frequency spectrum band from a first base station, as described with reference to FIGS. 3-8. The first communication may include a pre-grant communication associated with a downlink transmission or a grant of uplink resources associated with an uplink transmission. The incoming communication processor 1135-*a* may also be used, under some scenarios, to receive a downlink transmission over the shared radio frequency spectrum band.

The spectrum sharing evaluator 1140-*a* may be used to determine, based at least in part on receiving the first communication, whether a channel reservation signal is detected over the shared radio frequency spectrum band, as described with reference to FIGS. 3-8. In some examples, the spectrum sharing evaluator 1140-*a* may include a DL during DL evaluator 1205, a UL during DL evaluator 1210, a DL during UL evaluator 1215, or a UL during UL evaluator 1220.

The DL during DL evaluator 1205 may be used to determine, based at least in part on the incoming communication processor 1135-*a* receiving the pre-grant communication, whether a channel reservation for transmission signal (e.g., a CTS-to-self signal), transmitted by a second base station, is detected over the shared radio frequency spectrum band. When the channel reservation for transmission signal is detected, the DL during DL evaluator 1205 may also be used to determine whether a reservation time associated with the channel reservation for transmission signal has expired. The DL during DL evaluator 1205 may also be used to determine whether an interference level associated with the channel reservation for transmission signal is below a threshold interference level, and to compile CQI feedback, based at least in part on the interference level, to adjust a MCS of the downlink transmission.

The UL during DL evaluator 1210 may be used to determine, based at least in part on the incoming communication processor 1135-*a* receiving the grant of uplink resources, whether a channel reservation for reception signal (e.g., a CTS signal), transmitted by a second UE, is detected over the shared radio frequency spectrum band. When the channel reservation for reception signal is detected, the UL during DL evaluator 1210 may also be used to determine whether a reservation time associated with the channel reservation for transmission signal has expired.

The DL during UL evaluator 1215 may be used to determine, based at least in part on the incoming communication processor 1135-*a* receiving the pre-grant communication, whether a channel reservation for transmission signal (e.g., a Wi-Fi preamble or a RTS signal), transmitted by a second UE or a Wi-Fi transmitter, is detected over the shared radio frequency spectrum band. When the channel reservation for transmission signal is detected, the DL during DL evaluator 1205 may also be used to determine whether a reservation time associated with the channel reservation for transmission signal has expired. The DL during DL evaluator 1205 may also be used to determine whether an interference level associated with the channel reservation for transmission signal is below a threshold interference level, and to compile CQI feedback, based at least in part on the interference level, to adjust a MCS of the downlink transmission.

The UL during UL evaluator 1220 may be used to determine, based at least in part on the incoming communication processor 1135-*a* receiving the grant of uplink resources, whether a channel reservation for reception signal (e.g., a CTS-to-self signal or a CTS signal), transmitted by a second base station or a Wi-Fi receiver, is detected over the shared radio frequency spectrum band. When the channel reservation for reception signal is detected, the UL during UL evaluator 1220 may also be used to determine whether a reservation time associated with the channel reservation for transmission signal has expired.

The outgoing communication processor 1145-*a* may be used to transmit (e.g., in cooperation with the transmitter 1130-*a*) a second communication over the shared radio frequency spectrum band, to the base station, based at least in part on the determination made by the spectrum sharing evaluator 1140-*a*, as described with reference to FIGS. 3-8. The second communication may include an approval of the downlink transmission or the uplink transmission. In some examples, the outgoing communication processor 1145-*a* may include a DL during DL communication manager 1225, a UL during DL communication manager 1230, a DL during UL communication manager 1235, or a UL during UL communication manager 1240.

The DL during DL communication manager 1225 may be used to refrain from acknowledging the pre-grant communication received from the first base station when the DL during DL evaluator 1205 determines that the channel reservation for transmission signal is detected, has not expired, and/or is above a threshold interference level. The DL during DL communication manager 1225 may alternatively transmit (e.g., in cooperation with the transmitter 1130-*a*) a second communication over the shared radio frequency spectrum band, to the first base station, based at least in part on the DL during DL evaluator 1205 determining that the channel reservation for transmission signal is not detected. The second communication may include a channel reservation for reception signal (e.g., a CTS signal) and an approval of the downlink transmission (e.g., a pre-grant ACK signal). Alternatively, the DL during DL communication manager 1225 may transmit the second communication over the shared radio frequency spectrum band, to the first base station, based at least in part on the DL during DL evaluator 1205 determining that the channel reservation for transmission signal is detected and a reservation time associated with the channel reservation for transmission signal has expired. Alternatively, the DL during DL communication manager 1225 may transmit the second communication over the shared radio frequency spectrum band, to the first base station, based at least in part on the DL during DL evaluator 1205 determining that the interference level associated with the channel reservation for transmission signal is below the threshold interference level. The second communication may be transmitted with the CQI feedback compiled by the DL during DL evaluator 1205.

The UL during DL communication manager 1230 may be used to refrain from transmitting the uplink transmission to the first base station when the UL during DL evaluator 1210 determines that the channel reservation for reception signal is detected and has not expired. The UL during DL communication manager 1230 may alternatively transmit (e.g., in cooperation with the transmitter 1130-*a*) a second communication over the shared radio frequency spectrum band, to the first base station, based at least in part on the UL during DL evaluator 1210 determining that the channel reservation for reception signal is not detected. The second communication may include a channel reservation for transmission signal (e.g., a Wi-Fi preamble having a length field indicating a duration of the uplink transmission) and the uplink transmission. Alternatively, the UL during DL communication manager 1230 may transmit the second communication over the shared radio frequency spectrum band, to the first base station, based at least in part on the UL during DL evaluator 1210 determining that the channel reservation for reception signal is detected and a reservation time associated with the channel reservation for reception signal has expired.

The DL during UL communication manager 1235 may be used to refrain from acknowledging the pre-grant communication received from the first base station when the DL during UL evaluator 1215 determines that the channel reservation for transmission signal is detected, has not expired, and/or is above the threshold interference level. The DL during UL communication manager 1235 may alternatively transmit (e.g., in cooperation with the transmitter 1130-*a*) a second communication over the shared radio frequency spectrum band, to the first base station, based at least in part on the DL during UL evaluator 1215 determining that the channel reservation for transmission signal is not detected. The second communication may include a channel reservation for reception signal (e.g., a CTS signal) and an approval of the downlink transmission (e.g., a pre-grant ACK signal). Alternatively, the DL during UL communication manager 1235 may transmit the second communication over the shared radio frequency spectrum band, to the first base station, based at least in part on the DL during UL evaluator 1215 determining that the channel reservation for transmission signal is detected and a reservation time associated with the channel reservation for transmission signal is expired. Alternatively, the DL during UL communication manager 1235 may transmit the second communication over the shared radio frequency spectrum band, to the first base station, based at least in part on the DL during UL evaluator 1215 determining that the interference level associated with the channel reservation for transmission signal is below the threshold interference level. The second communication may be transmitted with the CQI feedback compiled by the DL during UL evaluator 1215.

The UL during UL communication manager 1240 may be used to refrain from transmitting the uplink transmission to the first base station when the UL during UL evaluator 1220 determines that the channel reservation for reception signal is detected and not expired. The UL during UL communication manager 1240 may alternatively transmit a second communication over the shared radio frequency spectrum band, to the first base station, based at least in part on the UL during UL evaluator 1220 determining that the channel reservation for reception signal is not detected. The second communication may include a channel reservation for transmission signal (e.g., a Wi-Fi preamble having a length field indicating a duration of the uplink transmission) and the uplink transmission. Alternatively, the UL during UL communication manager 1240 may transmit the second communication over the shared radio frequency spectrum band, to the first base station, based at least in part on the UL during UL evaluator 1220 determining that the channel reservation for reception signal is detected and a reservation time associated with the channel reservation for reception signal is expired.

Figure 13:
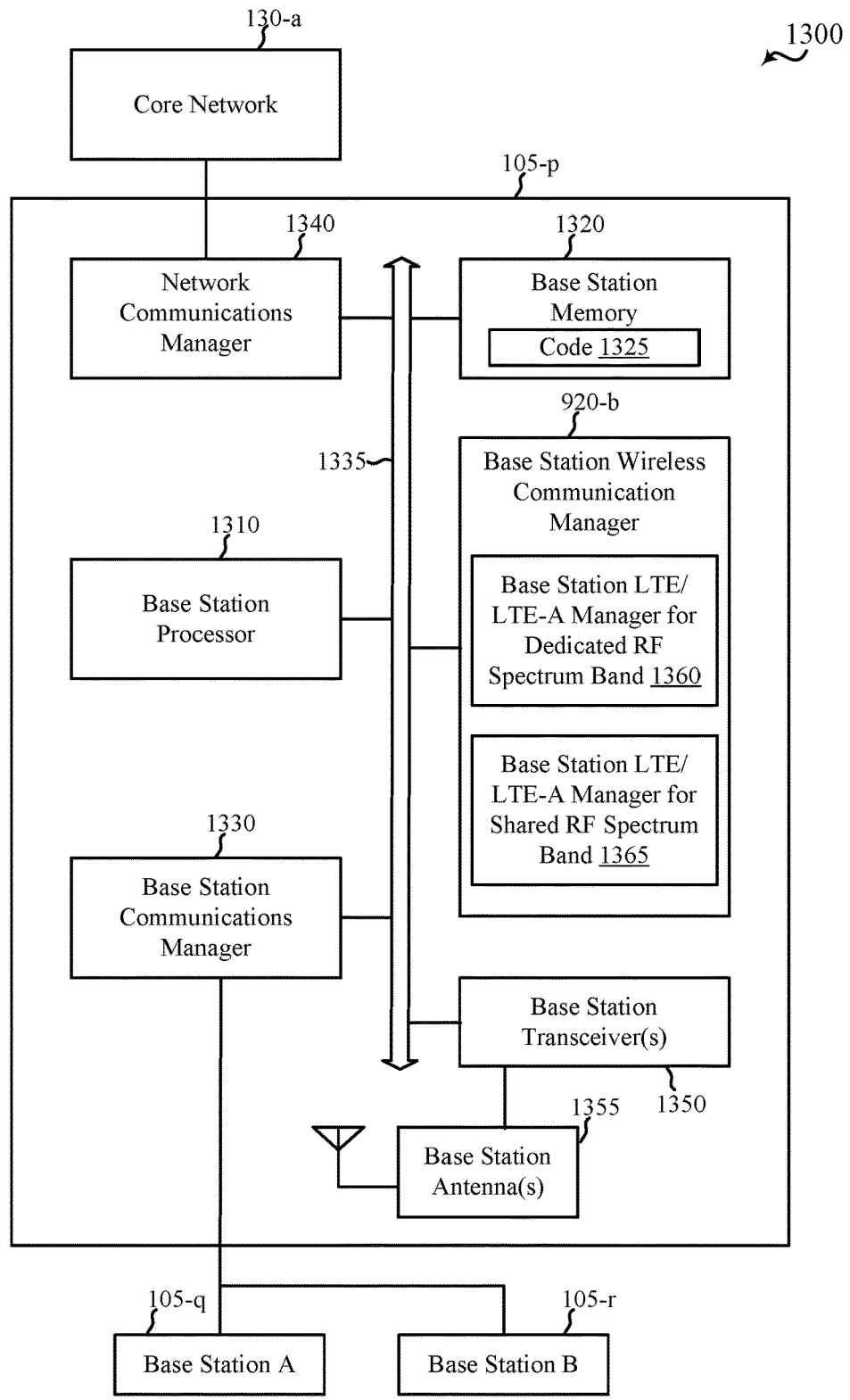
FIG. 13 shows a block diagram of a base station that support using over-the-air signaling to provide an increased reuse factor in a shared radio frequency spectrum band, in accordance with various aspects of the present disclosure.

FIG. 13 shows a block diagram 1300 of a base station 105-*p* (e.g., a base station forming part or all of an eNB) that supports using over-the-air signaling to provide an increased reuse factor in a shared radio frequency spectrum band, in accordance with various aspects of the present disclosure. In some examples, the base station 105-*p* may be an example of aspects of one or more of the base stations 105 or devices 905 described with reference to FIGS. 1 and 3-10. The base station 105-*p* may be configured to implement or facilitate at least some of the base station features and functions described with reference to FIGS. 1-10.

The base station 105-*p* may include a base station processor 1310, a base station memory 1320, at least one base station transceiver (represented by base station transceiver(s) 1350), at least one base station antenna (represented by base station antenna(s) 1355), or a base station wireless communication manager 920-*b*. The base station 105-*p* may also include one or more of a base station communications manager 1330 or a network communications manager 1340. Each of these components may be in communication with each other, directly or indirectly, over one or more buses 1335.

The base station memory 1320 may include random access memory (RAM) or read-only memory (ROM). The base station memory 1320 may store computer-readable, computer-executable software/firmware code 1325 containing instructions that are configured to, when executed, cause the base station processor 1310 to perform various functions described herein related to wireless communication, including, for example, assisting in determining whether a first transmission over a shared radio frequency spectrum band may be transmitted concurrently with a second transmission, as described with reference to FIGS. 1-10. Alternatively, the code 1325 may not be directly executable by the base station processor 1310 but be configured to cause the base station 105-*p* (e.g., when compiled and executed) to perform various of the functions described herein.

The base station processor 1310 may include an intelligent hardware device (e.g., a central processing unit (CPU), a microcontroller, an ASIC, etc.) The base station processor 1310 may process information received through the base station transceiver(s) 1350, the base station communications manager 1330, or the network communications manager 1340. The base station processor 1310 may also process information to be sent to the transceiver(s) 1350 for transmission through the antenna(s) 1355, to the base station communications manager 1330, for transmission to one or more other base stations 105-*q* and 105-*r*, or to the network communications manager 1340 for transmission to a core network 130-*a*, which may be an example of one or more aspects of the core network 130 described with reference to FIG. 1.

The base station processor 1310 may handle, alone or in connection with the base station wireless communication manager 920-*b*, various aspects of communicating over (or managing communications over) a dedicated radio frequency spectrum band (e.g., a radio frequency spectrum band for which transmitting devices may not contend for access because the radio frequency spectrum band is licensed to some users (e.g., a licensed radio frequency spectrum band usable for LTE/LTE-A communications)) or the shared radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)).

The base station transceiver(s) 1350 may include a modem configured to modulate packets and provide the modulated packets to the base station antenna(s) 1355 for transmission, and to demodulate packets received from the base station antenna(s) 1355. The base station transceiver(s) 1350 may, in some examples, be implemented as one or more base station transmitters and one or more separate base station receivers. The base station transceiver(s) 1350 may support communications in the dedicated radio frequency spectrum band or the shared radio frequency spectrum band, and may be an example of aspects of receivers 910 and/or transmitters 930 described with reference to FIGS. 9 and 10. The base station transceiver(s) 1350 may be configured to communicate bi-directionally, via the antenna(s) 1355, with one or more UEs or other devices, such as one or more of the UEs 115 or devices 1115 described with reference to FIGS. 1, 3-8, 11, and 12. The base station 105-*p* may, for example, include multiple base station antennas 1355 (e.g., an antenna array). The base station 105-*p* may communicate with the core network 130-*a* through the network communications manager 1340. The base station 105-*p* may also communicate with other base stations, such as the base stations 105-*q* and 105-*r*, using the base station communications manager 1330.

The base station wireless communication manager 920-*b* may be configured to perform or control some or all of the features or functions described with reference to FIGS. 1-10 related to wireless communication over the dedicated radio frequency spectrum band or the shared radio frequency spectrum band. The base station wireless communication manager 920-*b* may include a base station LTE/LTE-A manager for dedicated RF spectrum band 1360 configured to handle LTE/LTE-A communications in the dedicated radio frequency spectrum band or a base station LTE/LTE-A manager for shared RF spectrum band 1365 configured to handle LTE/LTE-A communications in the shared radio frequency spectrum band. The base station wireless communication manager 920-*b*, or portions of it, may include a processor, or some or all of the functions of the base station wireless communication manager 920-*b* may be performed by the base station processor 1310 or in connection with the base station processor 1310. In some examples, the base station wireless communication manager 920-*b* may be an example of the base station wireless communication manager 920 described with reference to FIGS. 9 and 10.

Figure 14:
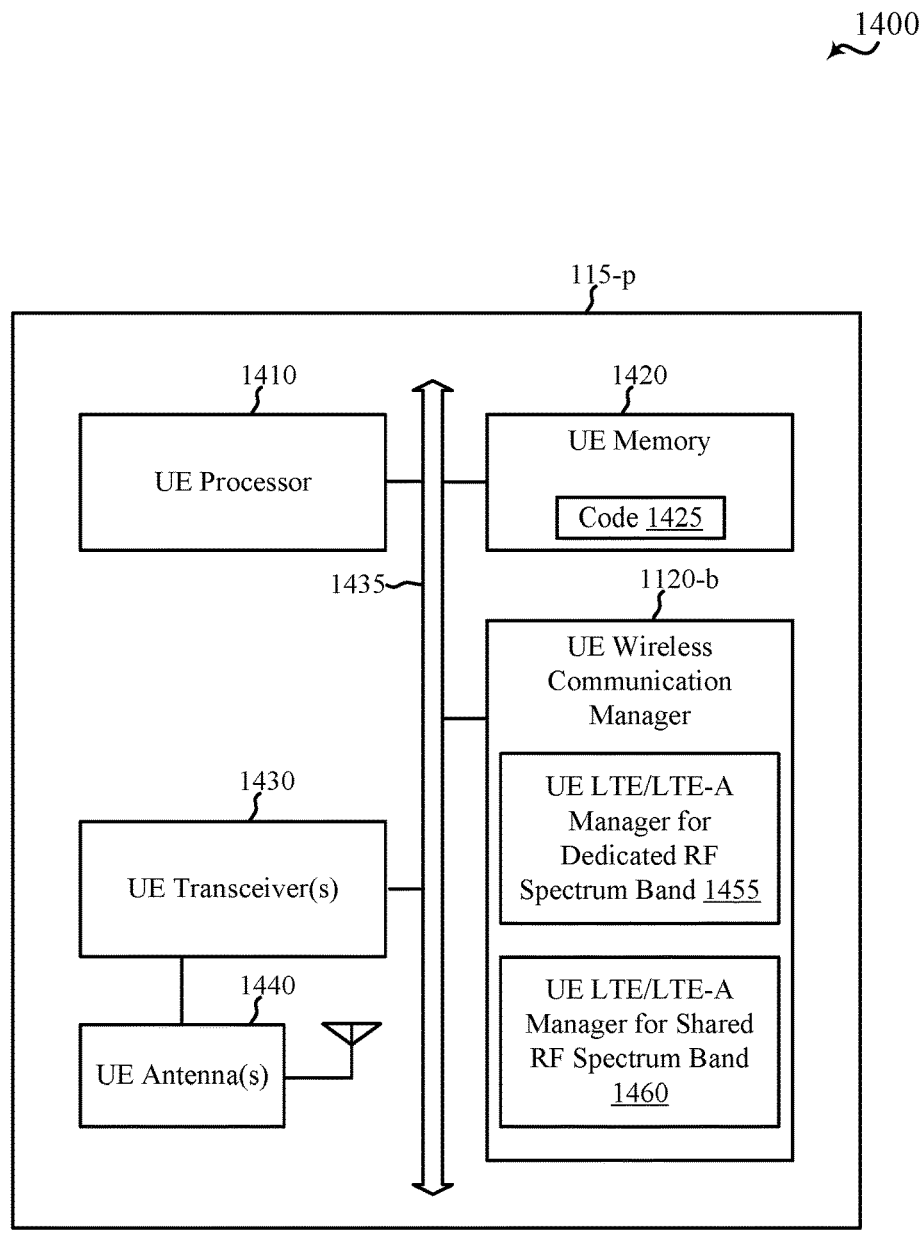
FIG. 14 shows a block diagram of a UE that support using over-the-air signaling to provide an increased reuse factor in a shared radio frequency spectrum band, in accordance with various aspects of the present disclosure.

FIG. 14 shows a block diagram 1400 of a UE 115-*p* that supports using over-the-air signaling to provide an increased reuse factor in a shared radio frequency spectrum band, in accordance with various aspects of the present disclosure. The UE 115-*p* may have various configurations and may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. The UE 115-*p* may, in some examples, have an internal power supply (not shown), such as a battery, to facilitate mobile operation. In some examples, the UE 115-*p* may be an example of aspects of one or more of the UEs 115 or devices 1115 described with reference to FIGS. 1, 3-8, 11, and 12. The UE 115-*p* may be configured to implement at least some of the UE or device features and functions described with reference to FIGS. 1-8, 11, and 12.

The UE 115-*p* may include a UE processor 1410, a UE memory 1420, at least one UE transceiver (represented by UE transceiver(s) 1430), at least one UE antenna (represented by UE antenna(s) 1440), or a UE wireless communication manager 1120-*b*. Each of these components may be in communication with each other, directly or indirectly, over one or more buses 1435.

The UE memory 1420 may include RAM or ROM. The UE memory 1420 may store computer-readable, computer-executable software/firmware code 1425 containing instructions that are configured to, when executed, cause the UE processor 1410 to perform various functions described herein related to wireless communication, including, for example, assisting in determining whether a first transmission over a shared radio frequency spectrum band may be transmitted concurrently with a second transmission, as described with reference to FIGS. 1-8, 11, and 12. Alternatively, the code 1425 may not be directly executable by the UE processor 1410 but be configured to cause the UE 115-*p* (e.g., when compiled and executed) to perform various of the functions described herein.

The UE processor 1410 may include an intelligent hardware device (e.g., a CPU, a microcontroller, an ASIC, etc.). The UE processor 1410 may process information received through the UE transceiver(s) 1430 or information to be sent to the UE transceiver(s) 1430 for transmission through the UE antenna(s) 1440. The UE processor 1410 may handle, alone or in connection with the UE wireless communication manager 1120-*b*, various aspects of communicating over (or managing communications over) a dedicated radio frequency spectrum band (e.g., a radio frequency spectrum band for which transmitting devices may not contend for access because the radio frequency spectrum band is licensed to some users (e.g., a licensed radio frequency spectrum band usable for LTE/LTE-A communications)) or the shared radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)).

The UE transceiver(s) 1430 may include a modem configured to modulate packets and provide the modulated packets to the UE antenna(s) 1440 for transmission, and to demodulate packets received from the UE antenna(s) 1440. The UE transceiver(s) 1430 may, in some examples, be implemented as one or more UE transmitters and one or more separate UE receivers. The UE transceiver(s) 1430 may support communications in the dedicated radio frequency spectrum band or the shared radio frequency spectrum band, and may be an example of aspects of receivers 1110 and/or transmitters 1130 described with reference to FIGS. 11 and 12. The UE transceiver(s) 1430 may be configured to communicate bi-directionally, via the UE antenna(s) 1440, with one or more base stations or other devices, such as one or more of the base stations 105 or devices 905 described with reference to FIGS. 1, 3-10, and 13. While the UE 115-*p* may include a single UE antenna, there may be examples in which the UE 115-*p* may include multiple UE antennas 1440.

The UE wireless communication manager 1120-*b* may be configured to perform or control some or all of the UE or device features or functions described with reference to FIGS. 1-8, 11, and 12 related to wireless communication over the dedicated radio frequency spectrum band or the shared radio frequency spectrum band. The UE wireless communication manager 1120-*b* may include a UE LTE/LTE-A manager for dedicated RF spectrum band 1460 configured to handle LTE/LTE-A communications in the dedicated radio frequency spectrum band, or a UE LTE/LTE-A manager for shared RF spectrum band 1465 configured to handle LTE/LTE-A communications in the shared radio frequency spectrum band. The UE wireless communication manager 1120-*b*, or portions of it, may include a processor, or some or all of the functions of the UE wireless communication manager 1120-*b* may be performed by the UE processor 1410 or in connection with the UE processor 1410. In some examples, the UE wireless communication manager 1120-*b* may be an example of the UE wireless communication manager 1120 described with reference to FIGS. 11 and 12.

Figure 15:
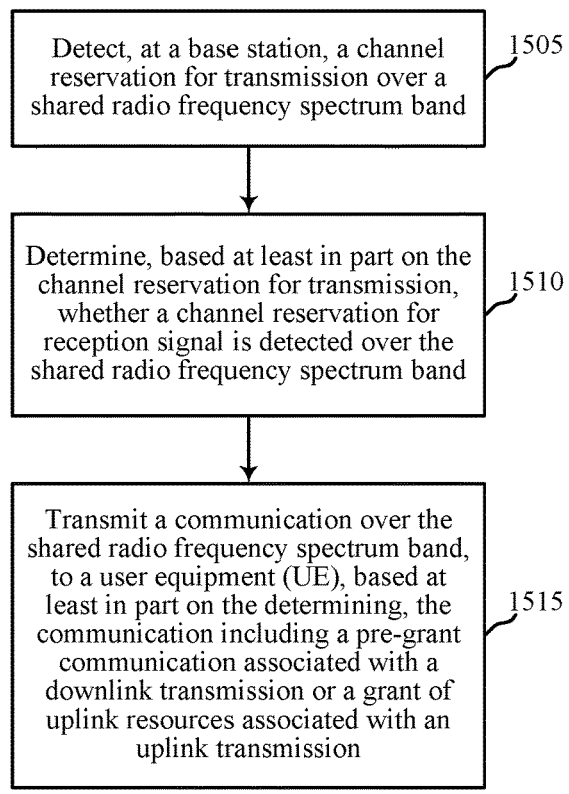
FIGS. 15 through 19 are flow charts illustrating examples of methods for wireless communication at a base station or device that supports using over-the-air signaling to provide an increased reuse factor in a shared radio frequency spectrum band, in accordance with various aspects of the present disclosure.

FIG. 15 is a flow chart illustrating an example of a method 1500 for wireless communication at a base station or device that supports using over-the-air signaling to provide an increased reuse factor in a shared radio frequency spectrum band, in accordance with various aspects of the present disclosure. The method 1500 may be performed by a base station or a device including aspects of one or more of the base stations 105 or devices 905 described with reference to FIGS. 1, 3-10, and 13. In some examples, a base station or device may execute one or more sets of codes to control the functional elements of the base station or device to perform the functions described below.

At block 1505, a base station may detect a channel reservation for transmission over a shared radio frequency spectrum band, as described with reference to FIGS. 3-8. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at block 1505 may be performed using a base station wireless communication manager 920 described with reference to FIGS. 9, 10, and 13, or a channel reservation detector 935 described with reference to FIGS. 9 and 10.

At block 1510, the base station may determine, based at least in part on the channel reservation for transmission, whether a channel reservation for reception signal is detected over the shared radio frequency spectrum band, as described with reference to FIGS. 3-8. Operation(s) at block 1510 may be performed using a base station wireless communication manager 920 described with reference to FIGS. 9, 10, and 13, or a channel reservation detector 935 described with reference to FIGS. 9 and 10.

At block 1515, the base station may transmit a communication over the shared radio frequency spectrum band, to a UE, based at least in part on the determining, as described with reference to FIGS. 3-8. The communication may include a pre-grant communication associated with a downlink transmission or a grant of uplink resources associated with an uplink transmission. Operation(s) at block 1515 may be performed using a base station wireless communication manager 920 described with reference to FIGS. 9, 10, and 13, or an outgoing communication processor 940 described with reference to FIGS. 9 and 10.

Thus, the method 1500 may provide for wireless communication. It should be noted that the method 1500 is just one implementation and that the operations of the method 1500 may be rearranged or otherwise modified such that other implementations are possible.

Figure 16:
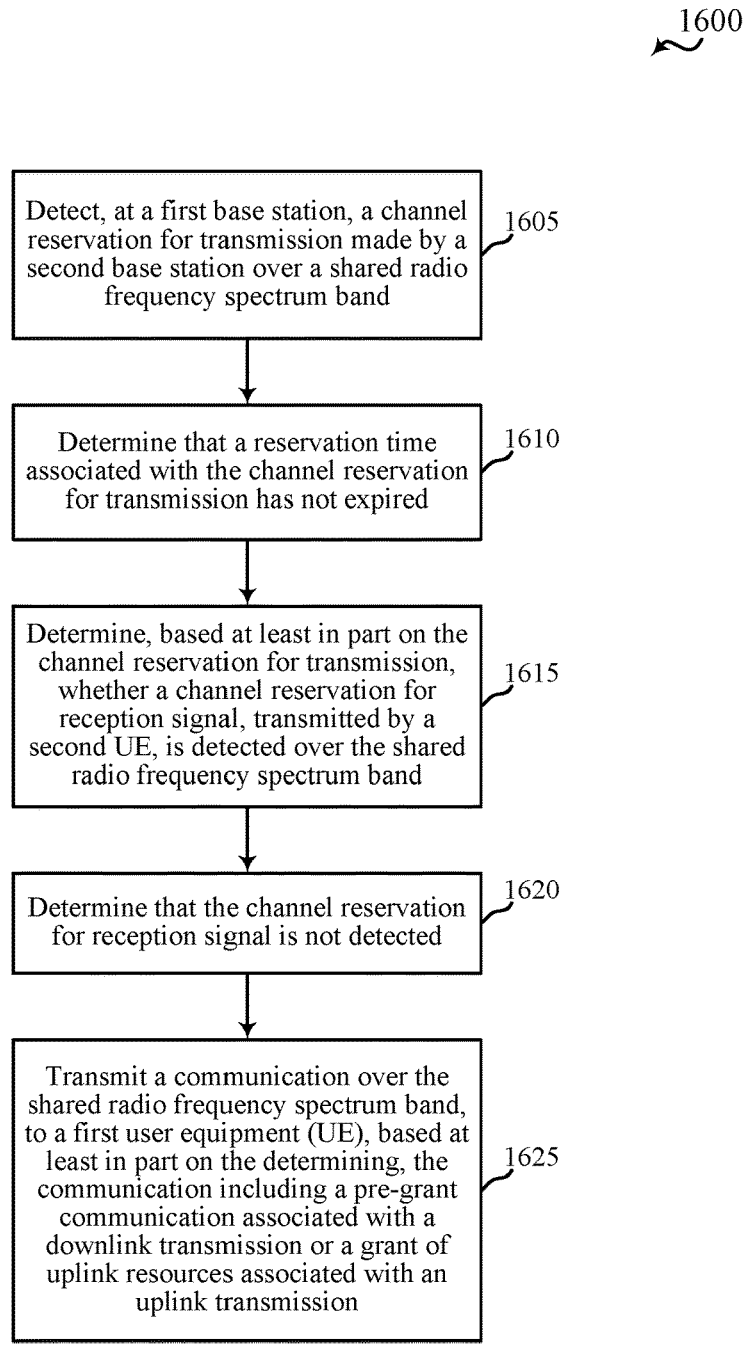

FIG. 16 is a flow chart illustrating an example of a method 1600 for wireless communication at a base station or device that supports using over-the-air signaling to provide an increased reuse factor in a shared radio frequency spectrum band, in accordance with various aspects of the present disclosure. The method 1600 may be performed by a base station or a device including aspects of one or more of the base stations 105 or devices 905 described with reference to FIGS. 1, 3-10, and 13. In some examples, a base station or device may execute one or more sets of codes to control the functional elements of the base station or device to perform the functions described below.

At block 1605, a first base station may detect a channel reservation for transmission over a shared radio frequency spectrum band, as described with reference to FIGS. 3-5. The channel reservation for transmission may be made by a second base station. At block 1605, the first base station may detect at least one of a CTS-to-self signal transmitted by the second base station or a PFFICH transmitted by the second base station. At block 1610, the first base station may determine that a reservation time associated with the channel reservation for transmission has not expired. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at blocks 1605 and 1610 may be performed using a base station wireless communication manager 920 described with reference to FIGS. 9, 10, and 13, or a channel reservation detector 935 described with reference to FIGS. 9 and 10.

At block 1615, the first base station may determine, based at least in part on the channel reservation for transmission, whether a channel reservation for reception signal is detected over the shared radio frequency spectrum band, as described with reference to FIGS. 3-5. The channel reservation for reception signal (e.g., a CTS) may be transmitted by a second UE. Operation(s) at block 1615 may be performed using a base station wireless communication manager 920 described with reference to FIGS. 9, 10, and 13, or a channel reservation detector 935 described with reference to FIGS. 9 and 10.

At block 1620, the first base station may determine the channel reservation for reception signal is not detected. Operation(s) at block 1620 may be performed using a base station wireless communication manager 920 described with reference to FIGS. 9, 10, and 13, or a channel reservation detector 935 described with reference to FIGS. 9 and 10.

At block 1625, the first base station may transmit a communication over the shared radio frequency spectrum band, to a first UE, based at least in part on the determining, as described with reference to FIGS. 3-5. The communication may include a pre-grant communication associated with a downlink transmission or a grant of uplink resources associated with an uplink transmission. The communication may also include a CTS-to-self signal. In some examples, the CTS-to-self signal may be transmitted before, or at the beginning of, the pre-grant communication or grant of uplink resources. Operation(s) at block 1625 may be performed using a base station wireless communication manager 920 described with reference to FIGS. 9, 10, and 13, or an outgoing communication processor 940 described with reference to FIGS. 9 and 10.

Thus, the method 1600 may provide for wireless communication. It should be noted that the method 1600 is just one implementation and that the operations of the method 1600 may be rearranged or otherwise modified such that other implementations are possible.

Figure 17:
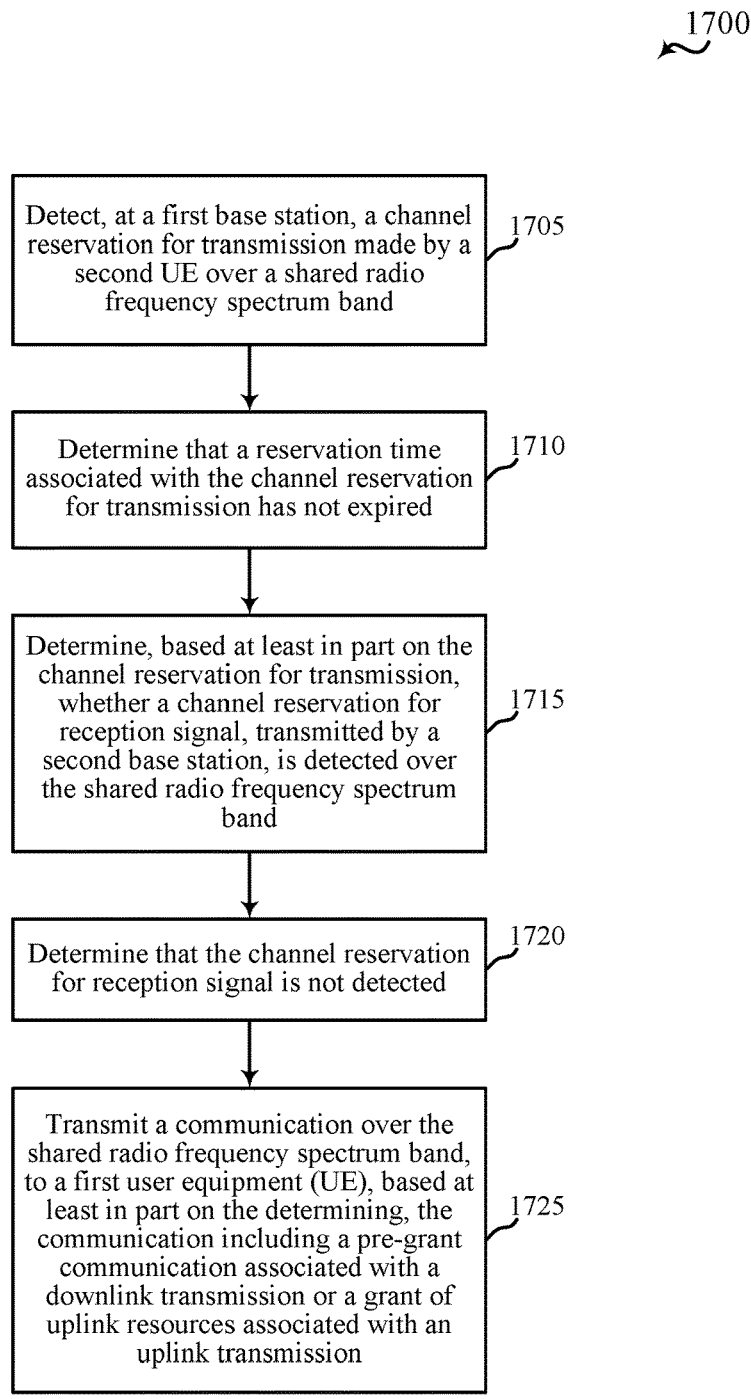

FIG. 17 is a flow chart illustrating an example of a method 1700 for wireless communication at a base station or device that supports using over-the-air signaling to provide an increased reuse factor in a shared radio frequency spectrum band, in accordance with various aspects of the present disclosure. The method 1700 may be performed by a base station or a device including aspects of one or more of the base stations 105 or devices 905 described with reference to FIGS. 1, 3-10, and 13. In some examples, a base station or device may execute one or more sets of codes to control the functional elements of the base station or device to perform the functions described below.

At block 1705, a first base station may detect a channel reservation for transmission over a shared radio frequency spectrum band, as described with reference to FIGS. 6-8. The channel reservation for transmission may be made by a second UE. At block 1705, the first base station may detect a Wi-Fi preamble transmitted by the second UE. The Wi-Fi preamble may have a length field indicating a duration of an uplink transmission from the second UE to a second base station.

At block 1710, the first base station may determine that a reservation time associated with the channel reservation for transmission (e.g., the duration of the uplink transmission from the second UE to the second base station) has not expired. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at blocks 1705 and 1710 may be performed using a base station wireless communication manager 920 described with reference to FIGS. 9, 10, and 13, or a channel reservation detector 935 described with reference to FIGS. 9 and 10.

At block 1715, the first base station may determine, based at least in part on the channel reservation for transmission, whether a channel reservation for reception signal is detected over the shared radio frequency spectrum band, as described with reference to FIGS. 6-8. The channel reservation for reception signal (e.g., a CTS-to-self signal) may be transmitted by the second base station. Operation(s) at block 1715 may be performed using a base station wireless communication manager 920 described with reference to FIGS. 9, 10, and 13, or a channel reservation detector 935 described with reference to FIGS. 9 and 10.

At block 1720, the first base station may determine that the channel reservation for reception signal is not detected. Operation(s) at block 1720 may be performed using a base station wireless communication manager 920 described with reference to FIGS. 9, 10, and 13, or a channel reservation detector 935 described with reference to FIGS. 9 and 10.

At block 1725, the first base station may transmit a communication over the shared radio frequency spectrum band, to a first UE, based at least in part on the determining, as described with reference to FIGS. 6-8. The communication may include a pre-grant communication associated with a downlink transmission or a grant of uplink resources associated with an uplink transmission. The communication may also include a CTS-to-self signal. In some examples, the CTS-to-self signal may be transmitted before, or at the beginning of, the pre-grant communication or grant of uplink resources. Operation(s) at block 1725 may be performed using a base station wireless communication manager 920 described with reference to FIGS. 9, 10, and 13, or an outgoing communication processor 940 described with reference to FIGS. 9 and 10.

In an alternative embodiment of the method 1700, the channel reservation for transmission may be made by a Wi-Fi transmitter; and at block 1705, the first base station may detect a RTS signal transmitted by the Wi-Fi transmitter. Also in the alternative embodiment, the channel reservation for reception signal may be transmitted by a Wi-Fi receiver and may include CTS signal.

Thus, the method 1700 may provide for wireless communication. It should be noted that the method 1700 is just one implementation and that the operations of the method 1700 may be rearranged or otherwise modified such that other implementations are possible.

Figure 18:
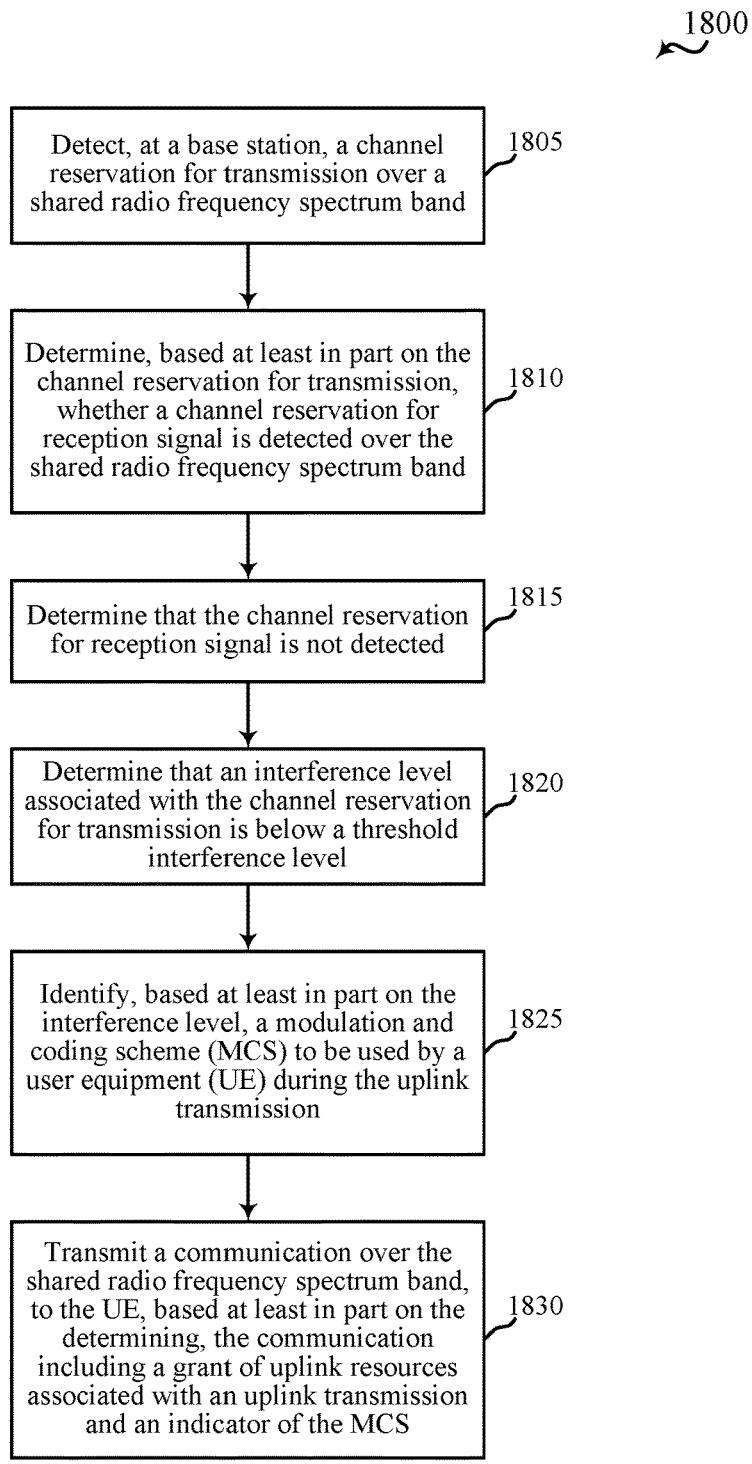

FIG. 18 is a flow chart illustrating an example of a method 1800 for wireless communication at a base station or device that supports using over-the-air signaling to provide an increased reuse factor in a shared radio frequency spectrum band, in accordance with various aspects of the present disclosure. The method 1800 may be performed by a base station or a device including aspects of one or more of the base stations 105 or devices 905 described with reference to FIGS. 1, 3-10, and 13. In some examples, a base station or device may execute one or more sets of codes to control the functional elements of the base station or device to perform the functions described below.

At block 1805, a base station may detect a channel reservation for transmission over a shared radio frequency spectrum band, as described with reference to FIGS. 3, 5, 6, and 8. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at block 1805 may be performed using a base station wireless communication manager 920 described with reference to FIGS. 9, 10, and 13, or a channel reservation detector 935 described with reference to FIGS. 9 and 10.

At block 1810, the base station may determine, based at least in part on the channel reservation for transmission, whether a channel reservation for reception signal is detected over the shared radio frequency spectrum band, as described with reference to FIGS. 3, 5, 6, and 8. Operation(s) at block 1810 may be performed using a base station wireless communication manager 920 described with reference to FIGS. 9, 10, and 13, or a channel reservation detector 935 described with reference to FIGS. 9 and 10.

At block 1815, the base station may determine that the channel reservation for reception signal is not detected. Operation(s) at block 1815 may be performed using a base station wireless communication manager 920 described with reference to FIGS. 9, 10, and 13, or a channel reservation detector 935 described with reference to FIGS. 9 and 10.

At block 1820, the base station may determine that an interference level associated with the channel reservation for transmission is below a threshold interference level. Operation(s) at block 1820 may be performed using a base station wireless communication manager 920 described with reference to FIGS. 9, 10, and 13, or an interference determiner 1005 described with reference to FIG. 10.

At block 1825, the base station may identify, based at least in part on the interference level, a MCS to be used by the first UE during an uplink transmission associated with a grant of uplink resources. Operation(s) at block 1825 may be performed using a base station wireless communication manager 920 described with reference to FIGS. 9, 10, and 13, or an MCS identifier 1010 described with reference to FIG. 10.

At block 1830, the base station may transmit a communication over the shared radio frequency spectrum band, to a UE, based at least in part on the determining, as described with reference to FIGS. 3, 5, 6, and 8. The communication may include the grant of uplink resources associated with the uplink transmission and an indicator of the MCS identified at block 1825. The communication may also include a CTS-to-self signal. In some examples, the CTS-to-self signal may be transmitted before, or at the beginning of, the pre-grant communication or grant of uplink resources. Operation(s) at block 1830 may be performed using a base station wireless communication manager 920 described with reference to FIGS. 9, 10, and 13, or an outgoing communication processor 940 described with reference to FIGS. 9 and 10.

Thus, the method 1800 may provide for wireless communication. It should be noted that the method 1800 is just one implementation and that the operations of the method 1800 may be rearranged or otherwise modified such that other implementations are possible.

Figure 19:
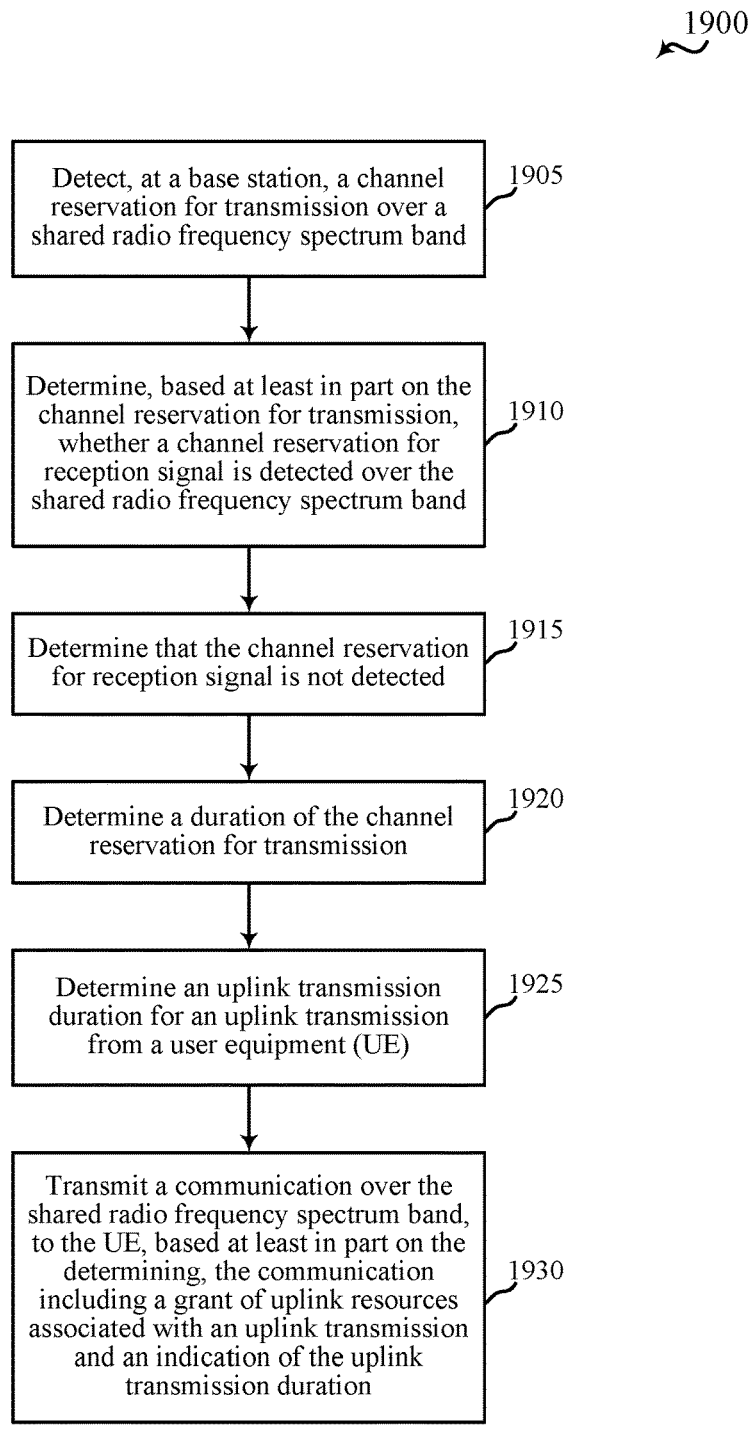

FIG. 19 is a flow chart illustrating an example of a method 1900 for wireless communication at a base station or device that supports using over-the-air signaling to provide an increased reuse factor in a shared radio frequency spectrum band, in accordance with various aspects of the present disclosure. The method 1900 may be performed by a base station or a device including aspects of one or more of the base stations 105 or devices 905 described with reference to FIGS. 1, 3-10, and 13. In some examples, a base station or device may execute one or more sets of codes to control the functional elements of the base station or device to perform the functions described below.

At block 1905, a base station may detect a channel reservation for transmission over a shared radio frequency spectrum band, as described with reference to FIGS. 3, 5, 6, and 8. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at block 1905 may be performed using a base station wireless communication manager 920 described with reference to FIGS. 9, 10, and 13, or a channel reservation detector 935 described with reference to FIGS. 9 and 10.

At block 1910, the base station may determine, based at least in part on the channel reservation for transmission, whether a channel reservation for reception signal is detected over the shared radio frequency spectrum band, as described with reference to FIGS. 3, 5, 6, and 8. Operation(s) at block 1910 may be performed using a base station wireless communication manager 920 described with reference to FIGS. 9, 10, and 13, or a channel reservation detector 935 described with reference to FIGS. 9 and 10.

At block 1915, the base station may determine that the channel reservation for reception signal is not detected. Operation(s) at block 1915 may be performed using a base station wireless communication manager 920 described with reference to FIGS. 9, 10, and 13, or a channel reservation detector 935 described with reference to FIGS. 9 and 10.

At block 1920, the base station may determine a duration of the channel reservation for transmission. Operation(s) at block 1920 may be performed using a base station wireless communication manager 920 described with reference to FIGS. 9, 10, and 13, or a channel reservation detector 935 described with reference to FIGS. 9 and 10.

At block 1925, the base station may determine an uplink transmission duration for an uplink transmission from a UE. The uplink transmission duration may be determined such that the uplink transmission duration is shorter than the duration of the channel reservation for transmission. Operation(s) at block 1925 may be performed using a base station wireless communication manager 920 described with reference to FIGS. 9, 10, and 13, or an uplink transmission duration determiner 1015 described with reference to FIG. 10.

At block 1930, the base station may transmit a communication over the shared radio frequency spectrum band, to a UE, based at least in part on the determining, as described with reference to FIGS. 3, 5, 6, and 8. The communication may include a grant of uplink resources associated with the uplink transmission. The grant of uplink resources may, in turn, include an indication of the uplink transmission duration determined at block 1925. The communication may also include a CTS-to-self signal. In some examples, the CTS-to-self signal may be transmitted before, or at the beginning of, the pre-grant communication or grant of uplink resources. Operation(s) at block 1930 may be performed using a base station wireless communication manager 920 described with reference to FIGS. 9, 10, and 13, or an outgoing communication processor 940 described with reference to FIGS. 9 and 10.

Thus, the method 1900 may provide for wireless communication. It should be noted that the method 1900 is just one implementation and that the operations of the method 1900 may be rearranged or otherwise modified such that other implementations are possible.

In some examples, aspects of the methods 1500, 1600, 1700, 1800, or 1900, described with reference to FIGS. 15-19, may be combined.

Figure 20:
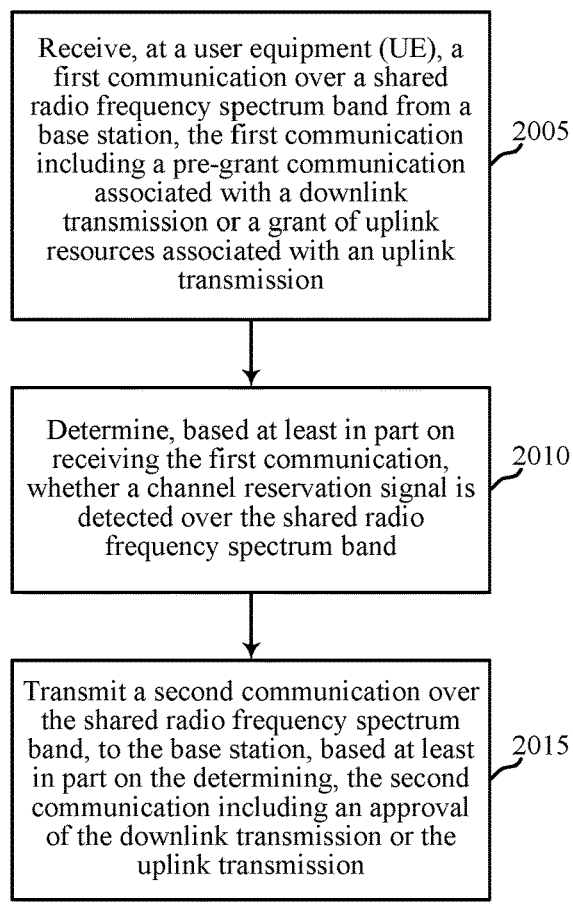
FIGS. 20 through 24 are flow charts illustrating examples of methods for wireless communication at a UE or device that supports using over-the-air signaling to provide an increased reuse factor in a shared radio frequency spectrum band, in accordance with various aspects of the present disclosure.

FIG. 20 is a flow chart illustrating an example of a method 2000 for wireless communication at a base station or device that supports using over-the-air signaling to provide an increased reuse factor in a shared radio frequency spectrum band, in accordance with various aspects of the present disclosure. The method 2000 may be performed by a UE or device including aspects of one or more of the UEs 115 or devices 1115 described with reference to FIGS. 1, 3-8, 11, 12, and 14, in accordance with various aspects of the present disclosure. In some examples, a UE or device may execute one or more sets of codes to control the functional elements of the UE or device to perform the functions described below.

At block 2005, a UE may receive a first communication over a shared radio frequency spectrum band from a base station, as described with reference to FIGS. 3-8. The first communication may include a pre-grant communication associated with a downlink transmission or a grant of uplink resources associated with an uplink transmission. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at block 2005 may be performed using a UE wireless communication manager 1120 described with reference to FIGS. 11, 12, and 14, or an incoming communication processor 1135 described with reference to FIGS. 11 and 12.

At block 2010, the UE may determine, based at least in part on receiving the first communication, whether a channel reservation signal is detected over the shared radio frequency spectrum band, as described with reference to FIGS. 3-8. Operation(s) at block 2010 may be performed using a UE wireless communication manager 1120 described with reference to FIGS. 11, 12, and 14, or a spectrum sharing evaluator 1140 described with reference to FIGS. 11 and 12.

At block 2015, the UE may transmit a second communication over the shared radio frequency spectrum band, to the base station, based at least in part on the determining at block 2010, as described with reference to FIGS. 3-8. The second communication may include an approval of the downlink transmission or the uplink transmission. Operation(s) at block 2015 may be performed using a UE wireless communication manager 1120 described with reference to FIGS. 11, 12, and 14, or an outgoing communication processor 1145 described with reference to FIGS. 11 and 12.

Thus, the method 2000 may provide for wireless communication. It should be noted that the method 2000 is just one implementation and that the operations of the method 2000 may be rearranged or otherwise modified such that other implementations are possible.

Figure 21:
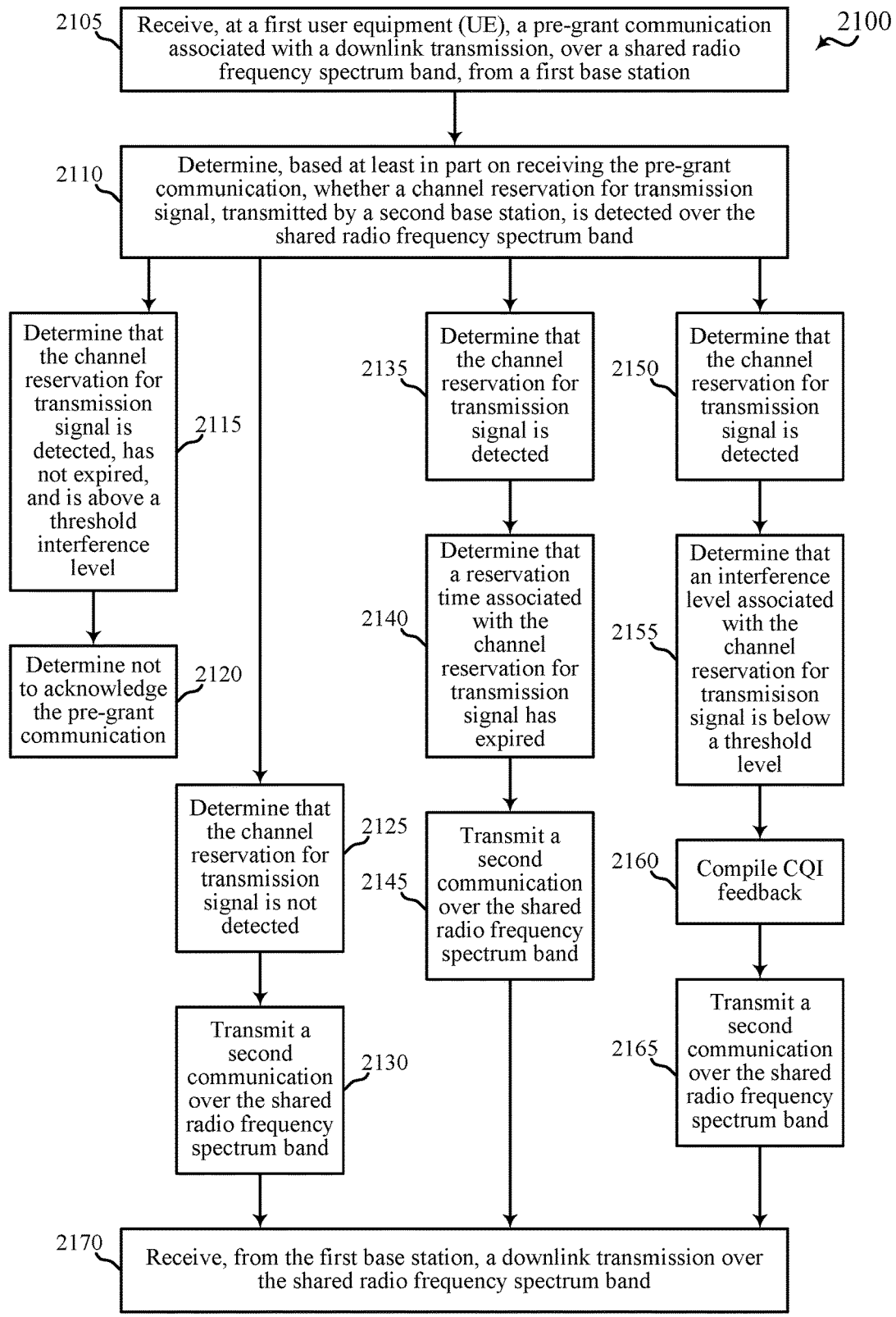

FIG. 21 is a flow chart illustrating an example of a method 2100 for wireless communication at a base station or device that supports using over-the-air signaling to provide an increased reuse factor in a shared radio frequency spectrum band, in accordance with various aspects of the present disclosure. The method 2100 may be performed by a UE or device including aspects of one or more of the UEs 115 or devices 1115 described with reference to FIGS. 1, 3-8, 11, 12, and 14, in accordance with various aspects of the present disclosure. In some examples, a UE or device may execute one or more sets of codes to control the functional elements of the UE or device to perform the functions described below.

At block 2105, a first UE may receive a pre-grant communication associated with a downlink transmission, over a shared radio frequency spectrum band, from a first base station, as described with reference to FIGS. 3 and 4. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at block 2105 may be performed using a UE wireless communication manager 1120 described with reference to FIGS. 11, 12, and 14, or an incoming communication processor 1135 described with reference to FIGS. 11 and 12.

At block 2110, the first UE may determine, based at least in part on receiving the pre-grant communication, whether a channel reservation for transmission signal, transmitted by a second base station, is detected over the shared radio frequency spectrum band, as described with reference to FIGS. 3 and 4. Operation(s) at block 2110 may be performed using a UE wireless communication manager 1120 described with reference to FIGS. 11, 12, and 14, a spectrum sharing evaluator 1140 described with reference to FIGS. 11 and 12, or a DL during DL evaluator 1205 described with reference to FIG. 12.

Depending on the result of the determination made at block 2110, the method 2100 may continue at block 2115, 2125, 2135, or 2150. At block 2115, the first UE may determine that the channel reservation for transmission signal is detected, has not expired, and is above a threshold interference level. At block 2120, and based at least in part on the determination at block 2115, the first UE may determine not to acknowledge the pre-grant communication received from the first base station.

At block 2125, the first UE may determine that the channel reservation for transmission signal is not detected; and at block 2130, the first UE may transmit a second communication over the shared radio frequency spectrum band, to the first base station, based at least in part on not detecting the channel reservation for transmission signal, as described with reference to FIGS. 3 and 4. The second communication may include a channel reservation for reception signal and an approval of the downlink transmission.

At block 2135, the first UE may determine that the channel reservation for transmission signal is detected. At block 2140, the first UE may determine a reservation time associated with the channel reservation for transmission signal has expired. At block 2145, the first UE may transmit the second communication based at least in part on the reservation time being expired, as described with reference to FIGS. 3 and 4.

At block 2150, the first UE may determine that the channel reservation for transmission signal is detected. At block 2155, the first UE may determine that an interference level associated with the channel reservation for transmission signal is below a threshold interference level. At block 2160, the first UE may compile CQI feedback, based at least in part on the interference level, to adjust a MCS of the downlink transmission. At block 2165, the first UE may transmit the second communication based at least in part on the interference level being below a second threshold interference level, as described with reference to FIGS. 3 and 4. The second communication may include the CQI feedback.

Operation(s) at block 2115, 2120, 2125, 2130, 2135, 2140, 2145, 2150, 2155, 2160, and 2165 may be performed using a UE wireless communication manager 1120 described with reference to FIGS. 11, 12, and 14, the spectrum sharing evaluator 1140 or an outgoing communication processor 1145 described with reference to FIGS. 11 and 12, or a UL during DL evaluator 1205 or a UL during DL communication manager 1225 described with reference to FIG. 12.

At block 2170 (e.g., following block 2130, 2145, or 2165), the first UE may receive, from the first base station, a downlink transmission over the shared radio frequency spectrum band. The downlink transmission may be received subsequent to (or in response to) transmitting the second communication.

In some examples, the channel reservation for transmission signal may include a CTS-to-self signal, the channel reservation for reception signal may include a CTS signal, and the approval of the downlink transmission may include a pre-grant ACK signal.

Thus, the method 2100 may provide for wireless communication. It should be noted that the method 2100 is just one implementation and that the operations of the method 2100 may be rearranged or otherwise modified such that other implementations are possible.

Figure 22:
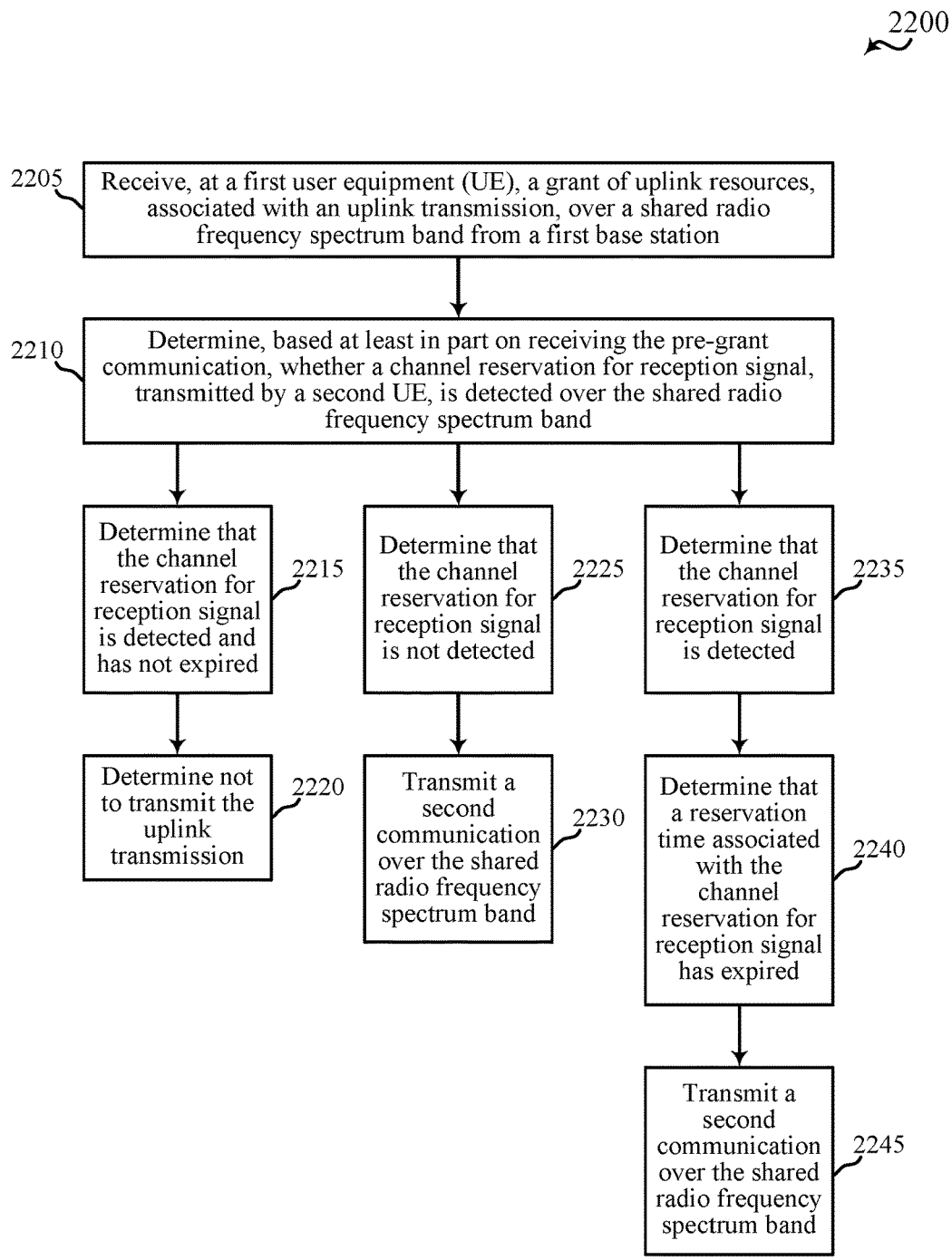

FIG. 22 is a flow chart illustrating an example of a method 2200 for wireless communication at a base station or device that supports using over-the-air signaling to provide an increased reuse factor in a shared radio frequency spectrum band, in accordance with various aspects of the present disclosure. The method 2200 may be performed by a UE or device including aspects of one or more of the UEs 115 or devices 1115 described with reference to FIGS. 1, 3-8, 11, 12, and 14, in accordance with various aspects of the present disclosure. In some examples, a UE or device may execute one or more sets of codes to control the functional elements of the UE or device to perform the functions described below.

At block 2205, a first UE may receive a grant of uplink resources associated with an uplink transmission, over a shared radio frequency spectrum band, from a first base station, as described with reference to FIGS. 3 and 5. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at block 2205 may be performed using a UE wireless communication manager 1120 described with reference to FIGS. 11, 12, and 14, or an incoming communication processor 1135 described with reference to FIGS. 11 and 12.

At block 2210, the first UE may determine, based at least in part on receiving the grant of uplink resources, whether a channel reservation for reception signal, transmitted by a second UE, is detected over the shared radio frequency spectrum band, as described with reference to FIGS. 3 and 5. Operation(s) at block 2210 may be performed using a UE wireless communication manager 1120 described with reference to FIGS. 11, 12, and 14, a spectrum sharing evaluator 1140 described with reference to FIGS. 11 and 12, or a UL during DL evaluator 1210 described with reference to FIG. 12.

Depending on the result of the determination made at block 2210, the method 2200 may continue at block 2215, 2225, or 2235. At block 2215, the first UE may determine that the channel reservation for reception signal is detected and has not expired. At block 2220, and based at least in part on the determination at block 2215, the first UE may determine not to transmit the uplink transmission to the first base station.

At block 2225, the first UE may determine that the channel reservation for reception signal is not detected; and at block 2230, the first UE may transmit a second communication over the shared radio frequency spectrum band, to the first base station, based at least in part on not detecting the channel reservation for reception signal, as described with reference to FIGS. 3 and 5. The second communication may include a channel reservation for transmission signal and the uplink transmission.

At block 2235, the first UE may determine that the channel reservation for reception signal is detected. At block 2240, the first UE may determine a reservation time associated with the channel reservation for reception signal has expired. At block 2245, the first UE may transmit the second communication based at least in part on the reservation time being expired, as described with reference to FIGS. 3 and 5.

Operation(s) at block 2215, 2220, 2225, 2230, 2235, 2240, and 2245 may be performed using a UE wireless communication manager 1120 described with reference to FIGS. 11, 12, and 14, a spectrum sharing evaluator 1140 or an outgoing communication processor 1145 described with reference to FIGS. 11 and 12, or a UL during DL evaluator 1210 or a UL during DL communication manager 1230 described with reference to FIG. 12.

In some examples, the channel reservation for reception signal may include a CTS signal, and the channel reservation for transmission signal may include a Wi-Fi preamble having a length field indicating a duration of the uplink transmission.

Thus, the method 2200 may provide for wireless communication. It should be noted that the method 2200 is just one implementation and that the operations of the method 2200 may be rearranged or otherwise modified such that other implementations are possible.

Figure 23:
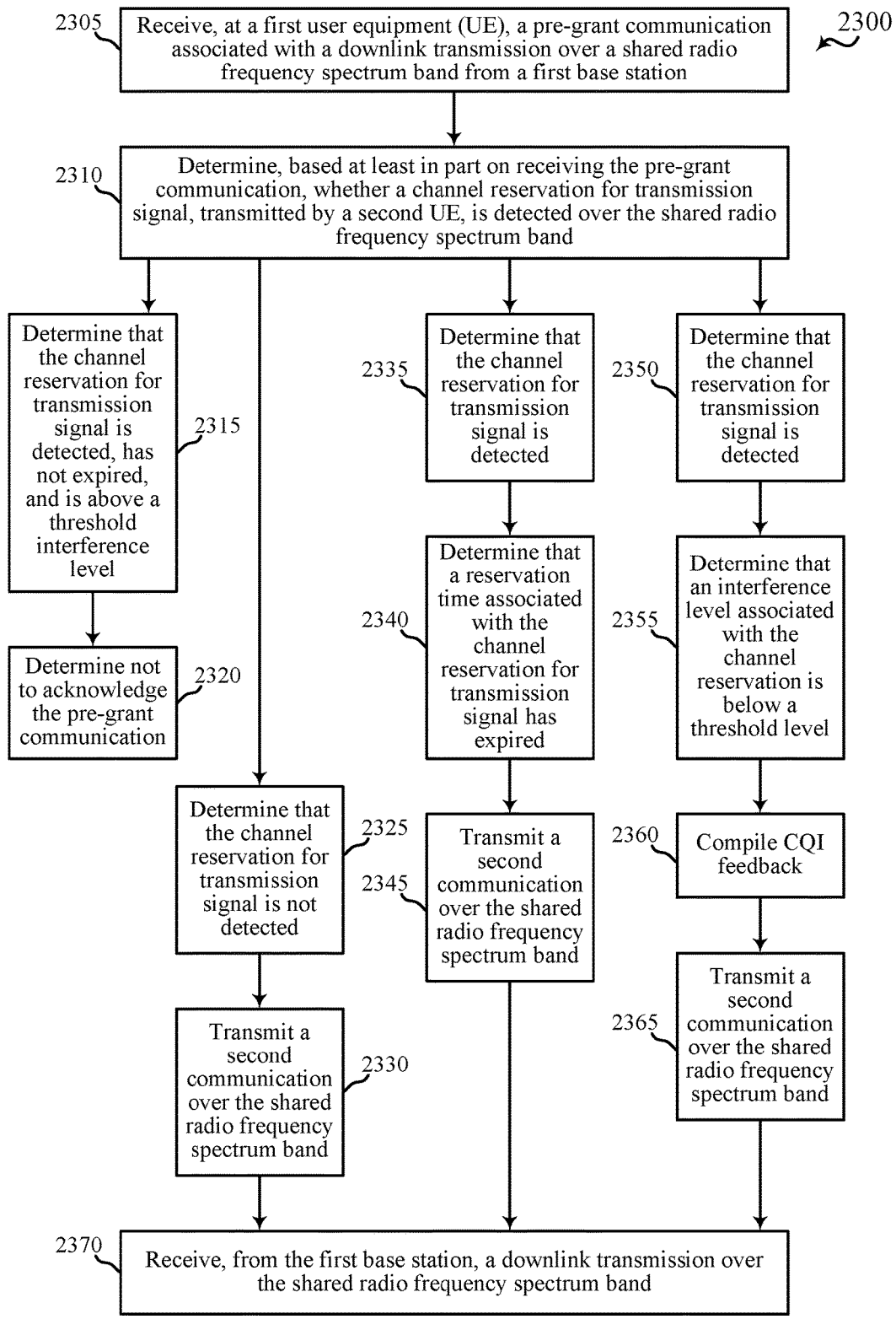

FIG. 23 is a flow chart illustrating an example of a method 2300 for wireless communication at a base station or device that supports using over-the-air signaling to provide an increased reuse factor in a shared radio frequency spectrum band, in accordance with various aspects of the present disclosure. The method 2300 may be performed by a UE or device including aspects of one or more of the UEs 115 or devices 1115 described with reference to FIGS. 1, 3-8, 11, 12, and 14, in accordance with various aspects of the present disclosure. In some examples, a UE or device may execute one or more sets of codes to control the functional elements of the UE or device to perform the functions described below.

At block 2305, a first UE may receive a pre-grant communication associated with a downlink transmission over a shared radio frequency spectrum band from a first base station, as described with reference to FIGS. 6-7. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at block 2305 may be performed using a UE wireless communication manager 1120 described with reference to FIGS. 11, 12, and 14, or an incoming communication processor 1135 described with reference to FIGS. 11 and 12.

At block 2310, the first UE may determine, based at least in part on receiving the pre-grant communication, whether a channel reservation for transmission signal, transmitted by a second UE or a Wi-Fi transmitter, is detected over the shared radio frequency spectrum band, as described with reference to FIGS. 6-7. Operation(s) at block 2310 may be performed using a UE wireless communication manager 1120 described with reference to FIGS. 11, 12, and 14, a spectrum sharing evaluator 1140 described with reference to FIGS. 11 and 12, or a DL during UL evaluator 1215 described with reference to FIG. 12.

Depending on the result of the determination made at block 2310, the method 2300 may continue at block 2315, 2325, 2335, or 2350. At block 2315, the first UE may determine that the channel reservation for transmission signal is detected, has not expired, and is above a threshold interference level. At block 2320, and based at least in part on the determination at block 2315, the first UE may determine not to acknowledge the pre-grant communication received from the first base station.

At block 2325, the first UE may determine that the channel reservation for transmission signal is not detected; and at block 2330, the first UE may transmit a second communication over the shared radio frequency spectrum band, to the first base station, based at least in part on not detecting the channel reservation for transmission signal, as described with reference to FIGS. 6-7. The second communication may include a channel reservation for reception signal and an approval of the downlink transmission.

At block 2335, the first UE may determine that the channel reservation for transmission signal is detected. At block 2340, the first UE may determine that a reservation time associated with the channel reservation for transmission signal has expired. At block 2345, the first UE may transmit the second communication based at least in part on the reservation time being expired, as described with reference to FIGS. 6-7.

At block 2350, the first UE may determine that the channel reservation for transmission signal is detected. At block 2355, the first UE may determine that an interference level associated with the channel reservation for transmission signal is below the threshold interference level. At block 2360, the first UE may compile CQI feedback, based at least in part on the interference level, to adjust a MCS of the downlink transmission. At block 2365, the first UE may transmit the second communication based at least in part on the interference level being below a second threshold interference level, as described with reference to FIGS. 6-7. The second communication may include the CQI feedback.

Operation(s) at block 2315, 2320, 2325, 2330, 2335, 2340, 2345, 2350, 2355, 2360, and 2365 may be performed using a UE wireless communication manager 1120 described with reference to FIGS. 11, 12, and 14, the spectrum sharing evaluator 1140 or an outgoing communication processor 1145 described with reference to FIGS. 11 and 12, or a DL during UL evaluator 1215 or a DL during UL communication manager 1235 described with reference to FIG. 12.

At block 2370 (e.g., following block 2330, 2345, or 2365), the first UE may receive, from the first base station, a downlink transmission over the shared radio frequency spectrum band. The downlink transmission may be received subsequent to (or in response to) transmitting the second communication.

In some examples, the channel reservation for transmission signal may include at least one of a Wi-Fi preamble or a RTS signal, the channel reservation for reception signal may include a CTS signal, and the approval of the downlink transmission may include a pre-grant ACK signal.

Thus, the method 2300 may provide for wireless communication. It should be noted that the method 2300 is just one implementation and that the operations of the method 2300 may be rearranged or otherwise modified such that other implementations are possible.

Figure 24:
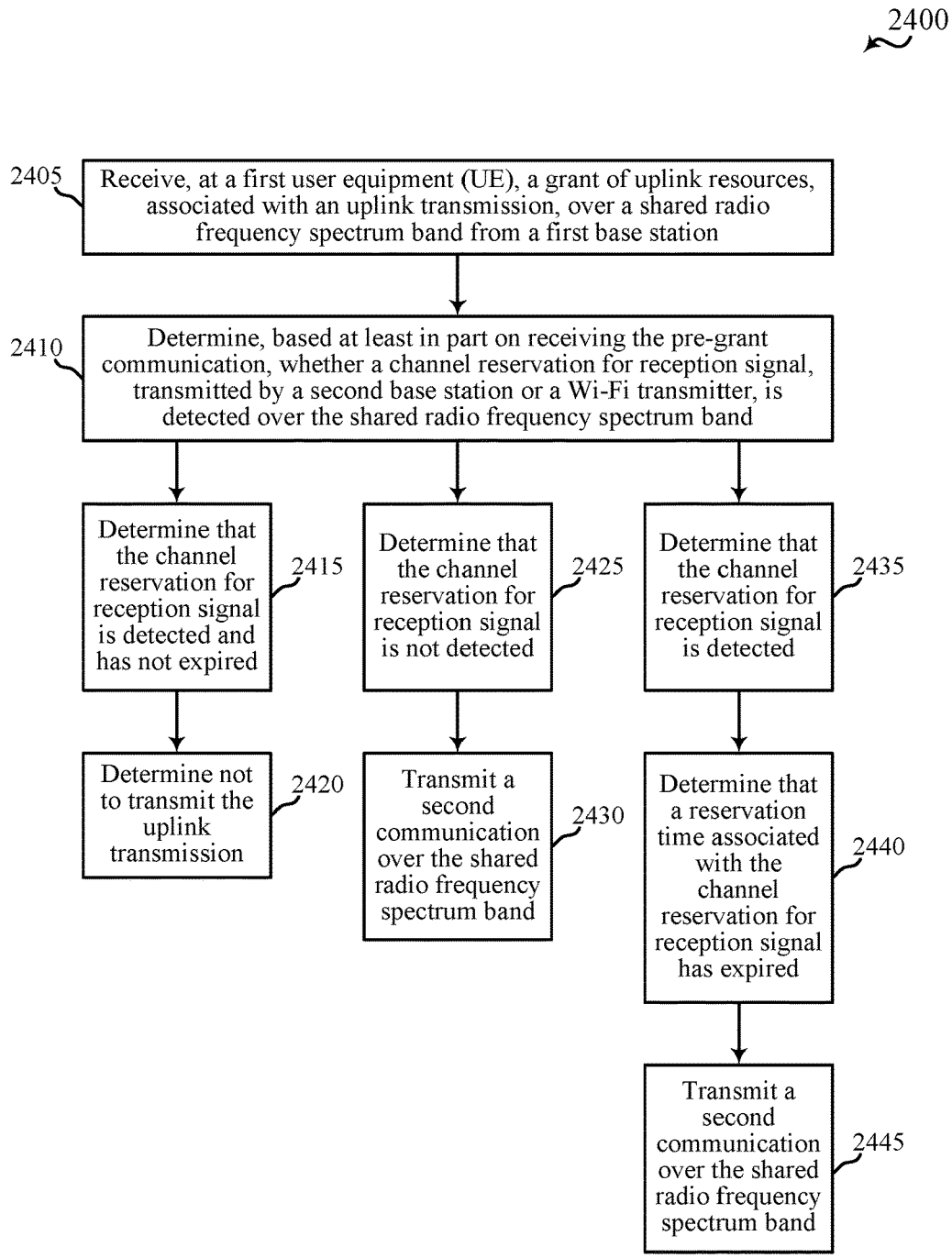

FIG. 24 is a flow chart illustrating an example of a method 2400 for wireless communication at a base station or device that supports using over-the-air signaling to provide an increased reuse factor in a shared radio frequency spectrum band, in accordance with various aspects of the present disclosure. The method 2400 may be performed by a UE or device including aspects of one or more of the UEs 115 or devices 1115 described with reference to FIGS. 1, 3-8, 11, 12, and 14, in accordance with various aspects of the present disclosure. In some examples, a UE or device may execute one or more sets of codes to control the functional elements of the UE or device to perform the functions described below.

At block 2405, a first UE may receive a grant of uplink resources associated with an uplink transmission over a shared radio frequency spectrum band from a first base station, as described with reference to FIGS. 6 and 8. The shared radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner). Operation(s) at block 2405 may be performed using a UE wireless communication manager 1120 described with reference to FIGS. 11, 12, and 14, or the incoming communication processor 1135 described with reference to FIGS. 11 and 12.

At block 2410, the first UE may determine, based at least in part on receiving the grant of uplink resources, whether a channel reservation for reception signal, transmitted by a second base station or a Wi-Fi receiver, is detected over the shared radio frequency spectrum band, as described with reference to FIGS. 6 and 8. Operation(s) at block 2410 may be performed using a UE wireless communication manager 1120 described with reference to FIGS. 11, 12, and 14, a spectrum sharing evaluator 1140 described with reference to FIGS. 11 and 12, or a UL during UL evaluator 1220 described with reference to FIG. 12.

Depending on the result of the determination made at block 2410, the method 2400 may continue at block 2415, 2425, or 2435. At block 2415, the first UE may determine that the channel reservation for reception signal is detected and has not expired. At block 2420, and based at least in part on the determination at block 2415, the first UE may determine not to transmit the uplink transmission to the first base station.

At block 2425, the first UE may determine that the channel reservation for reception signal is not detected; and at block 2430, the first UE may transmit a second communication over the shared radio frequency spectrum band, to the first base station, based at least in part on not detecting the channel reservation for reception signal, as described with reference to FIGS. 6 and 8. The second communication may include a channel reservation for transmission signal and the uplink transmission.

At block 2435, the first UE may determine that the channel reservation for reception signal is detected. At block 2440, the first UE may determine that a reservation time associated with the channel reservation for reception signal has expired. At block 2445, the first UE may transmit the second communication based at least in part on the reservation time being expired, as described with reference to FIGS. 6 and 8.

Operation(s) at block 2415, 2420, 2425, 2430, 2435, 2440, and 2445 may be performed using a UE wireless communication manager 1120 described with reference to FIGS. 11, 12, and 14, a spectrum sharing evaluator 1140 or an outgoing communication processor 1145 described with reference to FIGS. 11 and 12, or a UL during UL evaluator 1220 or a UL during UL communication manager 1240 described with reference to FIG. 12.

In some examples, the channel reservation for reception signal may include a CTS-to-self signal or a CTS signal, and the channel reservation for transmission signal may include a Wi-Fi preamble having a length field indicating a duration of the uplink transmission.

Thus, the method 2400 may provide for wireless communication. It should be noted that the method 2400 is just one implementation and that the operations of the method 2400 may be rearranged or otherwise modified such that other implementations are possible.

In some examples, aspects of the methods 2000, 2100, 2200, 2300, or 2400, described with reference to FIGS. 20-24, may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
   receiving, at a first user equipment (UE), a first communication over a shared radio frequency spectrum band from a first base station;
   determining, based at least in part on receiving the first communication, whether or not a channel reservation signal is detected over the shared radio frequency spectrum band, wherein:
      if the first communication comprises a pre-grant communication associated with a downlink communication, then the determining comprises determining whether or not a channel reservation for transmission signal is detected, and
      if the first communication comprises a grant of uplink resources associated with an uplink transmission, then the determining comprises determining whether or not a channel reservation for reception signal is detected; and
   transmitting a second communication over the shared radio frequency spectrum band, to the first base station, based at least in part on determining that the channel reservation signal is not detected, the second communication comprising an approval of the downlink transmission, or the uplink transmission, wherein:
      if the first communication comprises the pre-grant communication associated with a downlink communication, then transmitting the second communication occurs whether or not a channel reservation for reception signal corresponding to the channel reservation for transmission is received; and
      if the first communication comprises the grant of uplink resources, then transmitting the second communication occurs whether or not a channel reservation for transmission signal corresponding to the channel reservation for reception is received.

2. The method of claim 1, wherein the first communication comprises the pre-grant communication, and the second communication comprises a second channel reservation for reception signal and the approval of the downlink transmission.

3. The method of claim 2, wherein the channel reservation for transmission signal comprises a Clear-to-Send (CTS)-to-self signal, and the approval of the downlink transmission comprises a pre-grant acknowledgement (ACK) signal.

4. The method of claim 2, further comprising:
   receiving from the first base station, subsequent to transmitting the second communication, the downlink transmission over the shared radio frequency spectrum band.

5. The method of claim 1, wherein the first communication comprises the grant of uplink resources, and the second communication comprises a second channel reservation for transmission signal and the uplink transmission.

6. The method of claim 5, wherein the second channel reservation for transmission signal comprises a Wi-Fi preamble having a length field indicating a duration of the uplink transmission.

7. The method of claim 1, wherein the channel reservation for transmission signal is transmitted by a second base station.

8. The method of claim 2, wherein the channel reservation for reception signal comprises a CTS signal received from another UE.

9. The method of claim 5, further comprising:
   determining that an interference level associated with the channel reservation for transmission signal is below a threshold interference level;
   compiling channel quality indicator (CQI) feedback, based at least in part on the interference level, to adjust a modulation and coding scheme (MCS) of the downlink transmission; and
   transmitting the second communication based at least in part on the interference level being below the threshold interference level, the second communication further comprising the CQI feedback.

10. An apparatus for wireless communication, comprising:
    a processor;
    memory in communication with the processor; and instructions stored in the memory, the instructions being executable by the processor to:
  receive, at a first user equipment (UE), a first communication over a shared radio frequency spectrum band from a first base station;
  determine, based at least in part on receiving the first communication, whether or not a channel reservation signal is detected over the shared radio frequency spectrum band, wherein:
    if the first communication comprises a pre-grant communication associated with a downlink communication, then the determining comprises determining whether or not a channel reservation for transmission signal is detected, and
    if the first communication comprises a grant of uplink resources associated with an uplink transmission, then the determining comprises determining whether or not a channel reservation for reception signal is detected; and
  transmit a second communication over the shared radio frequency spectrum band, to the first base station, based at least in part on determining that the channel reservation signal is not detected, the second communication comprising an approval of the downlink transmission or the uplink transmission, wherein:
    if the first communication comprises the pre-grant communication associated with a downlink communication, then transmitting the second communication occurs whether or not a channel reservation for reception signal corresponding to the channel reservation for transmission is received; and
    if the first communication comprises the grant of uplink resources, then transmitting the second communication occurs whether or not a channel reservation for transmission signal corresponding to the channel reservation for reception is received.

11. The apparatus of claim 10, wherein the first communication comprises the pre-grant communication, and the second communication comprises a second channel reservation for reception signal and the approval of the downlink transmission.

12. The apparatus of claim 11, wherein the channel reservation for transmission signal comprises a Clear-to-Send (CTS)-to-self signal, and the approval of the downlink transmission comprises a pre-grant acknowledgement (ACK) signal.

13. The apparatus of claim 11, wherein the instructions are executable by the processor to:
  receive from the first base station, subsequent to transmitting the second communication, the downlink transmission over the shared radio frequency spectrum band.

14. The apparatus of claim 10, wherein the first communication comprises the grant of uplink resources, and the second communication comprises a second channel reservation for transmission signal and the uplink transmission.

15. The apparatus of claim 14, wherein the second channel reservation for transmission signal comprises a Wi-Fi preamble having a length field indicating a duration of the uplink transmission.

16. The apparatus of claim 14, wherein the instructions are executable by the processor to:
  determine that an interference level associated with the channel reservation for transmission signal is below a threshold interference level;
  compile channel quality indicator (CQI) feedback, based at least in part on the interference level, to adjust a modulation and coding scheme (MCS) of the downlink transmission; and
  transmit the second communication based at least in part on the interference level being below the threshold interference level, the second communication further comprising the CQI feedback.

17. A method of wireless communication, comprising:
  detecting, at a first base station, a channel reservation for transmission signal over a shared radio frequency spectrum band;
  determining, at the first base station and in response to detecting the channel reservation for transmission signal, that a channel reservation for reception signal corresponding to the detected channel reservation for transmission signal is not detected over the shared radio frequency spectrum band; and
  transmitting a communication over the shared radio frequency spectrum band, to a first user equipment (UE), based at least in part on determining that the channel reservation for reception signal corresponding to the detected channel reservation for transmission signal is not detected, the communication comprising a pre-grant communication associated with a downlink transmission or a grant of uplink resources associated with an uplink transmission.

18. The method of claim 17, wherein the detected channel reservation for transmission signal is transmitted by a second base station.

19. The method of claim 17, wherein the detected channel reservation for transmission signal is transmitted by a second UE.

20. The method of claim 17, wherein the detected channel reservation for transmission signal is transmitted by a Wi-Fi transmitter.

21. The method of claim 17, wherein the communication comprises the grant of uplink resources, the method further comprising:
  determining an interference level associated with the detected channel reservation for transmission signal;
  identifying, based at least in part on the interference level, a modulation and coding scheme (MCS) to be used by the first UE during the uplink transmission; and
  transmitting an indicator of the MCS with the communication.

22. The method of claim 17, wherein the communication comprises the grant of uplink resources, the method further comprising:
  determining a reservation duration of the detected channel reservation for transmission signal; and
  indicating, in the grant of uplink resources, an uplink transmission duration shorter than the reservation duration of the detected channel reservation for transmission signal.

23. An apparatus for wireless communication, comprising:
  a processor;
  memory in communication with the processor; and
  instructions stored in the memory, the instructions being executable by the processor to:
    detect, at a first base station, a channel reservation for transmission signal over a shared radio frequency spectrum band;
    determine, at the first base station and in response to the detected channel reservation for transmission signal, that a channel reservation for reception signal corresponding to the detected channel reservation for transmission signal is not detected over the shared radio frequency spectrum band; and transmit a communication over the shared radio frequency spectrum band, to a first user equipment (UE), based at least in part on determining that the channel reservation for reception signal corresponding to the detected channel reservation for transmission signal is not detected, the communication comprising a pre-grant communication associated with a downlink transmission or a grant of uplink resources associated with an uplink transmission.

24. The apparatus of claim 23, wherein the channel reservation for transmission signal is transmitted by a second base station.

25. The apparatus of claim 23, wherein the channel reservation for transmission signal is transmitted by a second UE.

26. The apparatus of claim 23, wherein the channel reservation for transmission signal is transmitted by a Wi-Fi transmitter.

27. The apparatus of claim 23, wherein the communication comprises the grant of uplink resources, and the instructions are executable by the processor to:
   determine an interference level associated with the detected channel reservation for transmission signal;
   identify, based at least in part on the interference level, a modulation and coding scheme (MCS) to be used by the first UE during the uplink transmission; and
   transmit an indicator of the MCS with the communication.

28. The apparatus of claim 23, wherein the communication comprises the grant of uplink resources, and the instructions are executable by the processor to:
   determine a reservation duration of the detected channel reservation for transmission signal; and
   indicate, in the grant of uplink resources, an uplink transmission duration shorter than the reservation duration of the detected channel reservation for transmission signal.

* * * * *